(12) United States Patent
Kuhno et al.

(10) Patent No.: US 7,857,221 B2
(45) Date of Patent: Dec. 28, 2010

(54) RFID TAG SYSTEM

(75) Inventors: Michael J. Kuhno, Allentown, PA (US);
Troy R. Herman, Barto, PA (US);
Anthony M. DiMauro, West Conshohocken, PA (US); James N. Cox, Green Lane, PA (US)

(73) Assignee: Accu-Sort Systems, Inc., Telford, PA (US)

( * ) Notice: Subject to any disclaimer, the term of this patent is extended or adjusted under 35 U.S.C. 154(b) by 1096 days.

(21) Appl. No.: 11/496,101

(22) Filed: Jul. 28, 2006

(65) Prior Publication Data
US 2007/0057050 A1 Mar. 15, 2007

Related U.S. Application Data

(60) Provisional application No. 60/703,539, filed on Jul. 29, 2005.

(51) Int. Cl.
*G06K 7/10* (2006.01)
*G06K 9/36* (2006.01)
*G06K 9/80* (2006.01)

(52) U.S. Cl. ............... 235/462.1; 235/375; 235/472.02

(58) Field of Classification Search ............ 235/462.01, 235/454, 375, 472.01, 462.45, 487, 462.14
See application file for complete search history.

(56) References Cited

U.S. PATENT DOCUMENTS

| | | | |
|---|---|---|---|
| 5,550,745 A | 8/1996 | Wurz | |
| 5,705,021 A | 1/1998 | Wurz et al. | |
| 5,750,004 A | 5/1998 | Wurz et al. | |
| 5,940,305 A | 8/1999 | Wurz | |
| 5,954,913 A | 9/1999 | Wurz et al. | |
| 2005/0007252 A1 | 1/2005 | Arneson et al. | |
| 2005/0231370 A1* | 10/2005 | Tagato | 340/572.1 |
| 2005/0252596 A1* | 11/2005 | Olsen et al. | 156/64 |

* cited by examiner

*Primary Examiner*—Edwyn Labaze
(74) *Attorney, Agent, or Firm*—Nelson Mullins Riley & Scarborough, LLP

(57) ABSTRACT

A system for applying radio frequency identification tags on which are disposed respective barcodes includes a processor and a plurality of representations of the items accessible by the processor. Each representation is associated with at least one of the barcodes and includes an indication of a predetermined position for placement of the radio frequency identification tag on an item corresponding to the barcode. A barcode reader and a display are in communication with the processor. When the barcode reader detects a first barcode on a first item, the barcode reader outputs a first signal to the processor identifying the first barcode. The processor receives the first signal, identifies a first representation that is associated with the first barcode, and outputs to the display a second signal associated with the first representation. The display receives the second signal associated with the first representation and displays the first representation.

25 Claims, 65 Drawing Sheets

RFID TAG SYSTEM

The present application claims priority to U.S. Provisional Application No. 60/703,539, filed Jul. 29, 2005, the entire disclosure of each of which is incorporated by reference herein.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

Manufacturers of products for retail markets generally apply for Universal Product Codes ("UPC") and/or Electronic Product Codes ("EPC") for their products. A UPC and/or EPC comprises information specific to the product, such as the identity of the product (by a product code) and the manufacturer, and is typically included on a label affixed to the product or its packaging at the manufacturer's facility. The label may store UPC information (either by including the UPC directly or a code that relates to the known UPC) in a barcode printed on the label or EPC information on a radio frequency identification ("RFID") tag attached to the label stock. Depending upon their size, several identical products may be packaged together in a "carton," which as used herein refers to the product box or other packaging. Multiple cartons of the same products can then be placed in groups, or pallets, that may be arranged in a distribution center. This process is referred to as "palletizing."

In addition to the basic UPC label, manufacturers have also attached a more detailed barcode label to a product's packaging before shipping the product to a retailer or wholesaler. The retailer/wholesaler may provide to the manufacturer some or all of the information to be included within this more detailed label, but such information may also depend on other factors, for example as related to the product's distribution. Some retailers request that manufacturers also label packages with RFID tags to include the same or more information than is provided in the detailed barcode labels.

Barcode labels are preferably applied to packages so that they may be within the line of sight of a later barcode reader but are generally unaffected by the package's contents. RFID tags, on the other hand, generally do not require line of sight placement but can be affected by package contents. As should be understood in this art, for example, some liquids can absorb radio frequency ("RF") signals, while metals may reflect RF signals. Placement of the RFID tag in sufficient proximity to such materials can inhibit the ability of a later RFID reader to read the tag's information.

SUMMARY

The present invention relates to an RFID labeling system that may be used independently or in conjunction with a labeling conveyor system.

These and other objects may be achieved in a preferred embodiment of a system for applying radio frequency identification tags on items on which are disposed respective barcodes, including a processor and a plurality of representations of the items accessible by the processor. Each representation is associated with at least one of the barcodes and includes an indication of a predetermined position for placement of a radio frequency identification tag on an item corresponding to the at least one barcode. A barcode reader is in communication with the processor. A display is in communication with the processor. When the barcode reader detects a first barcode on the first item, the barcode reader outputs a first signal to the processor identifying the first barcode. The processor receives the first signal, identifies a first representation that is associated with the first barcode, and outputs to the display a second signal associated with the first representation. The display receives the second signal associated with the first representation and displays the first representation.

In one preferred method for applying radio frequency identification tags on items on which are disposed respective barcodes, items are conveyed through a first path of travel. A first barcode is detected on a first item, and the first item is diverted from the first path of travel to a second path of travel if a representation indicating a predetermined position for placement of a radio frequency identification tag on the first item is associated with the first barcode.

The accompanying drawings, with are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which.

Figure 1A:
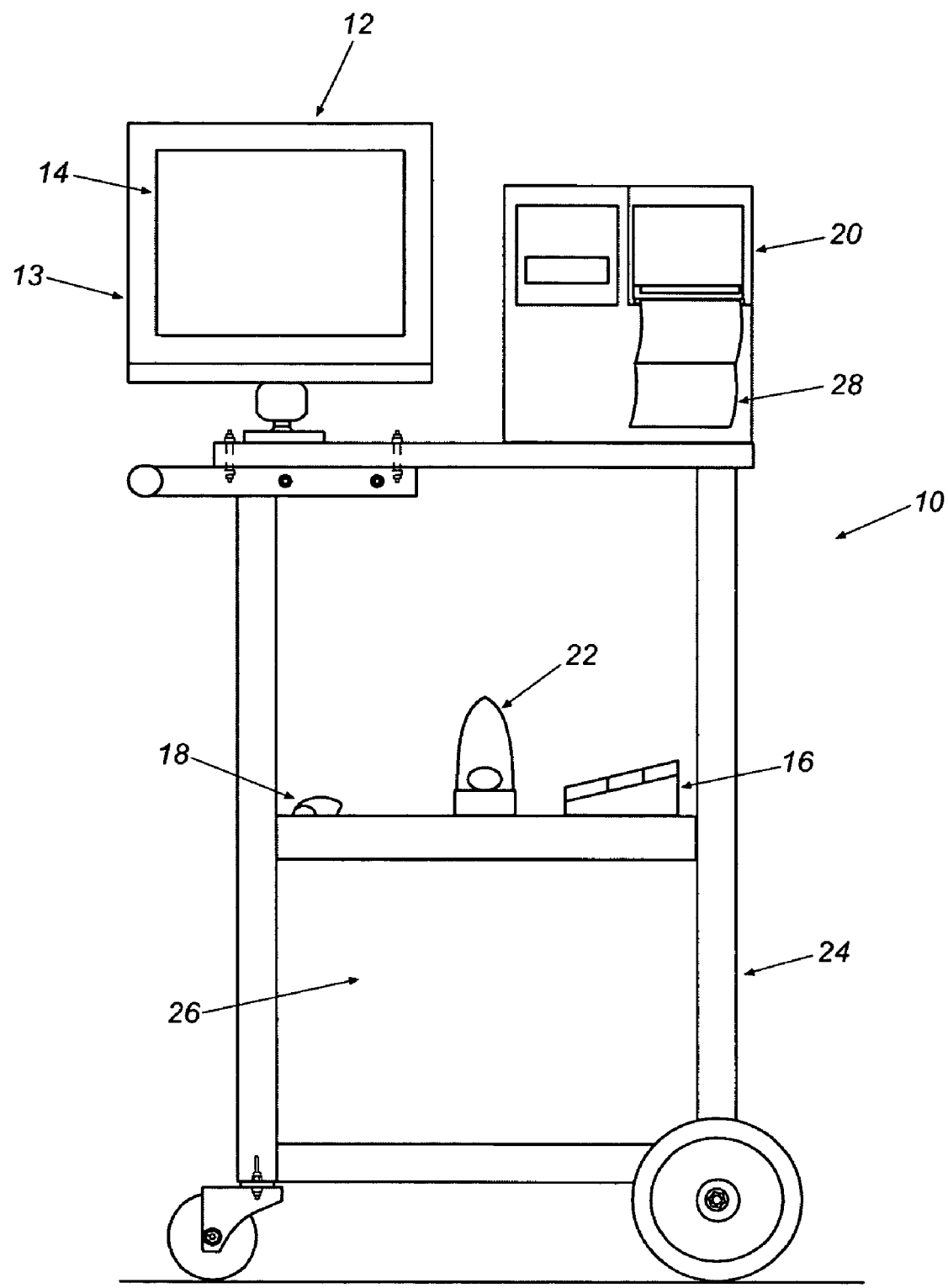
FIG. 1A is a front schematic view of a mobile labeling system in accordance with an embodiment of the present invention.
Figure 1B:
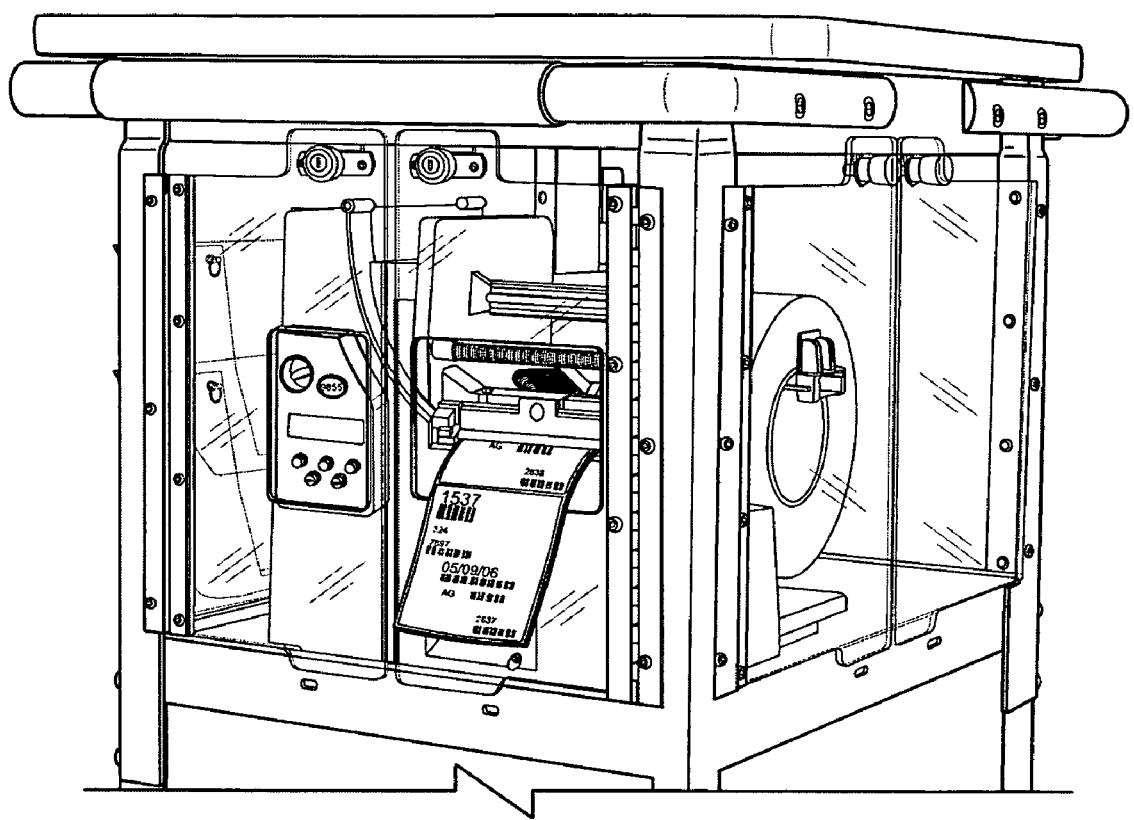
FIG. 1B is a perspective view of an RFID printer and cart as in the system as shown in FIG. 1A.
Figure 1C:
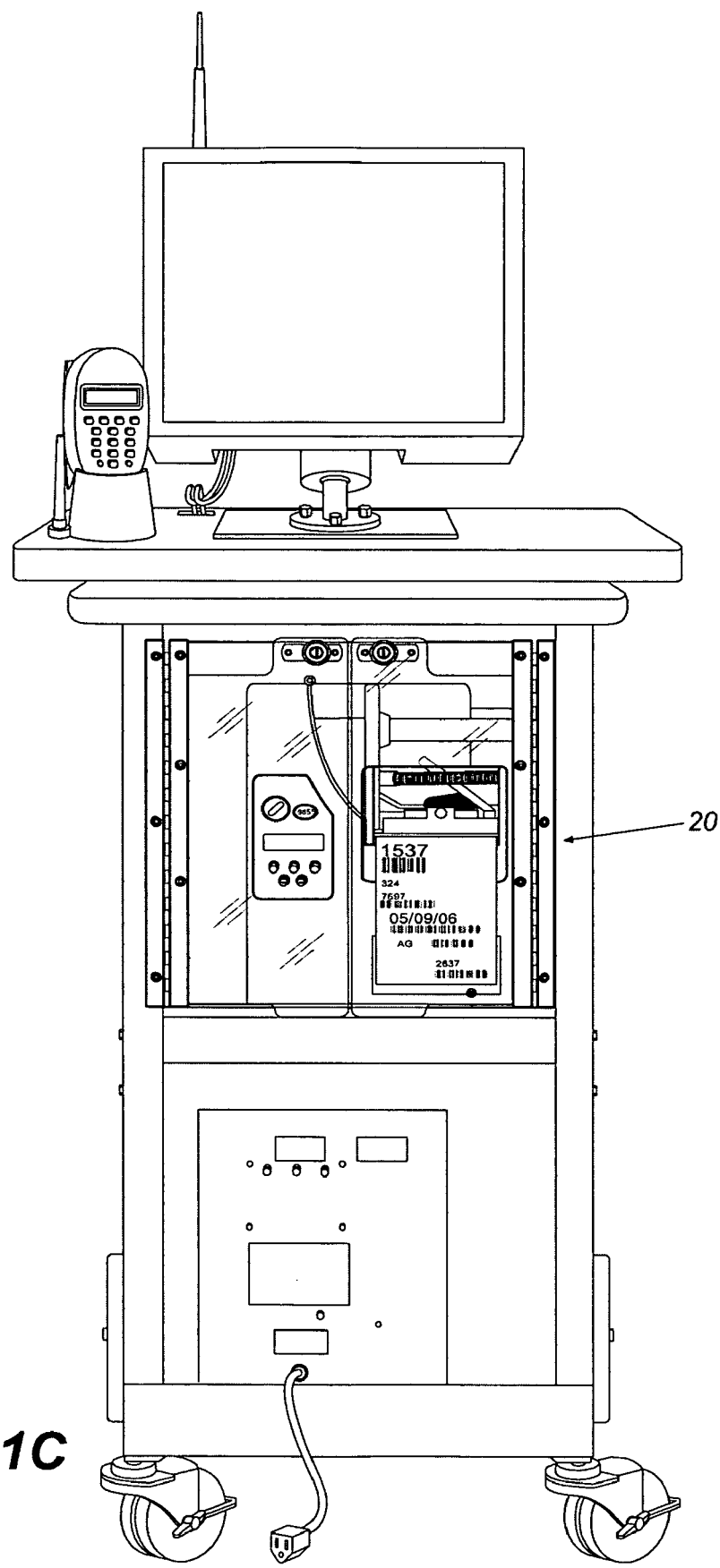
FIG. 1C is a partial front perspective view of a system as shown in FIG. 1A.
Figure 1D:
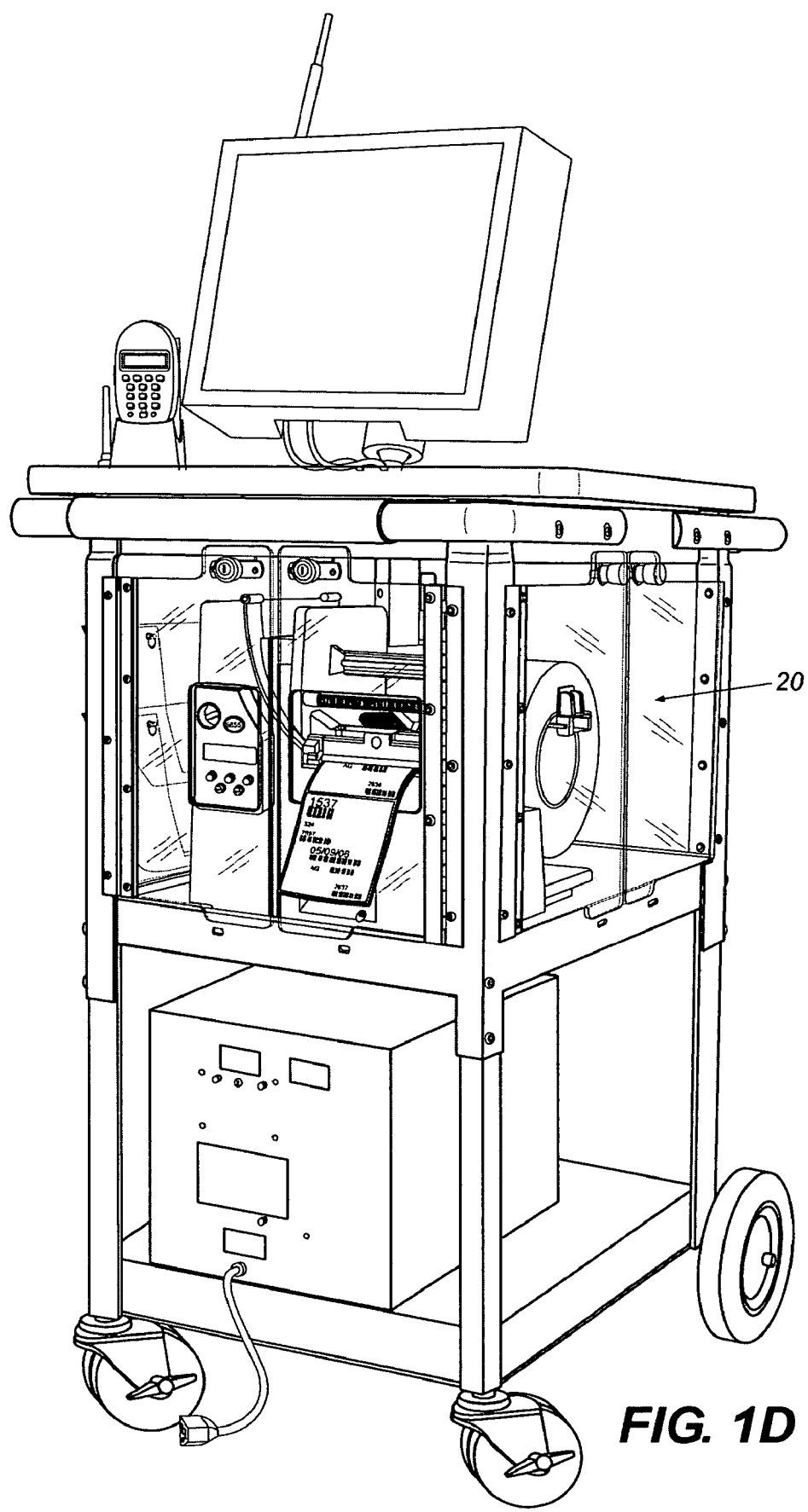
FIG. 1D is a partial perspective view of a system as shown in FIG. 1A.

Repeat use of reference characters in the present specification and drawings is intended to represent same or analogous features or elements of the invention.

DETAILED DESCRIPTION

Reference will now be made in detail to presently preferred embodiments of the invention, one or more example of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the present disclosure.

Referring to FIGS. 1A, 1B, 1C and 1D, a mobile unit 10 includes a general purpose computer 12, a touch screen 14, a keyboard 16, a computer mouse 18, an RFID printer 20, and a handheld barcode scanner 22, all located on a wheeled cart 24. Referring also to FIG. 2A, a lower portion 26 of cart 24 houses a battery system 30, which allows mobile unit 10 to be disconnected from a power supply for a limited time, for example so that system 10 may be moved via the wheeled cart from one conveyor line to another for use as described herein. Carts and mobile battery systems should be understood in this art and are therefore not discussed in further detail. An example of an integrated cart and battery system is the MONARCH 9876 MOBILE WORK STATION available from Paxar Corporation in Miamisburg, Ohio. It should also be understood that, while the presently described embodiment includes a battery system integrated into cart 24, cart 24 and battery system 30 do not have to be so combined and may be separate components.

RFID printers, which encode RFID devices disposed on respective tags as the tags are dispensed from a feed roll, should also be understood in this art, and any suitable RFID printer may be used, e.g. the MONARCH 9855 RFID printer also available from Paxar Corporation. It should also be understood that while an RFID printer may print alphanumeric and/or barcode characters on a label carrying the encoded RFID tag, the phrase "RFID printer" may encompass a device that encodes RFID tags without printing either or both of alphanumeric and barcode characters on the tag and that RFID tags dispensed from an RFID printer need not be disposed on printable label stock. It should also be understood that the terms "RFID tag" and "RFID label" refer to a programmable/encodable radio frequency device and antenna attached to a substrate so that the device and antenna can be secured to a desired object such as a carton. "Label" refers generally to a substrate capable of attachment to a carton or pallet and upon which information regarding the carton or pallet is disposed through a barcode, an RFID tag, or both. In the presently described embodiment, RFID printer 20 uses printable label stock that contains an embedded RFID tag. RFID printer 20 formats and prints a barcode containing information specific to the cartons and pallets on which the label will be placed and, at the same time, encodes the embedded RFID tag with the same and, optionally, additional information. In addition, handheld barcode scanners should be well understood in this art, and any suitable scanner may be used, for example the SYMBOL PHASER available from Symbol Technologies Corporation of Holtsville, N.Y.

In another embodiment, multiple scanners and RFID printers may be connected to computer 12. As discussed below, an option of the system allows a user to "verify" a barcode label after it is attached to a carton by performing a barcode verification scan. A user may employ a second or additional scanner to perform this verification without impeding the scanning of product codes for which the primary scanner is used. Connecting additional RFID printers allows the system to simultaneously print carton and pallet label/tags.

Figure 3A:
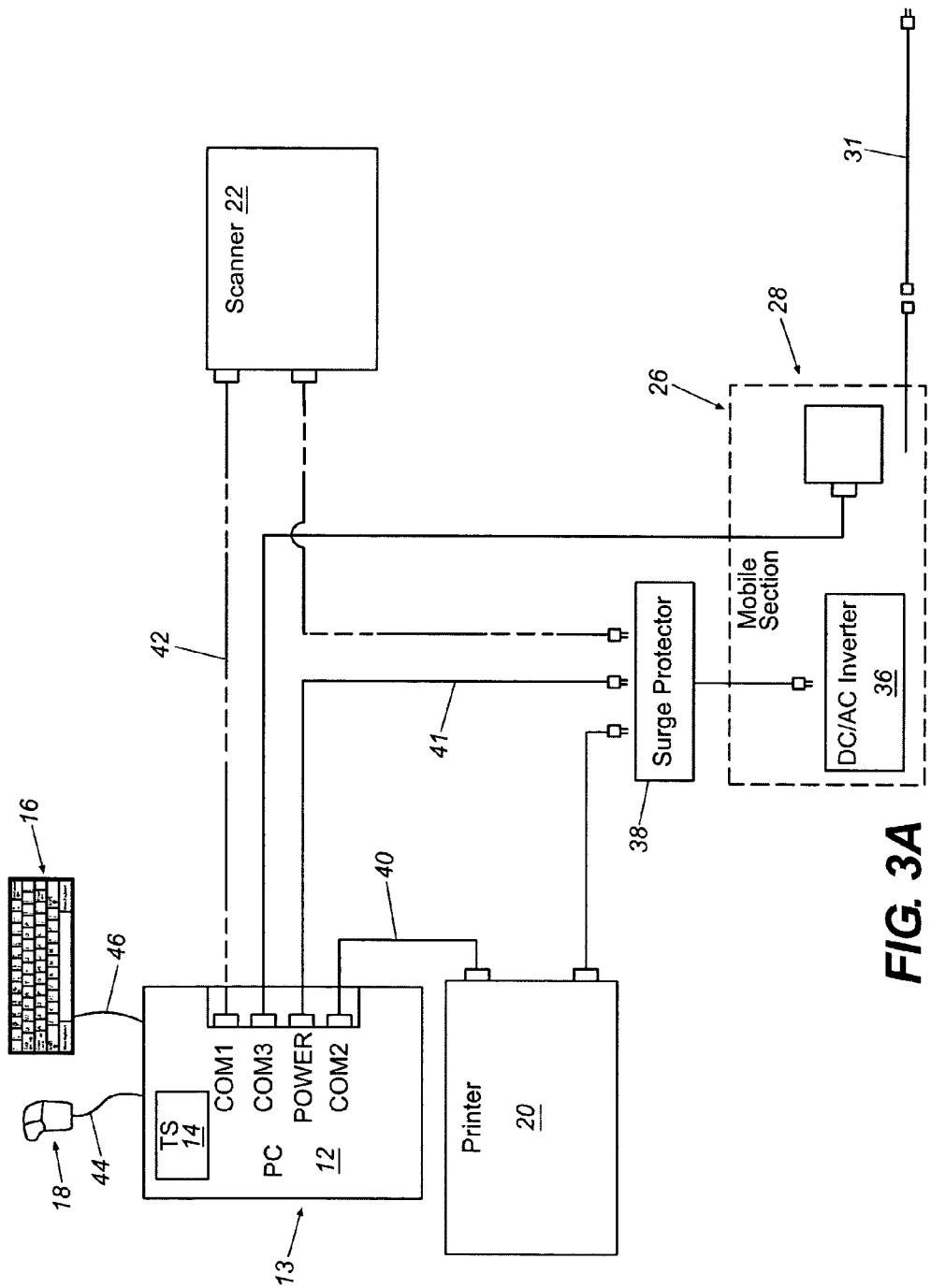
FIG. 3A is a block diagram view of the mobile labeling system as shown in FIG. 1A.

Referring to FIG. 3A, in the presently described embodiment, computer 12 is a personal ("PC") or industrial computer and includes a PENTIUM equivalent processor running the WINDOWS 2000 operating system. Touch screen 14 may overlay the PC monitor screen and is preferably secured in the same housing 13 as the monitor and processor. Keyboard 16, mouse 18, RFID printer 20 and scanner 22 are connected to the processor through housing 13. The construction and operation of personal and industrial computers and touch screens should be well understood and are therefore not described in more detail herein. While PC 12 and touch screen 14 are disposed in common housing 13 in the presently described embodiment, PC 12 and touch screen 14 may also be separate components. Furthermore, it should also be understood that mobile unit 10 employs touch screen 14 in order to facilitate input by a user. In another embodiment, however, the touch screen overlay is omitted, so that the user views information and options at a cathode ray tube ("CRT") screen, or other type of screen, and interacts with the system via keyboard 16, mouse 18 and barcode scanner 22. In these alternative embodiments, CRT monitor 14, keyboard 16, mouse 18, RFID printer 20 and scanner 22 are also operatively connected to PC 12.

Figure 3B:
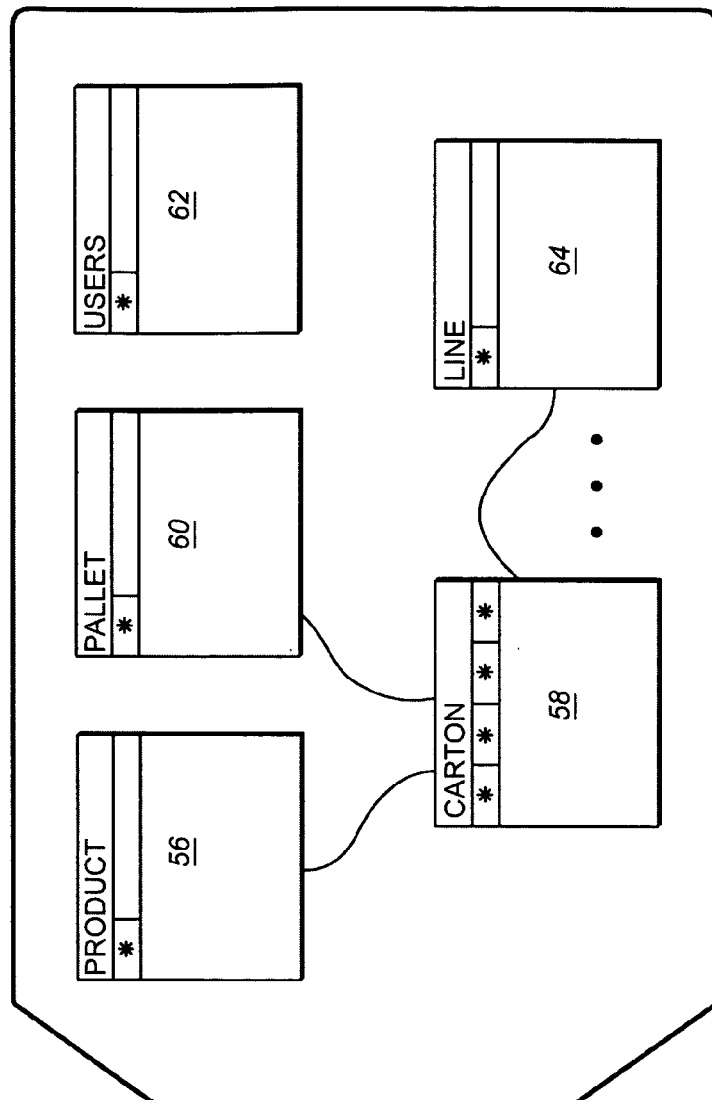
FIG. 3B is a block diagram view of the data hierarchy of an embodiment of a mobile labeling system as shown in FIG. 1A.

An application running on PC 12 and written under the MICROSOFT VISUAL STUDIO suite in the MS VISUAL BASIC language controls the mobile RFID labeling system, as described in more detail below. It should be understood that the application can be written in any suitable language and operate on any suitable operating system on any processing machine capable of communicating with the input devices and RFID printer as described above. Referring to FIG. 3B, data and information relating to products, cartons and pallets are stored in database 54. Other data and information used by the application, such as settings, user identities, label formats, label graphics and application events, are stored in a database 52, a registry 48, and files 50. Referring again to FIG. 3A, battery system 30 provides AC power to PC 12, RFID printer 20 and scanner 22 from AC power line input 31 via a surge protector 38 or, alternatively, from a battery and a DC/AC converter 36. PC 12 receives information from mouse 18, keyboard 16 and barcode scanner 22 over communication lines 44, 46 and 42, respectively, and outputs data to RFID printer 20 over communication line 40. PC 12 is also connected to battery system 30 via connection line 41. Battery system 30 transmits a message to the user via PC 12 when battery system 30 is low on power. Optionally, battery system 30 can also shut down PC 12 when available power drops below a predetermined level. The interaction between computers and battery systems, which should be well-known in the art, is generally controlled by a computer's operating system.

Referring again to FIGS. 2A and 2B, mobile unit 10 is used to identify information relating to a product and, in response, print a detailed barcode label that includes an embedded RFID tag to be placed on the carton containing the product or products. As described above, when a product or products are initially packaged into cartons, a barcode label containing minimal information, such as identification of the manufacturer and a product code in the product's UPC, is affixed to the carton, such as a barcode label 34 on carton 32. Additionally, the manufacturer may palletize the cartons.

A retailer or wholesaler may send data to the manufacturer to be included within each label affixed to cartons and pallets of a given product the manufacturer will send to that retailer/wholesaler. The content of the retailer/wholesaler information may depend on the specific needs of the retailer/wholesaler and may be product specific. Such information, optionally along with information relevant to the product or the label that is provided by the manufacturer and/or generated by system 10 as described below (collectively "Product Label Information"), is stored in a Product table 56 within database 54 (FIG. 3B) in association with the product's unique UPC product code. It should be understood, however, that a unique product identifier other than the UPC product code could be used.

When a carton, such as a carton 32, is brought to mobile unit 10 manually or via conveyor, an operator of station 10 scans the carton's initial barcode label 34 using barcode scanner 22. The system application receives the scanner data, derives the product's product code from the UPC data contained in barcode 34, associates the product code with the Product Label Information stored in Product table 56, and converts some or all of the associated Product Label Information to data ("RFID Printer Data") configured to drive RFID printer 20. The application then outputs the RFID Printer Data to RFID printer 20, which in turn (a) prints a label with a barcode embodying the RFID Printer Data and (b) encodes an RFID tag in the label with the RFID Printer Data. The operator retrieves the printed label, such as a label 28, from RFID printer 20 and affixes the label to the carton. The format and configuration of the RFID Printer Data depends on the requirements of the RFID printer and the protocols related to the barcode and RFID tag and are therefore not discussed herein.

Referring again to FIG. 3B, when the system scans a carton and prints a corresponding label, the system application adds a row to a Carton table 58 within database 54. The entry is specific to the newly scanned and labeled carton and includes the product code (or other unique carton identifier) identifying the carton's contents, the RFID Printer Data included in the label, a production date and a unique carton identifier. The production date is a date associated with the carton and preferably may be the actual date the carton's label is printed, as defined by a clock maintained by computer 12. Alternatively, and as described in more detail below, the production date may be predefined, e.g. as the day a predefined group of cartons begins processing through station 10. Thus, even if more than one day is required to process the entire group, the initial date is the production date for all cartons in the group. The carton identifier is a serial number generated by the system application that is unique to each carton. Preferably the system application increments the carton identifier with each carton so that successive cartons have sequential carton identifiers. The production date and the carton identifier may be included in the RFID Printer Data comprising the associated label's printed barcode and encoded RFID information. Preferably, the carton identifier is printed in alphanumeric characters on the RFID label so as to be visible on the label when it is attached to the carton.

System 10 may also be configured to track cartons as they relate to pallets. If cartons are palletized prior to being presented to station 10, the cartons are removed from their pallet and processed through station 10, as described above, in the same manner as non-palletized cartons. As with non-palletized cartons, the system application creates an entry in Carton table 58 for each of the palletized cartons, but when palletizing is enabled, a pallet identification is also included in the Carton table entry for that carton. When the pallet opens, the application adds a row to a Pallet table 60 that is specific to the present pallet. Each entry includes an identifier unique to the pallet to which a given group of cartons belongs and the number of cartons that have been scanned and labeled by system 10 under the present pallet number. When the pallet closes, in a manner as discussed below, the application updates Pallet table 60 and instructs RFID printer 20 to produce a label with barcode and/or RFID information corresponding to desired information stored in Pallet table 60 for the present pallet identifier. After processing through station 10, the cartons are re-palletized.

The entire group of cartons and pallets to be scanned and labeled by one station, such as mobile unit 10, is referred to as a "production line." All of the combined production lines to be scanned and labeled during a given time period, regardless of the number of stations to be used, is referred to as a "production run." When mobile unit 10 operates independently and is the only station used to scan and print labels, the "production run" and "production line" are equivalent.

Where a given carton contains products that may interfere with reading of an RFID tag, the Product Label information associated with the corresponding product code in Product table 56 preferably includes an image of the carton that indicates a preferred placement of the label on the carton to reduce, minimize or eliminate such interference. Simultaneously with driving RFID printer 20 to produce the label, the system application displays the image on the screen of computer 12 to thereby prompt the operator to affix the resulting label on the carton at the preferred position.

Figure 4:
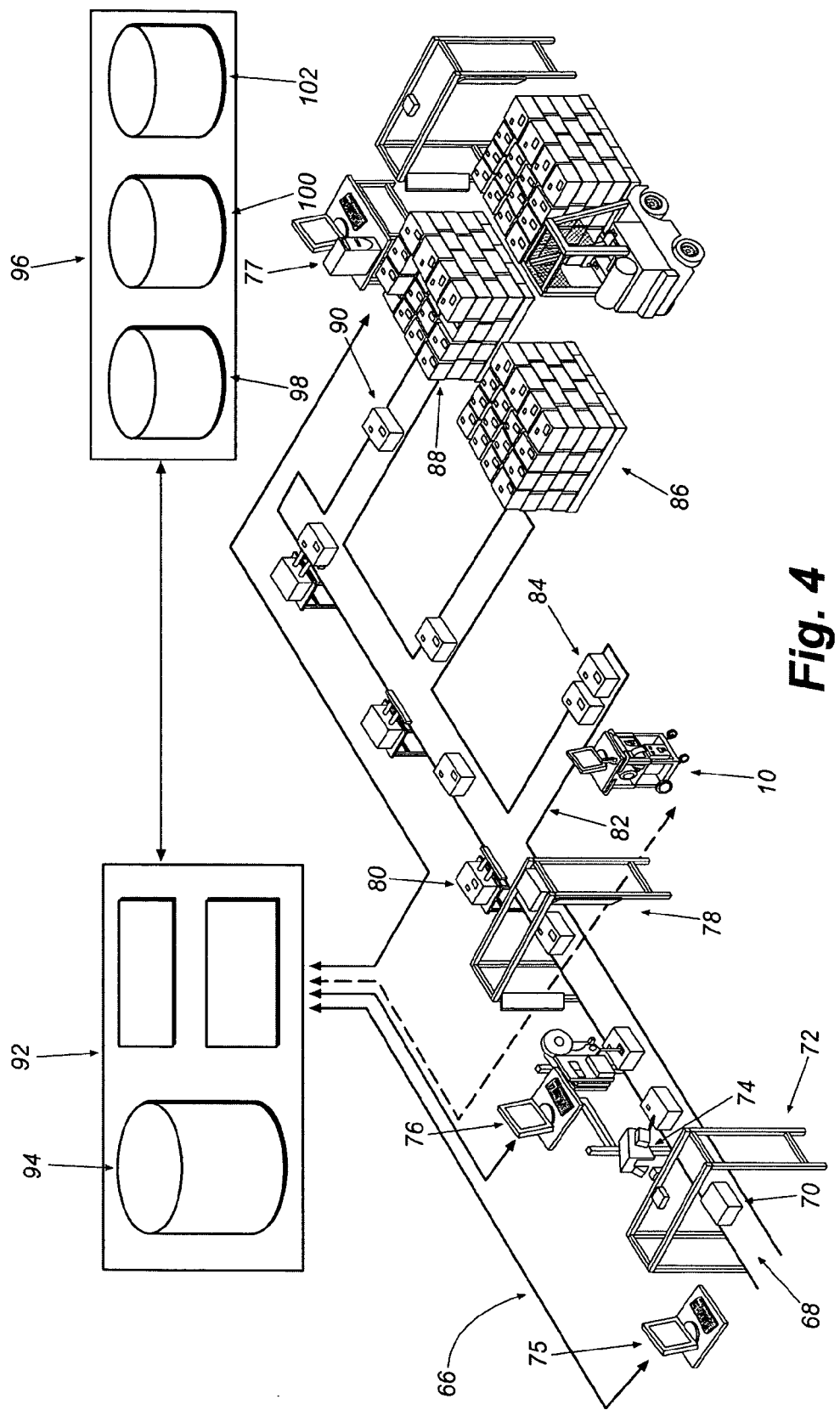
FIG. 4 is a perspective schematic view of a conveyor labeling system in accordance with an embodiment of the present invention.

Mobile unit 10 can be a stand-alone system, as described above, or may be integrated within a larger conveyor system. Referring to FIG. 4, for example, mobile unit 10 is integrated with a conveyor system 66. In the illustrated arrangement, PC 12 communicates with a remote data server 92, which includes a database 94 having Product, Carton and Pallet tables as described above with respect to database 54 (FIG. 3B). That is, database 54 is replaced by database 94, and the system application on PC 12 accesses the Product Label Information contained in the Product table within database 94, and saves information to the Carton table and to the Pallet table in database 94 through data server 92. The application running on stations 75, 76 and 77 update the tables within database 94 in a manner identical to the description above, which is therefore not repeated.

Still referring to FIG. 4, assume that cartons 70, 84 and 90 contain identical products and are loaded onto conveyor system 66 at an entry location denoted by arrow 68. If the cartons were previously palletized, they may be unpacked from the pallet at this point. A barcode scanner 72 reads the initial barcode label affixed to a given carton and forwards the retrieved product barcode to a personal or industrial computer at a station 75. Based on the product code, station 75 retrieves the associated Product Label Information from database 94, generates RFID Printer Data from the Product Label Information, and outputs the RFID Printer Data to an RFID printer 74. In this instance, the RFID printer encodes and dispenses RFID tags but does not print barcode information on the label, although it should be understood that an RFID printer that performs both functions could be used. RFID printer 74 dispenses the label so that the label is affixed to the carton as the carton passes under the printer. A barcode printer downstream from the RFID printer also receives the RFID Printer Data and, responsively thereto, prints a corresponding barcode label and dispenses the barcode label on or near the RFID label.

A barcode reader and an RFID reader (collectively indicated at 78) read the barcode and RFID labels applied to cartons 70, 84 and 90. If readers 78 successfully read both the barcode label and RFID label affixed to the cartons, the cartons (such as carton 90) continue down conveyor system 66 and are repacked into their corresponding pallets, such as a pallet 86 or 88. Upon the successful barcode/RFID confirmation, an application running at station 75 updates the Carton table and, for the first carton in a pallet, the Pallet table accordingly, as discussed above with respect to system 10.

If either of the readers 78 fails to successfully read the barcode label or RFID label affixed to a given carton, however, the Carton and Pallet tables are not updated at this point, and a diverter 80 redirects the affected carton (e.g., carton 84) down a conveyor corridor 82 to mobile station 10. The operator at station 10 scans the original barcode label to acquire the product code, and system 10 produces a new label as discussed below with respect to FIG. 29A. The system application at computer 12 updates the Carton table and, if the carton is the first carton in a pallet, the Pallet table at database 94 accordingly. If carton 84 was previously palletized, it is then repacked into its corresponding pallet, such as pallet 88.

Figure 2A:
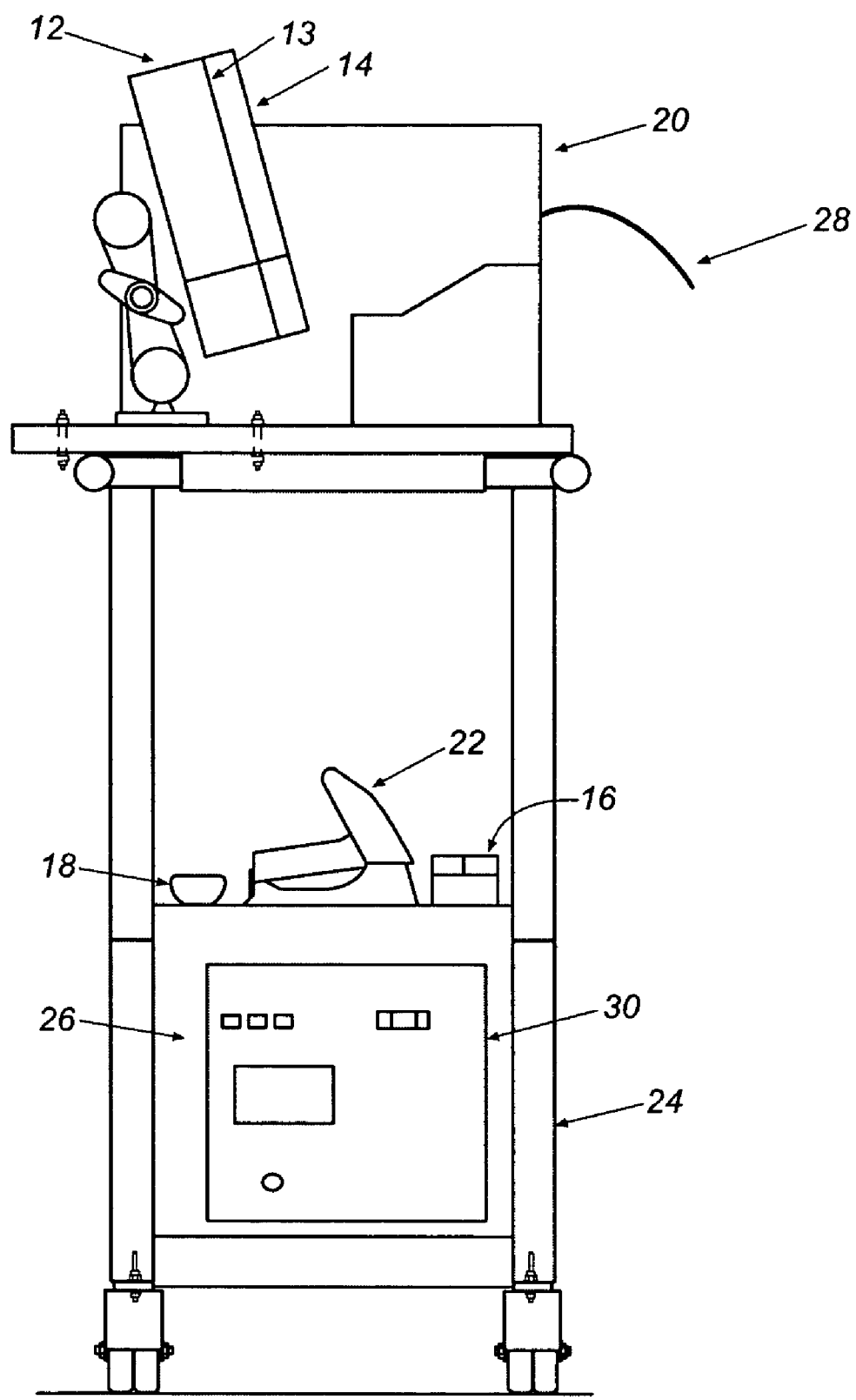
FIG. 2A is a side schematic view of a mobile labeling system as shown in FIG. 1A.
Figure 2B:
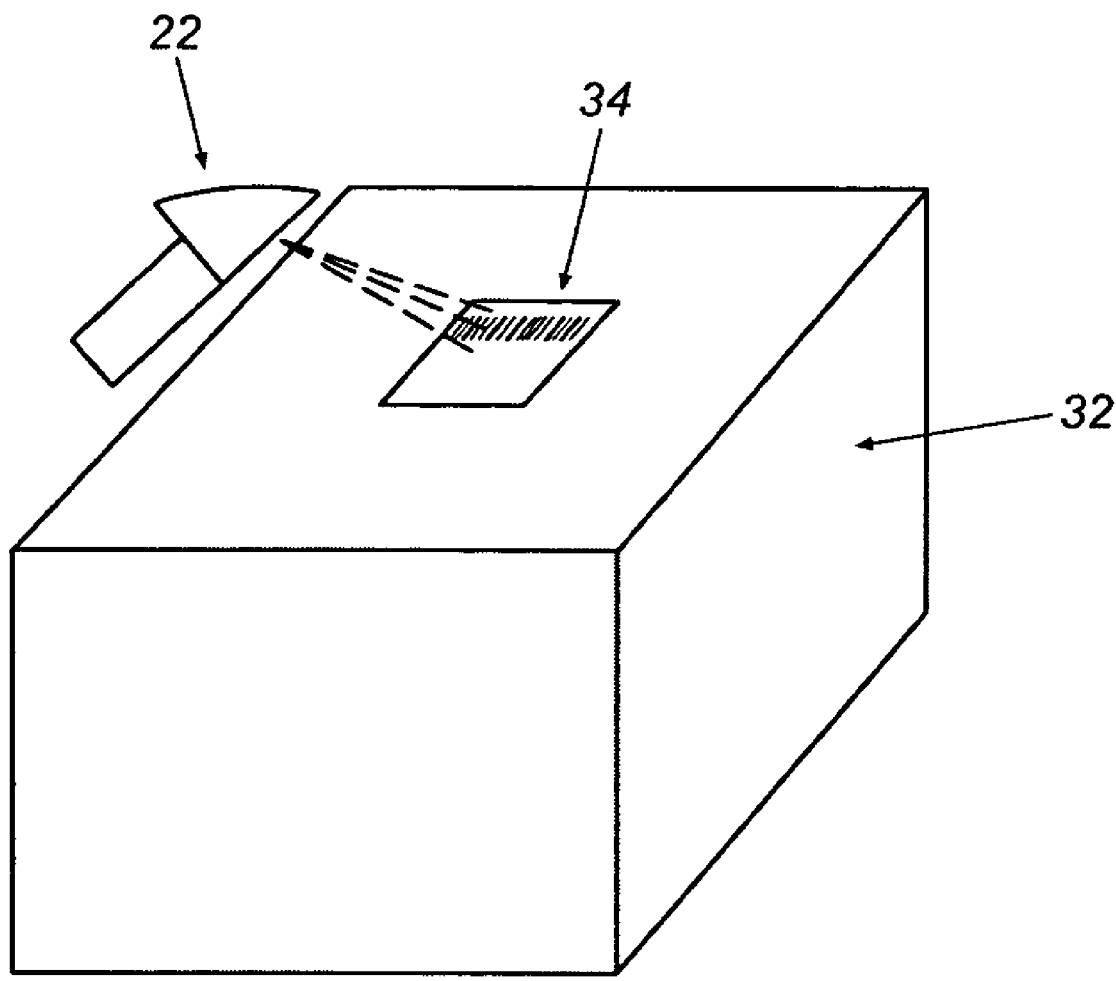
FIG. 2B is a schematic illustration of the use of a handheld scanner and package with a label for use within a system or process including a labeling system as shown in FIG. 1A.

Conveyor system 66 may divert a carton down corridor 82 for reasons other than a failure to read a barcode label or an RFID tag. For example, after a carton 70 is scanned by apparatus 72, station 75 may determine from the Product Label Information corresponding to the product code that carton 70 contains a product or material that may interfere with the reading of RFID tags. Station 75 does not generate a label for the carton but instead sends instructions to diverter 80 so that, when carton 70 reaches diverter 80, diverter 80 pushes carton 70 down corridor 82 to station 10. At this point, the operator at station 10 reads the carton's EPC label using scanner 22 (as shown in FIG. 2B). After retrieving the product's Product Label Information in database 94 based on the UPC, and thereby determining the carton contains RF-interfering materials, the application running on PC 12 retrieves from database 94 the file location of an image of a carton of the same product as that of carton 70. PC 12 displays the image, which illustrates where on the carton to place the RFID tag so as to reduce, minimize or eliminate RF interference. The operator affixes label 28 to the carton in the position indicated by the image. This process is described in more detail below. Cartons that are too large to fit on conveyor system 66 can also be processed by mobile unit 10 in a similar manner.

Accordingly, while the embodiment described in detail below describes mobile unit 10 operating independently of a conveyor system such that the application retrieves, manipulates, and stores information in database 54 (FIG. 3B), it should be understood that mobile unit 10 may be a component of conveyor system 66 and that database 54 may be supplanted by database 94 on data server 94. Optionally, data server 94 may also be remotely connected to a warehouse management server ("WMS") 96 maintained by the retail supplier, which can support multiple databases; for example, databases 98, 100, and 102. WMS 96 represents the server containing the information required and/or used by a retail supplier to maintain its warehouse and inventory and includes the Product Label Information. For instance, databases 98, 100, and 102 can contain such data as product and order information specific to a retailer. Conveyor system 66 can access the Product Label Information on WMS 96, and more specifically in its databases 98, 100, and 102, to update and modify the Product Label Information within database 94 on remote server 92. Data server 92 interprets data from WMS 96 and stores such data that is relevant to conveyor system 66 in database 94, making the data available to conveyor system 66, including the application running on PC 12. The process by which cartons and pallets are labeled and tagged by mobile unit 10, either independently or part of conveyor system 66, is set forth below.

The application begins to run automatically when a user activates PC 12, or manually when a user starts the application program from the WINDOWS 2000 operating system. During operation, the user has the ability to input information into the application via touch screen 14, keyboard 16, mouse 18, barcode scanner 22 or any other scanners connected to PC 12, depending on the information requested. Initially, the user is asked for a user name and password, as depicted by screen 104 shown in FIG. 5. This logon information is encrypted within the application before being sent to, received from, or compared with information from any database. A user's logon information is stored in a User table 62 within database 54 (FIG. 3B) and associated therein with an access level for the user. In general, User table 62 stores user identification, security settings and other user related information. In the present embodiment, a user's access level can only be set or modified by another user of the highest security level. Depending on a given user's security level, some of the panels, buttons, or screens described below may be unavailable to the user. The user's security level is programmable as one of the options explained below and is stored in table 62.

Figure 5:
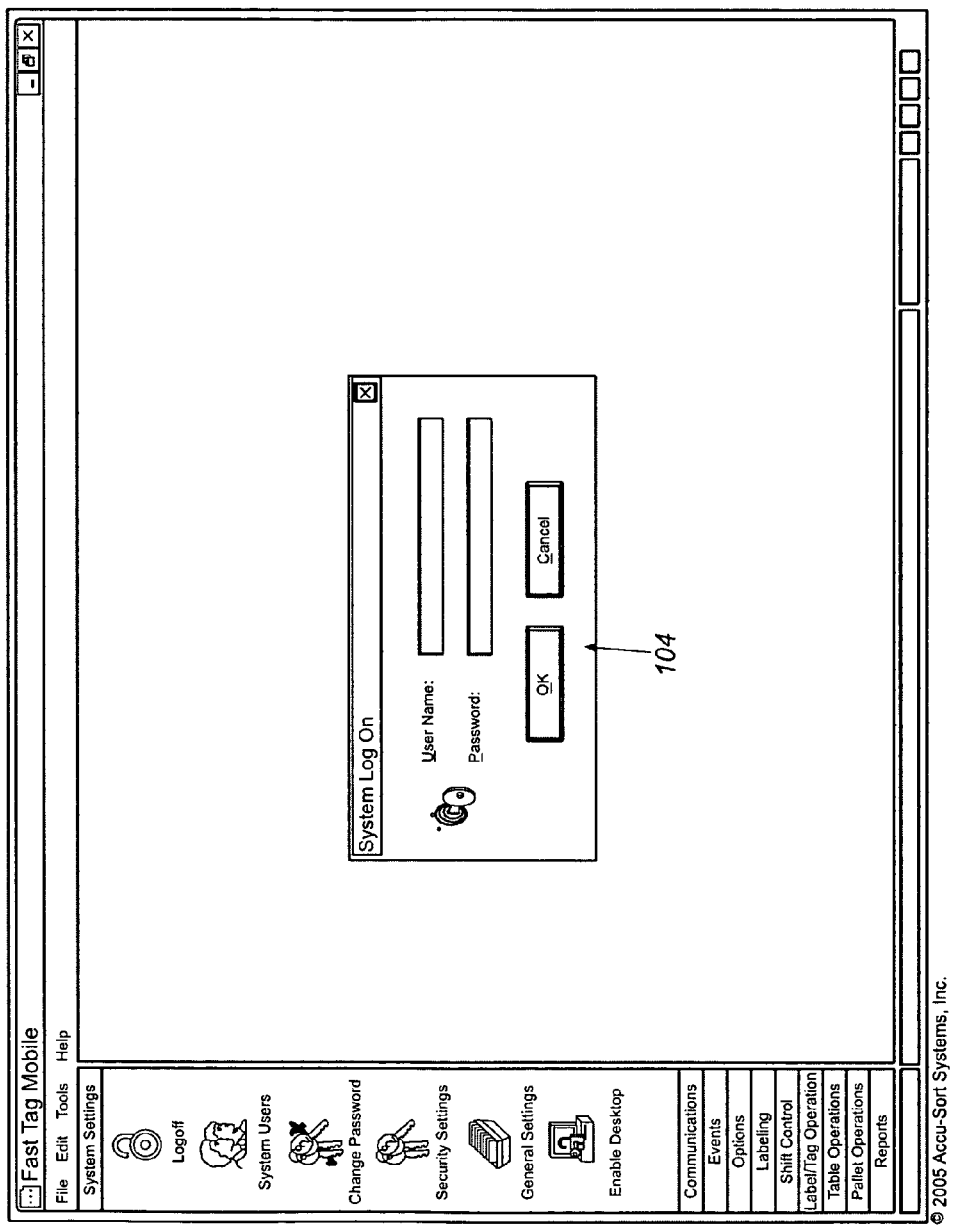
FIG. 5 is a screen display within a software application that controls the mobile labeling system as shown in FIG. 1A.
Figure 6A:
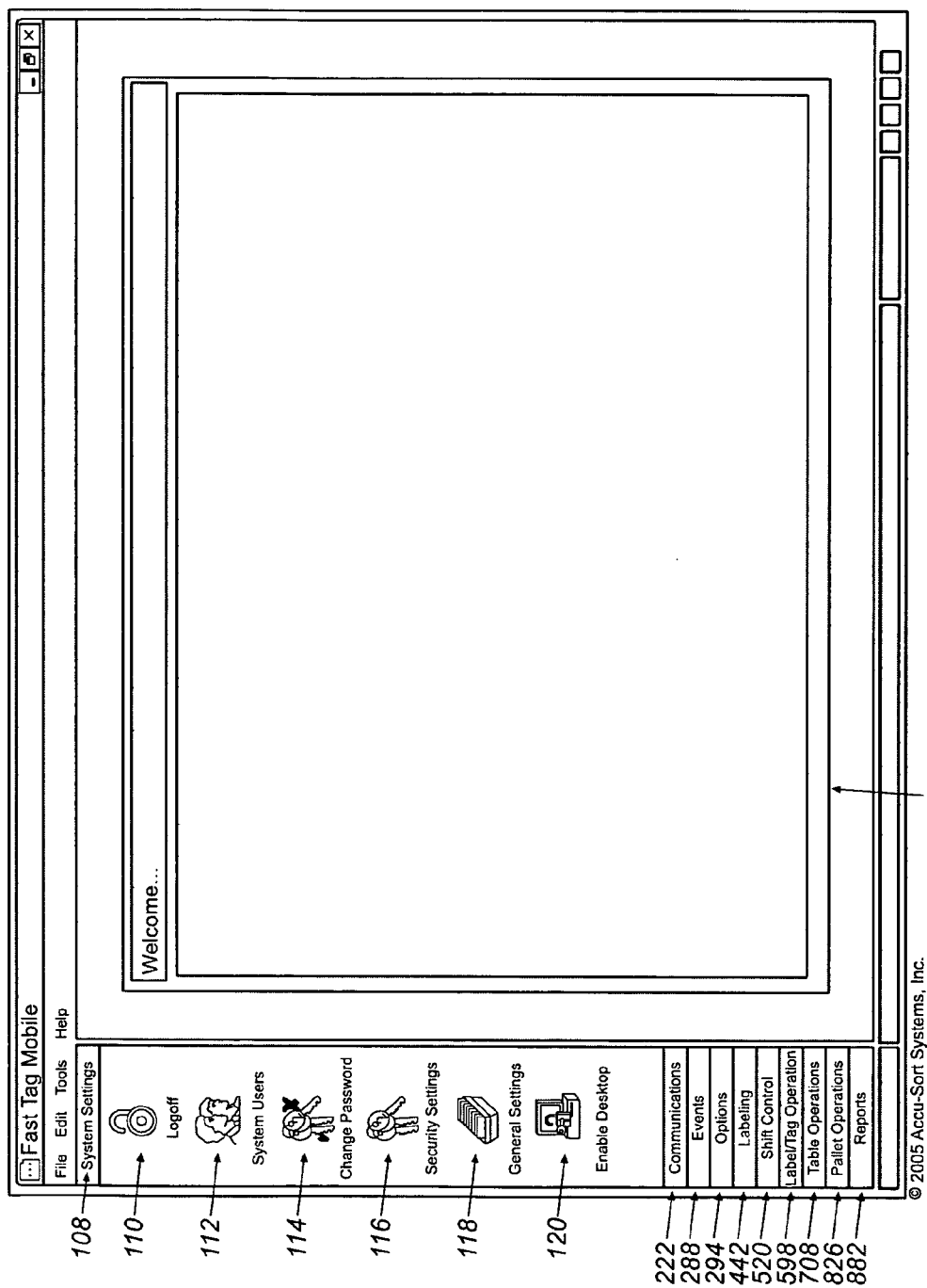
FIG. 6A is a screen display within a software application that controls the mobile labeling system as shown in FIG. 1A.

The application displays a welcome screen 106, as shown in FIG. 6A, once the user has logged into the application through the screen shown in FIG. 5. The user navigates through the application by using the panels displayed on the left side of the application screens, such as the ten panels 108, 222, 288, 294, 442, 520, 598, 708, 826 and 882 shown in FIG. 6A. When the user chooses one of these panels, buttons corresponding to that panel appear below the panel icon. For example, the six buttons 110, 112, 114, 116, 118 and 120 appear when the user chooses System Settings panel 108. Depending on the user's access level, some panels and/or buttons will not appear, and others, though visible, will be read-only.

The user can activate all available panels, panel-specific (and other) buttons, and textboxes by using mouse 18 to select the object or by touching touch screen 14 (FIG. 1A) above the position on the PC screen at which the object is displayed. Information or data can be entered into textboxes or other fields that require alphanumeric input through keyboard 16 or a touch screen keyboard 406 (as shown in FIG. 20B) presented on the PC screen and activated through touch screen 14. Selection of objects and data entry in such objects in the various screens discussed herein may be performed in a similar manner and is, therefore, not further described.

Depending on which specific button the user chooses, the application displays a specific screen with which the user further interacts with the application. Referring to FIG. 3B, data used by the application is stored in registry 48, files 50, or a local or remote SQL-92 compliant database, such as databases 54 or 94 described above. In the presently described embodiment, database 54 is located locally on PC 12 but can be replaced in other embodiments, as described above in which mobile unit 10 is a component of a larger system, by a system database 94 located on remote data server 92. Suitable databases should be well understood in the art and are available, for example, from Sybase Inc. of Dublin, Calif., Microsoft Corporation of Redmond, Wash., Oracle Corporation of Redwood Shores, Calif., and International Business Machines Corporation of Armonk, N.Y.

Figure 6B:
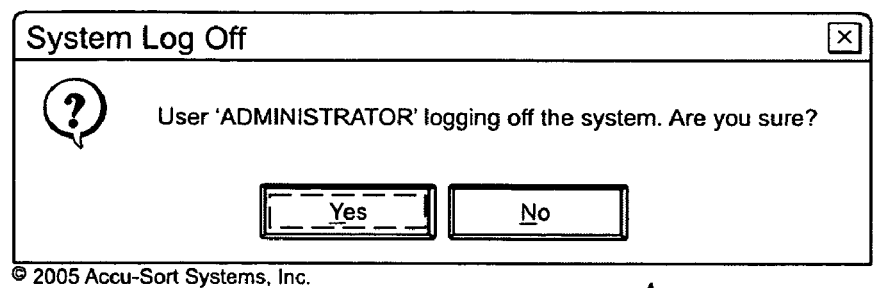
FIG. 6B is a screen display within a software application that controls the mobile labeling system as shown in FIG. 1A.

Referring again to FIG. 6A, System Settings panel 108 includes a Logoff button 110 that, when pressed, displays a decision box 122 (FIG. 6B) confirming whether the present user would like to log off the application. Choosing 'Yes' logs the present user off the application and returns the application to logon screen 104 (FIG. 5), while choosing 'No' returns the application to the screen the user was previously using prior to pressing Logoff button 110.

Figure 7A:
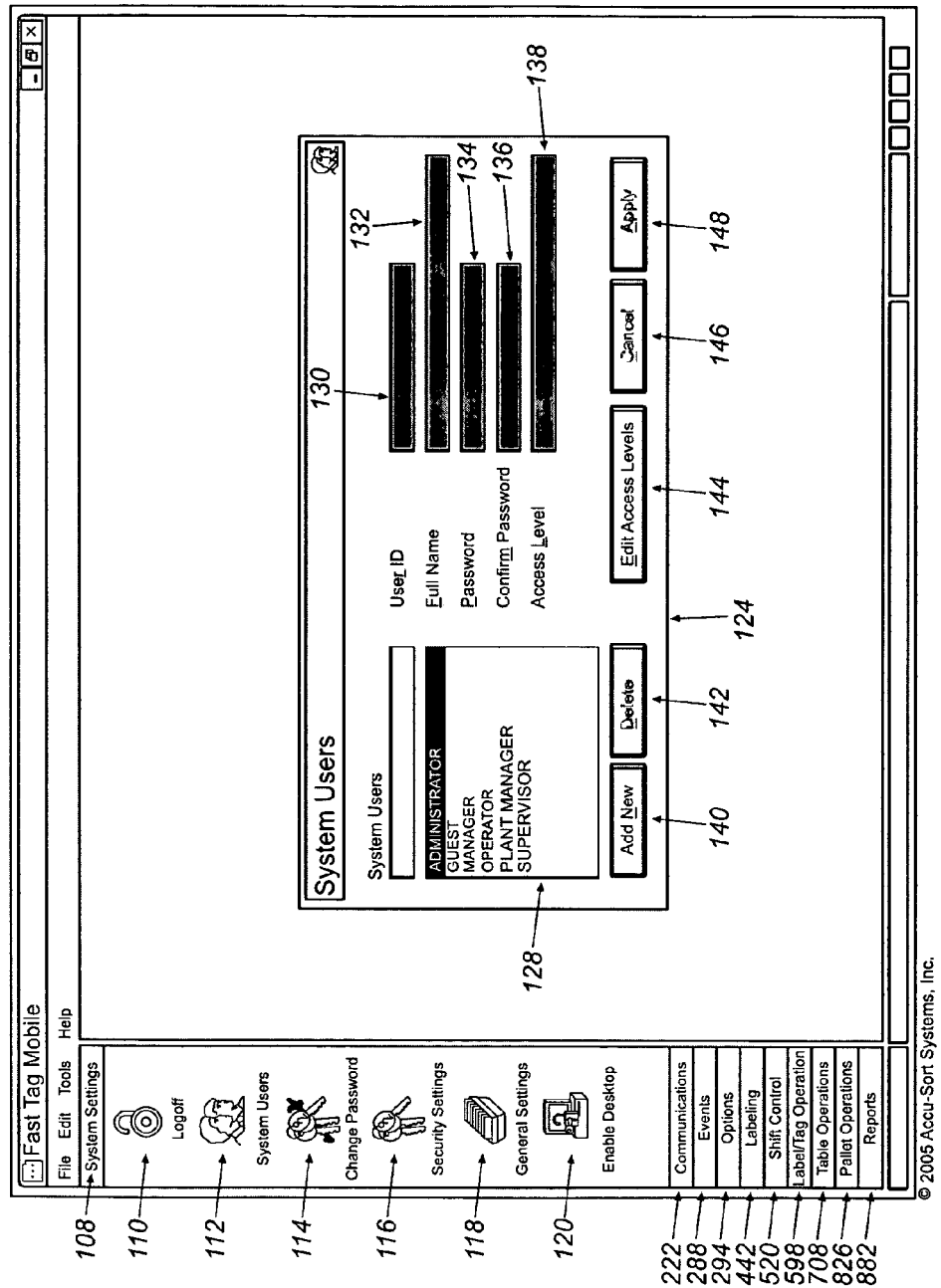
FIG. 7A is a screen display within a software application that controls the mobile labeling system as shown in FIG. 1A.
Figure 7B:
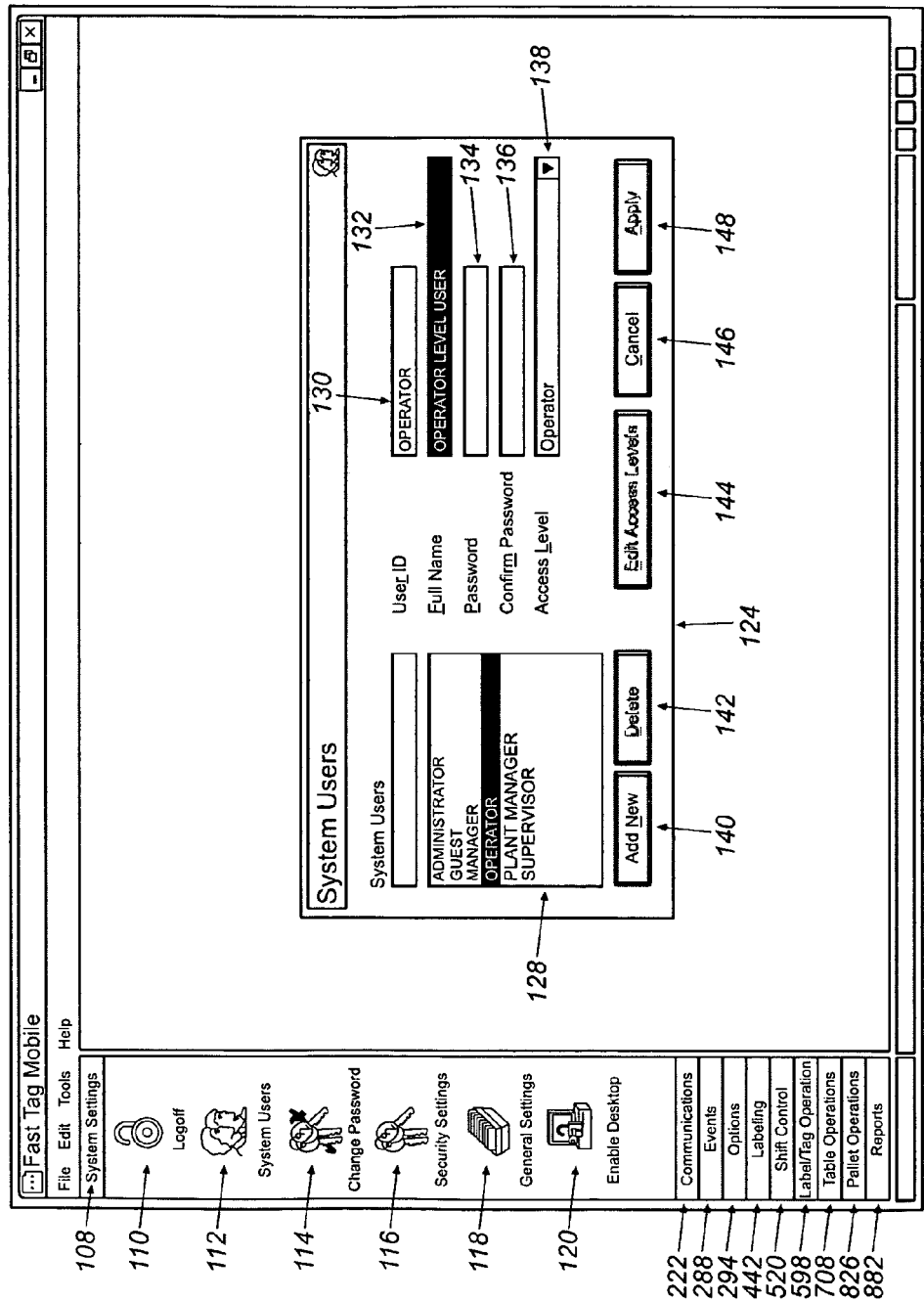
FIG. 7B is a screen display within a software application that controls the mobile labeling system as shown in FIG. 1A.

Referring to FIG. 7A, if the User ID is associated in User table 62 within database 54 (FIG. 3B) with sufficient authority, activation of a System Users button 112 in panel 108 causes the application to display a screen 124 through which the user can add, modify, or delete system users from table 62. Using mouse 18 or touch screen 14, the user may click onto a System Users box 124, which is populated by an alphabetically ordered listing of User IDs through which the user may scroll using the up and down buttons of keyboard 16 or touch screen keyboard 406. Now referring to FIG. 7B, as the user highlights a User ID, the selected user's information stored in User table 62 is displayed on the right hand side of screen 124 in boxes 130, 132, 134 and 136 and a drop-down box 138. When updating a user's information, box 130 is a protected textbox and does not allow the current user to change the User ID of the selected user. The current user may, however, change the other information associated with the selected user, including the user's security level displayed in a drop-down box 138. Pressing a Cancel button 146 cancels any changes made and removes the selected user's information from the boxes, returning control of the application to System Users box 124. Alternatively, pressing an Apply button 148 updates User table 62 with the new or modified information entered in textboxes 132, 134 and 136 and drop-down box 138. Pressing a Delete button 142 removes the selected user from table 62.

Activation of an Add New button 140 allows the user to add additional users to the system through entry of appropriate user information in boxes 130, 132, 134 and 136 and drop-down box 138. The user may select each box as desired and type in the appropriate information through keyboard 16 or touch screen keyboard 406. The new user's security level is assigned through selection of drop-down box 138 in the same manner described above. The current user can display and select the security level to be associated with the new user by highlighting the desired security level using mouse 18 or touch screen 14. Apply button 148 adds the new user data to User table 62 within database 54.

Figure 8:
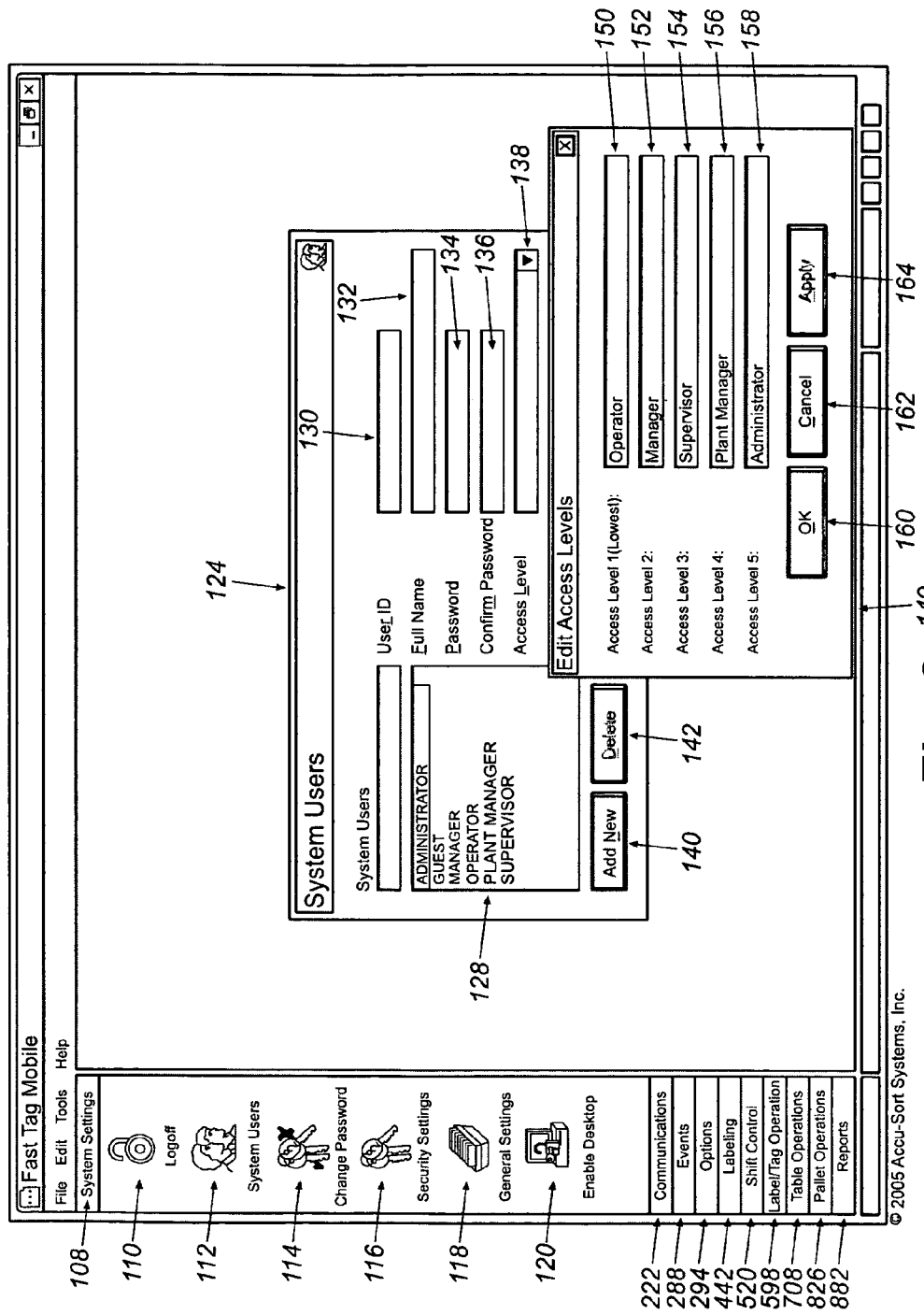
FIG. 8 is a screen display within a software application that controls the mobile labeling system as shown in FIG. 1A.

Activation of an Edit Access Levels button 144 displays a screen 149 as shown in FIG. 8, which displays the available access levels and their corresponding labels. The current user may change the labels associated with each access level using screen 149. Access Level 1 is the lowest security level, while Access Level 5 is the highest. After selecting a desired box from boxes 150, 152, 154, 156 or 158 in screen 149, the current user may modify the access level descriptor through keyboard 16 or touch screen keyboard 406. The current user may modify any label and reflect these changes in database 54 by using touch screen 14 or mouse 16 to select an OK button 160 or an Apply button 164. Selecting a Cancel button 162 discards any modifications the user may have made. Selecting OK button 160, Cancel button 162, or Apply button 164 returns the user to System Users screen 124.

Figure 9:
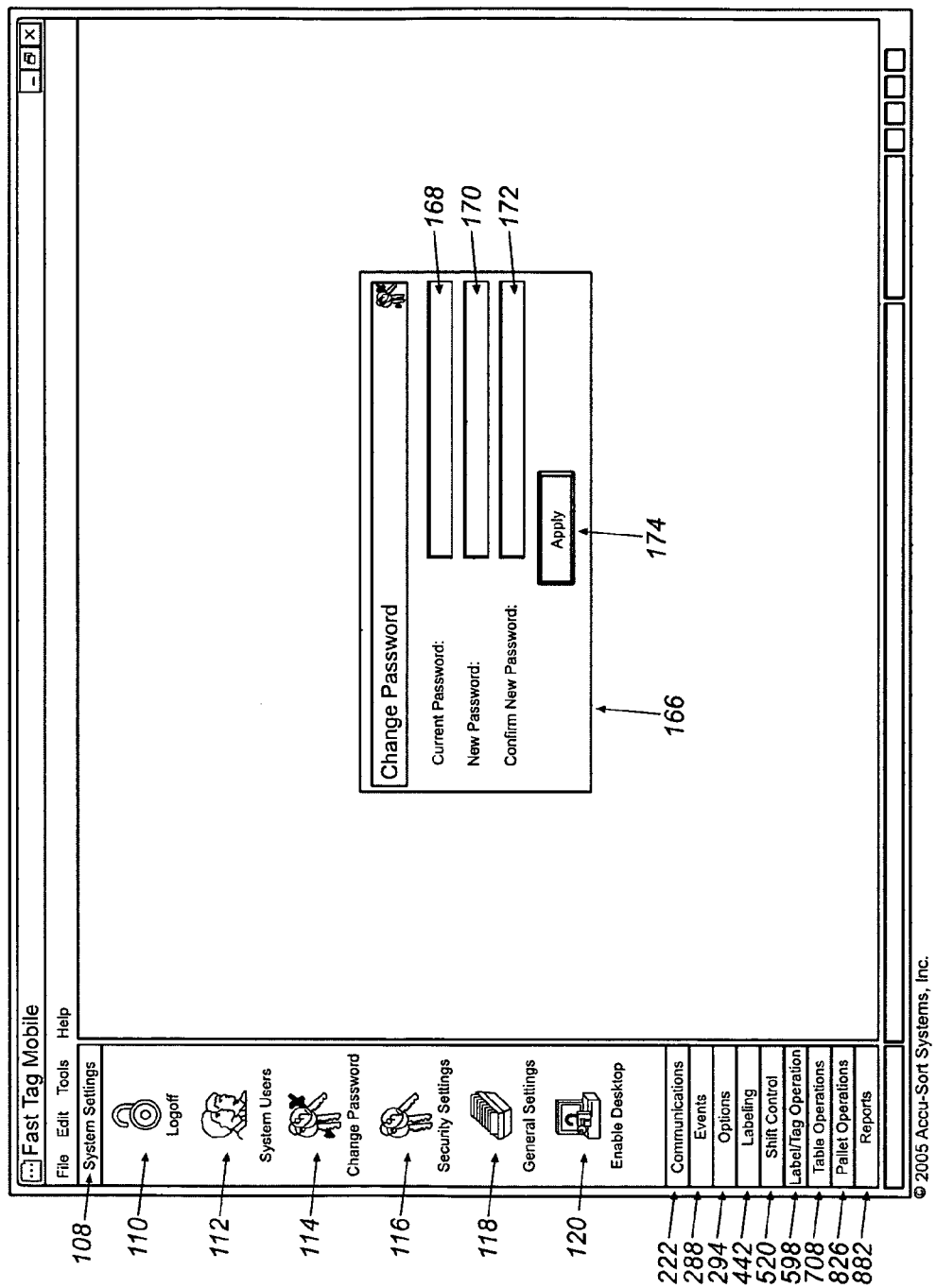
FIG. 9 is a screen display within a software application that controls the mobile labeling system as shown in FIG. 1A.

Activation of a Change Password button 114 in panel 108 causes the application to present a screen 166, as shown in FIG. 9, through which the user may change his or her password. When the user selects an Apply button 174, the alphanumeric text in a Current Password textbox 168 is compared to the current user's password stored in User database table 62. If they match, alphanumeric text in a New Password textbox 170 is compared to the alphanumeric text in a Confirm New Password textbox 172. If they match, the application updates table 62 to reflect the current user's new password information. If either the text in textbox 168 does not match the current user's current password or the text in textboxes 170 and 172 do not match, the user is given an error and asked to retry.

Figure 10A:
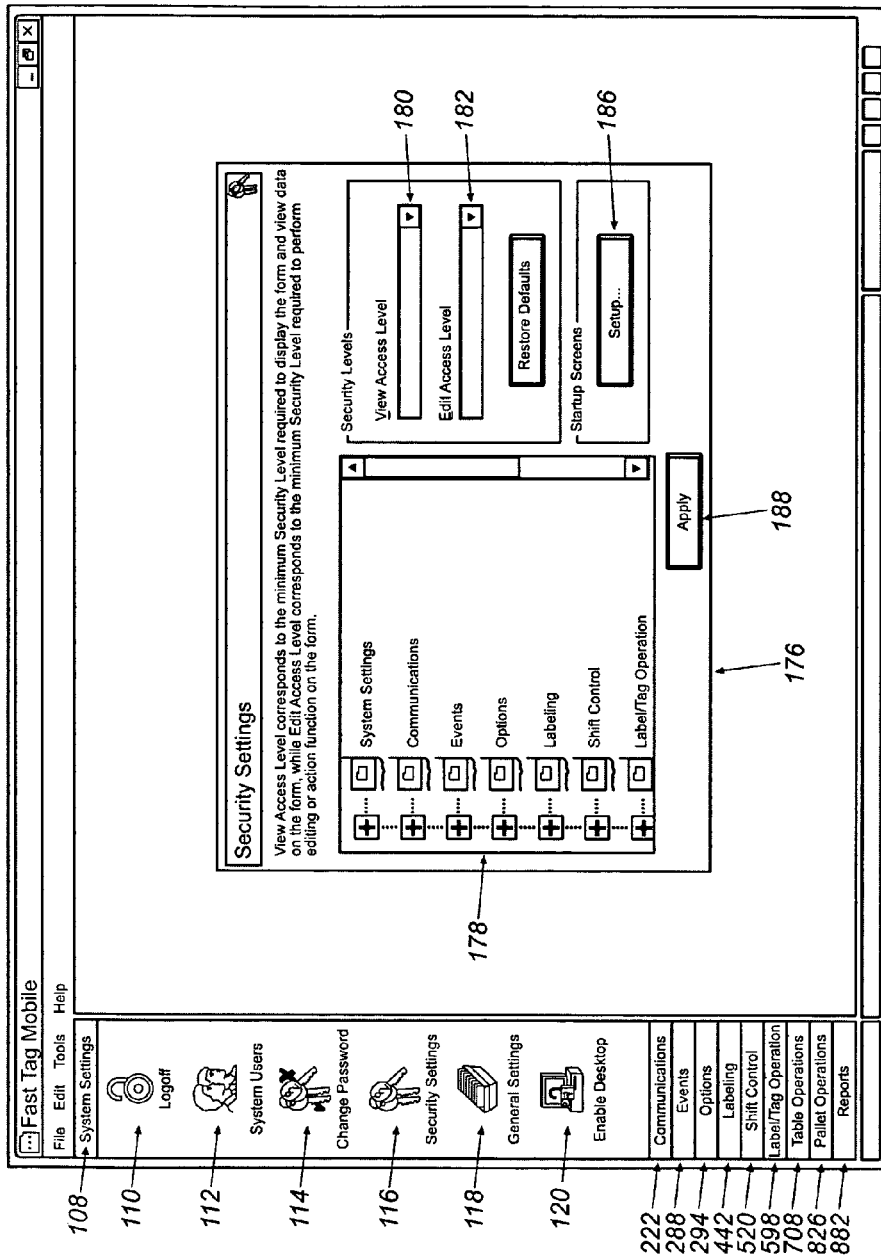
FIG. 10A is a screen display within a software application that controls the mobile labeling system as shown in FIG. 1A.
Figure 10B:
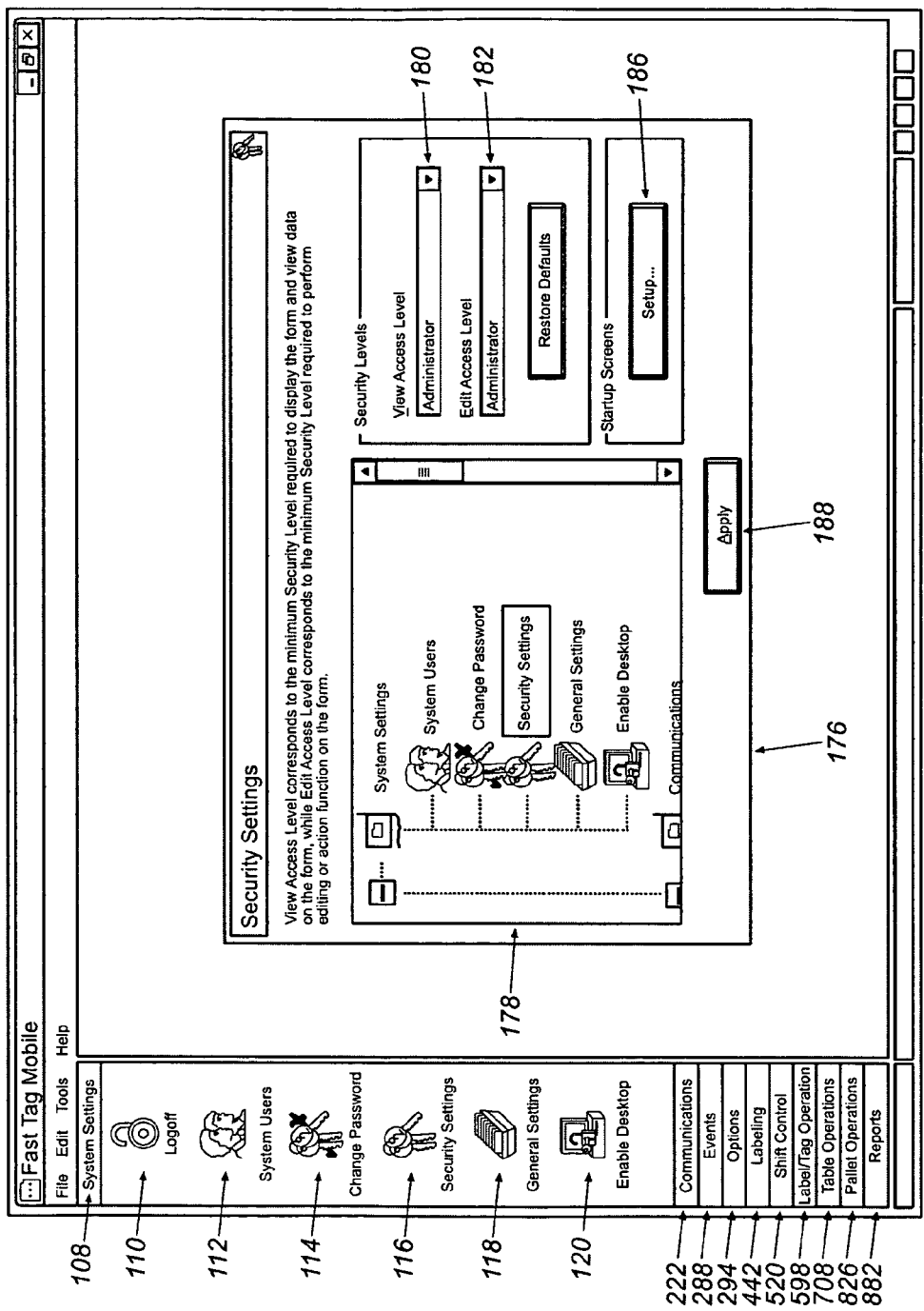
FIG. 10B is a screen display within a software application that controls the mobile labeling system as shown in FIG. 1A.
Figure 10C:
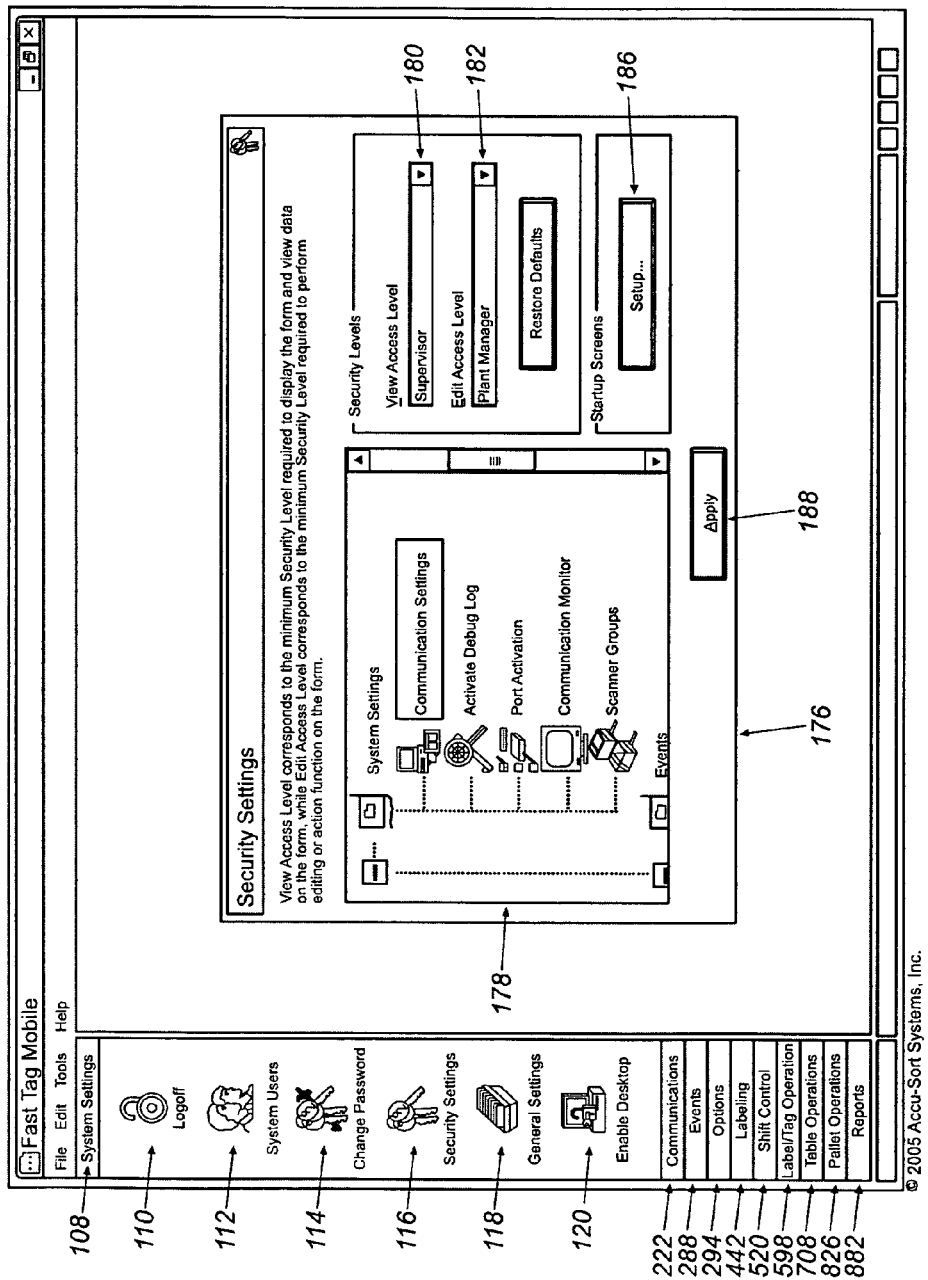
FIG. 10C is a screen display within a software application that controls the mobile labeling system as shown in FIG. 1A.

Activation of a Security Settings button 116 in panel 108 causes the application to present a screen 176 as shown in FIG. 10A. Screen 176 displays a tree-style hierarchy of the panels described herein in a selection box 178. Each panel identification may be expanded to display the buttons available in the panel, as shown in FIGS. 10B and 10C. For each button, the user may assign a "view access level" and an "edit access level" by activation of drop-down boxes 180 and 182, respectively. Each box contains a drop-down list of the access levels labeled in boxes 150, 152, 154, 156 and 158 of screen 149 (FIG. 8). Referring to FIGS. 10B and 10C, selection of the access level in drop-down box 180 defines the level of user that will be permitted to view the screen associated with the selected button. Selection of an access level in drop-down box 182 defines the level of user who will be able to edit information presented in the screen associated with the selected button. A user categorized in a specific access level has all the security associated with that and any subordinate access level. Referring to FIG. 10B, for example, only users with the access level of Administrator (as shown in box 158 of screen 149 in FIG. 8) have the required access level security to both view and edit information displayed on Security Settings screen 176. Referring to FIG. 10C, for example, users with the access level of Plant Manager (as shown in box 156 of screen 149 in FIG. 8) are able to edit the Communication Settings (described below), but users with the access level of Supervisor are only able to view the Communication Settings. Activation of an Apply button 188 sends and stores this security information in database 54.

Figure 10D:
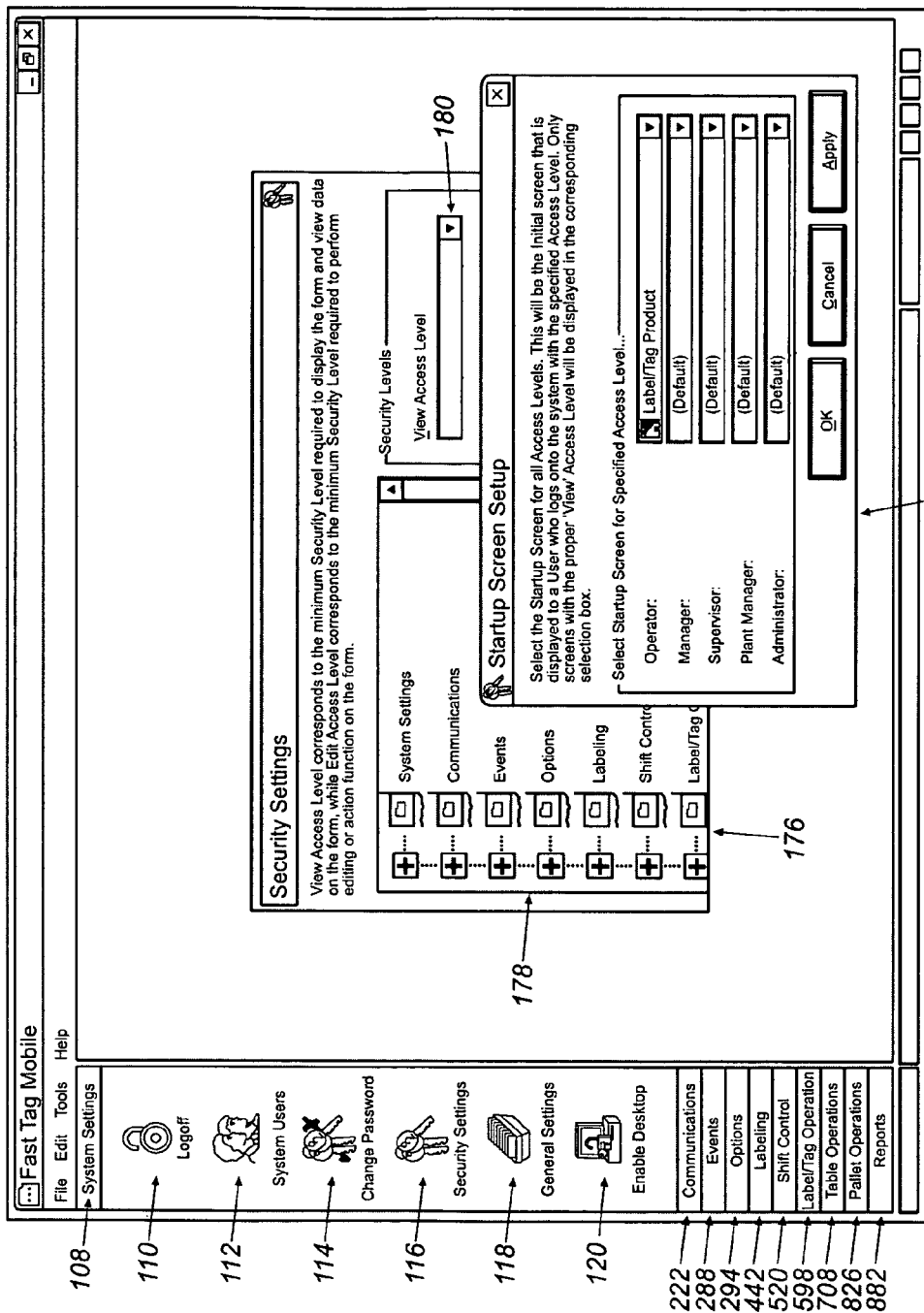
FIG. 10D is a screen display within a software application that controls the mobile labeling system as shown in FIG. 1A.

Activation of a Setup button 186 causes the application to display a screen 189 (FIG. 10D), through which the user may select a startup screen that will be presented at startup to each user having a given access level. For example, as shown in FIG. 10D, users having the access level of Operator immediately proceed to a Label/Tag Product screen 654 (FIG. 29A), described below.

Figure 11:
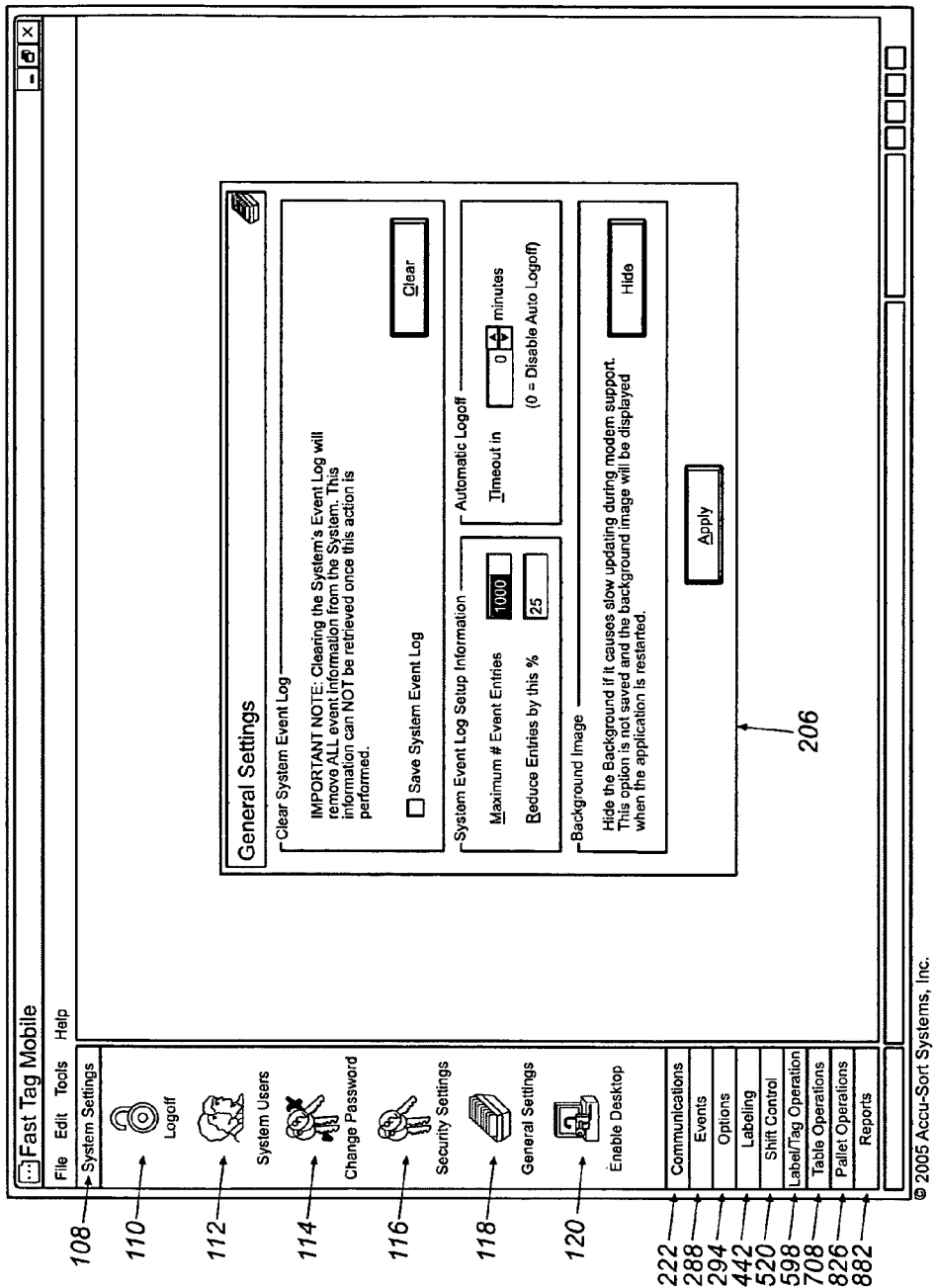
FIG. 11 is a screen display within a software application that controls the mobile labeling system as shown in FIG. 1A.

Activation of a General Settings button 118 causes the application to present a screen 206, as shown in FIG. 11, through which the user may modify options corresponding to a system event log in which the application notes and stores each application event in database 52 (FIG. 3B). In the presently described embodiment, database 52 is a MICROSOFT ACCESS DATABASE but can be any suitable data structure. In the presently described embodiment, database 52 is less expensive and requires less overhead than database 54 but is slower and less efficient. Though a slower and less efficient database may be used to retain system data to which immediate access is not required, such as the event log, it should be noted that this information can also be stored in database 54 if so desired and that databases 54 and 52 can be consolidated to a single database. Screen 206 allows the present user to save the log to another file, clear the log, limit the maximum number of events saved, and limit the maximum number of saved events. The user may also set a specific amount of time after which the application will automatically log the current user off of the system if there is no interaction with the application. This information is specific to a station, such as mobile unit 10, and is therefore stored in registry 48 on PC 12 (FIG. 3B). Screen 206 also allows the present user to hide the application's background, which may increase application performance.

In one preferred embodiment, PC 12 may be configured to display only the application, thereby limiting access to other programs running on the PC, including the WINDOWS operating system. Activation of an Enable Desktop button 120 allows the current user to restore access to such programs and the operating system.

Figure 12A:
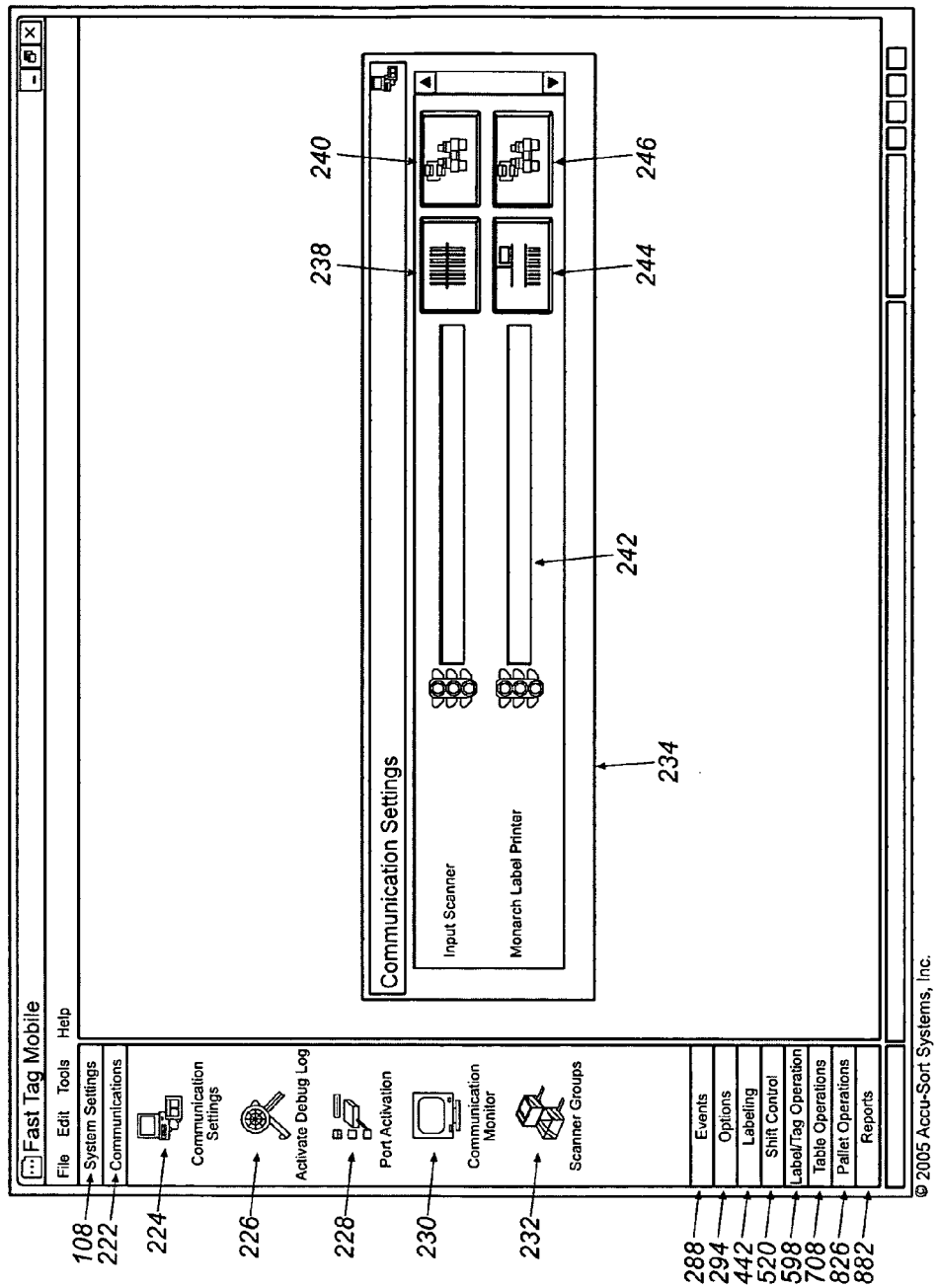
FIG. 12A is a screen display within a software application that controls the mobile labeling system as shown in FIG. 1A.

Activation of a Communications panel 222 presents a series of buttons 224, 226, 228, 230 and 232, as shown in FIG. 12A. Activation of a Communication Settings button 224 presents a screen 234, through which the user may set up and configure barcode scanner 22 and RFID printer 20 (FIGS. 1-3) and their associated connections to PC 12. The user may configure multiple barcode scanners and RFID printers. Information for each scanner and printer is stored in registry 48 on PC 12 (FIG. 3B).

Figure 12B:
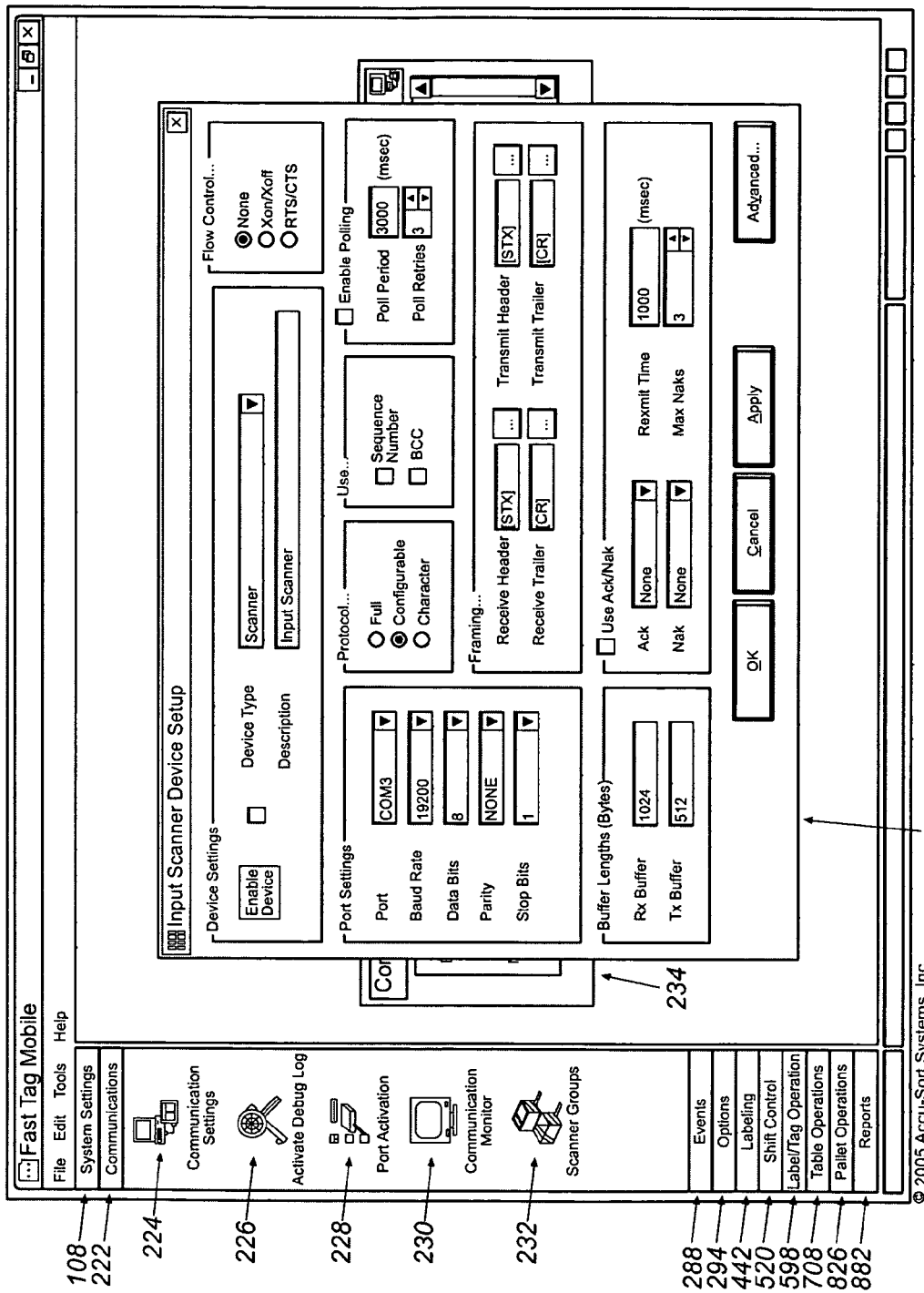
FIG. 12B is a screen display within a software application that controls the mobile labeling system as shown in FIG. 1A.
Figure 12C:
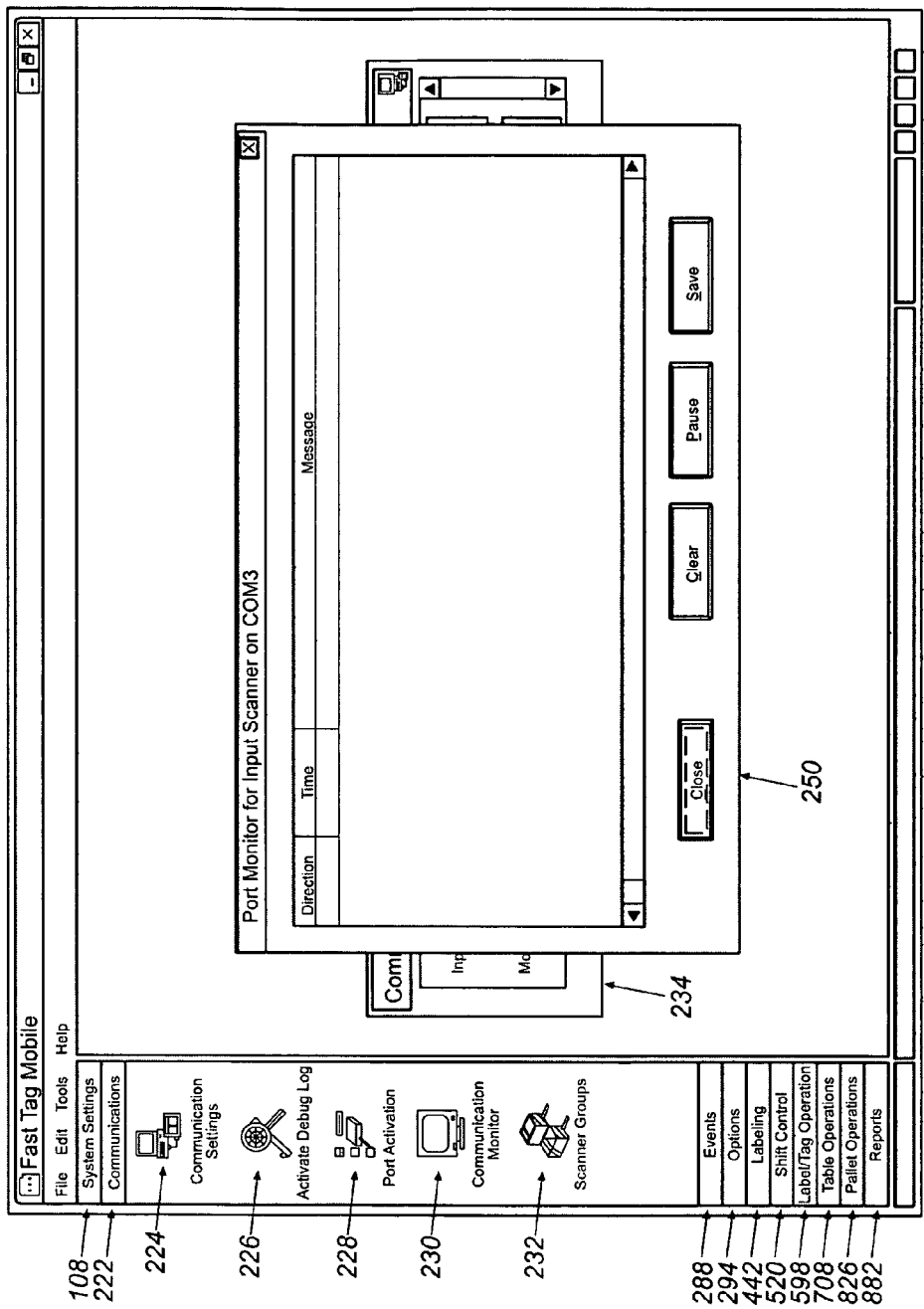
FIG. 12C is a screen display within a software application that controls the mobile labeling system as shown in FIG. 1A.

In setting up a barcode scanner, activation of a button 238 displays a screen 248, shown in FIG. 12B, through which the user configures the barcode scanner, its connection settings (including port configuration), and other information associated with the scanner. This information is stored in registry 48. Activation of a button 240 displays a screen 250, as shown in FIG. 12C, through which the user may monitor the port associated with the barcode scanner and any data passing through that port.

Figure 12D:
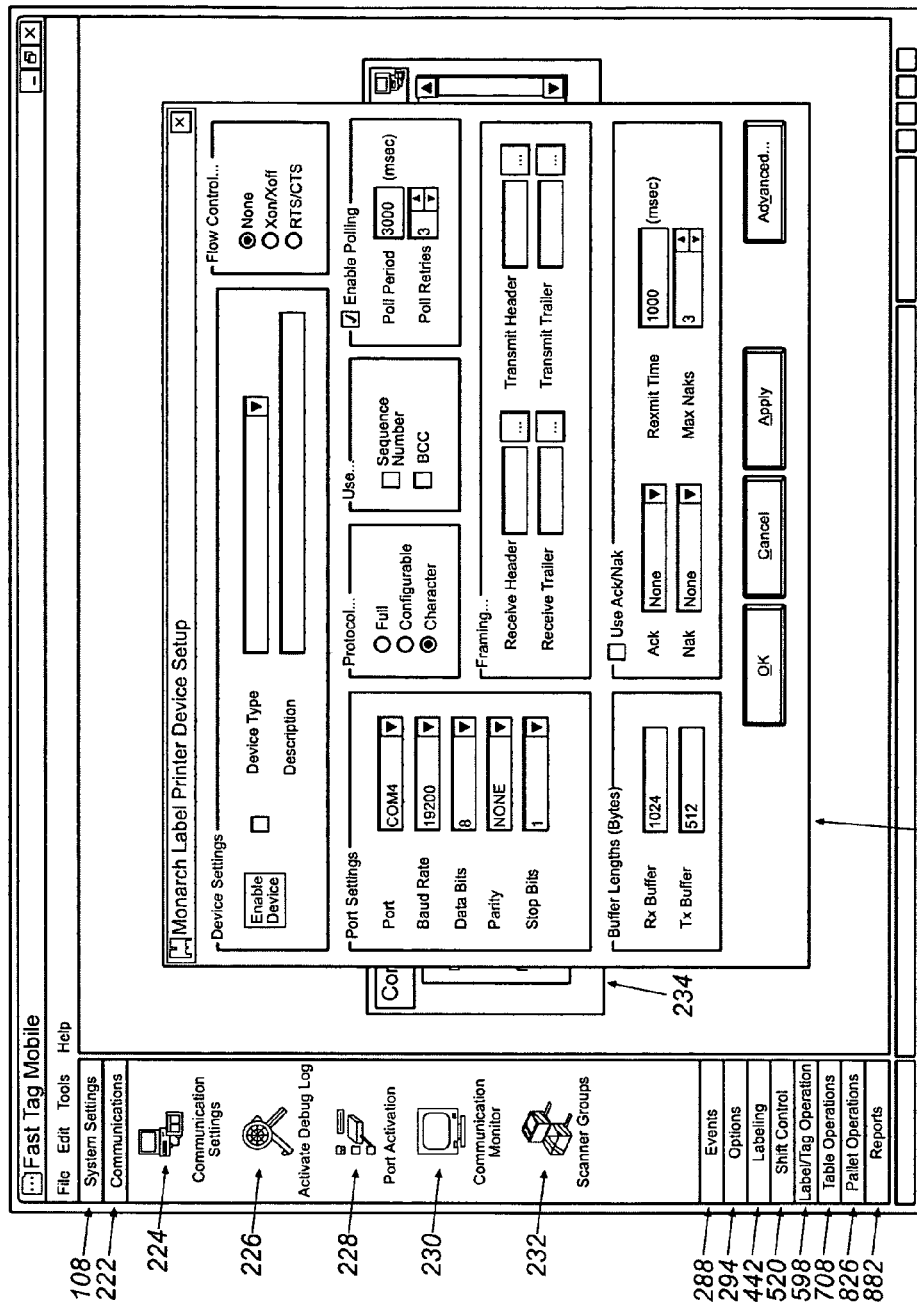
FIG. 12D is a screen display within a software application that controls the mobile labeling system as shown in FIG. 1A.
Figure 12E:
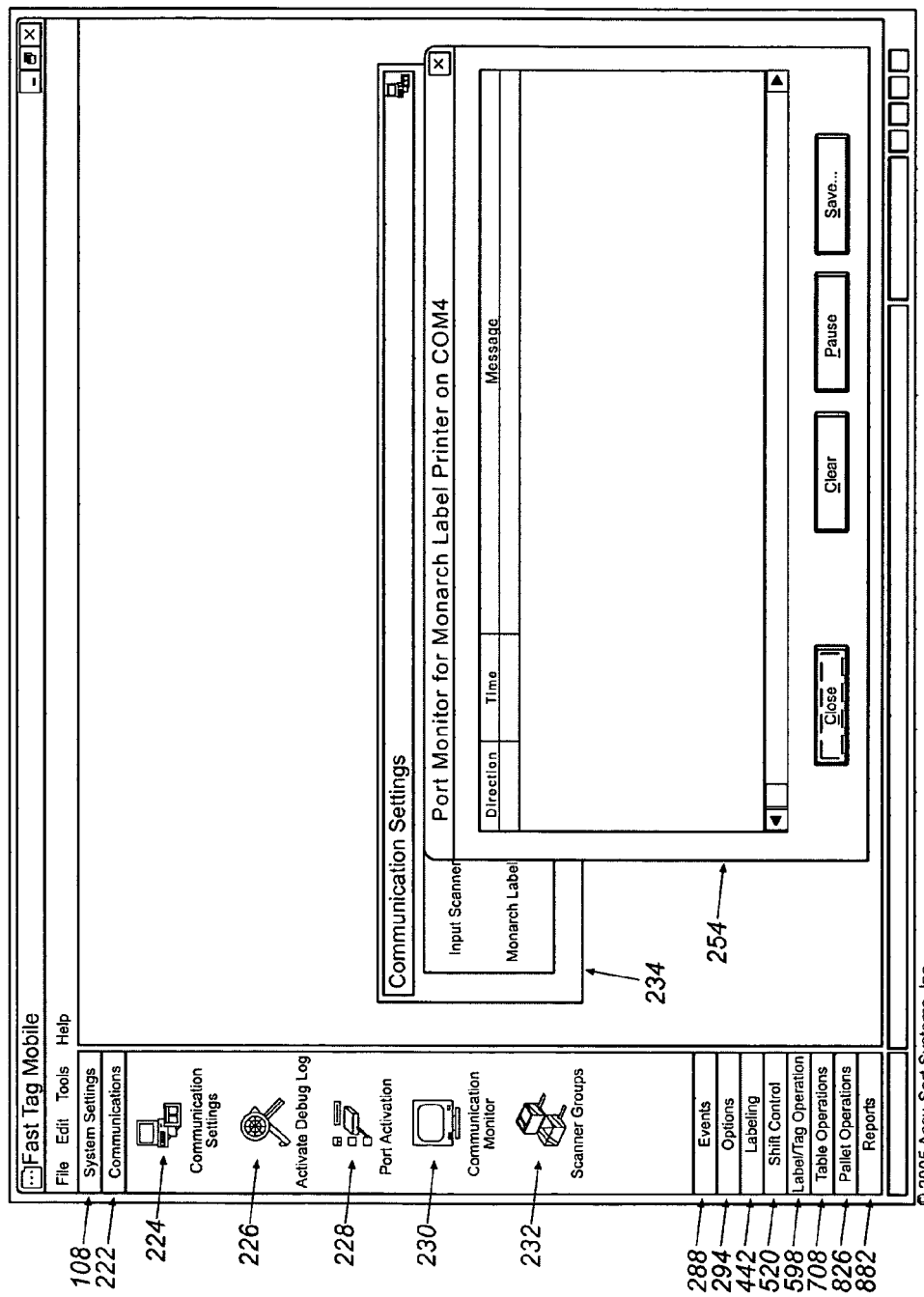
FIG. 12E is a screen display within a software application that controls the mobile labeling system as shown in FIG. 1A.

Returning to FIG. 12A, activation of a button 244 displays a screen 252, as shown in FIG. 12D, through which the user may configure RFID printer 20, its connection settings (including port configuration), and other information associated with the printer. This information is also stored in registry 48. Activation of a button 246 displays a screen 254, as shown in FIG. 12E, through which the user may monitor the port associated with the RFID printer and any data passing through that port.

Activation of an Activate Debug Log button 226 causes the application to create a log file of each communication enacted upon by the application. The log file is stored as part of files 50 on PC 12 (FIG. 3B) or in databases 52 or 54. When button 226 is activated, its graphic and title change to "Deactivate Debug Log," and the application thereafter stores each serial message until the user activates button 226 a second time, returning the button to its "Activate Debug Log" title.

Figure 13:
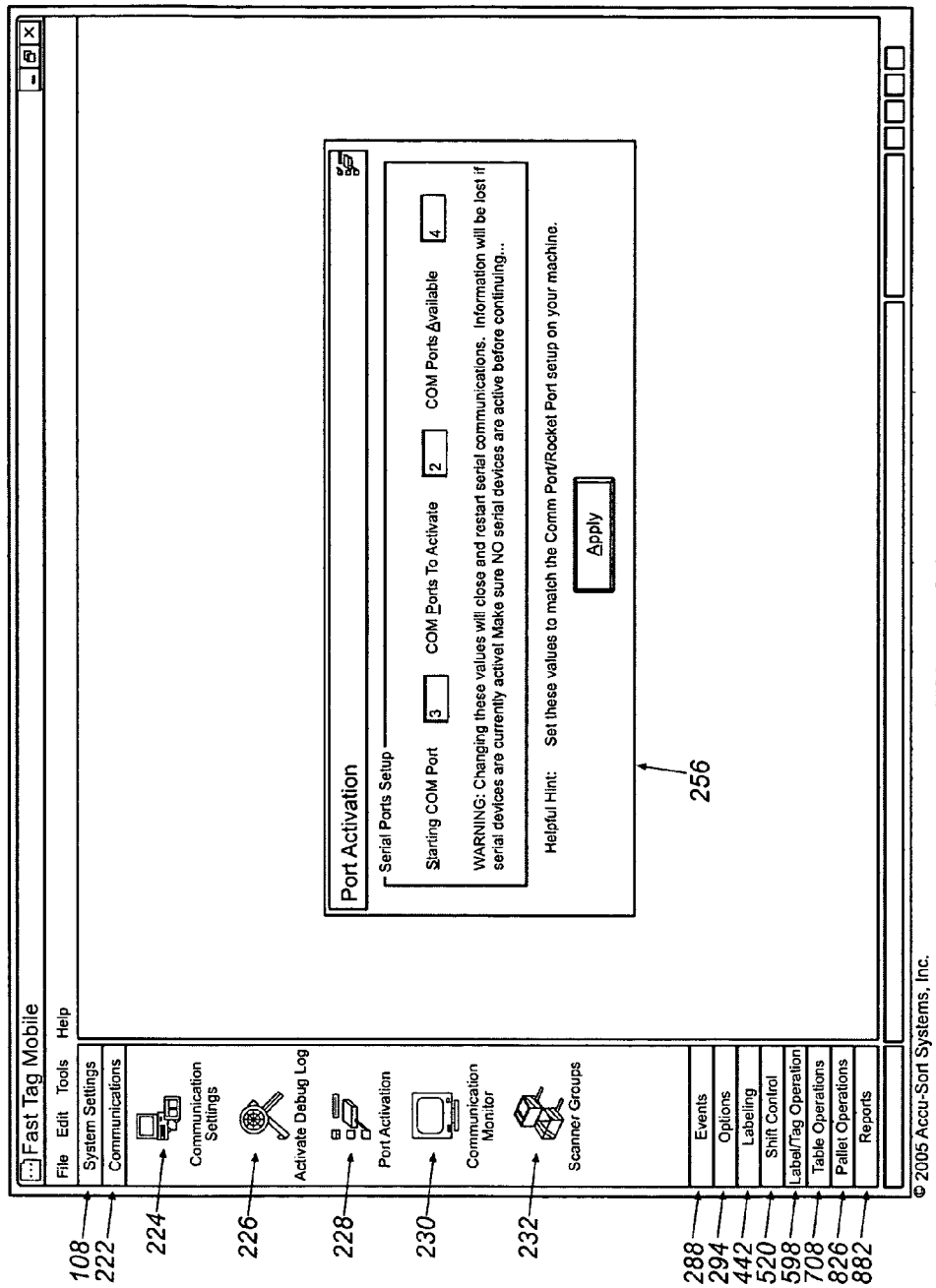
FIG. 13 is a screen display within a software application that controls the mobile labeling system as shown in FIG. 1A.

Activation of a Port Activation button 228 displays a Port Activation screen 256, as shown in FIG. 13, through which the user specifies the number of available activatable ports of PC 12. This information is stored in registry 48 (FIG. 3B).

Figure 14:
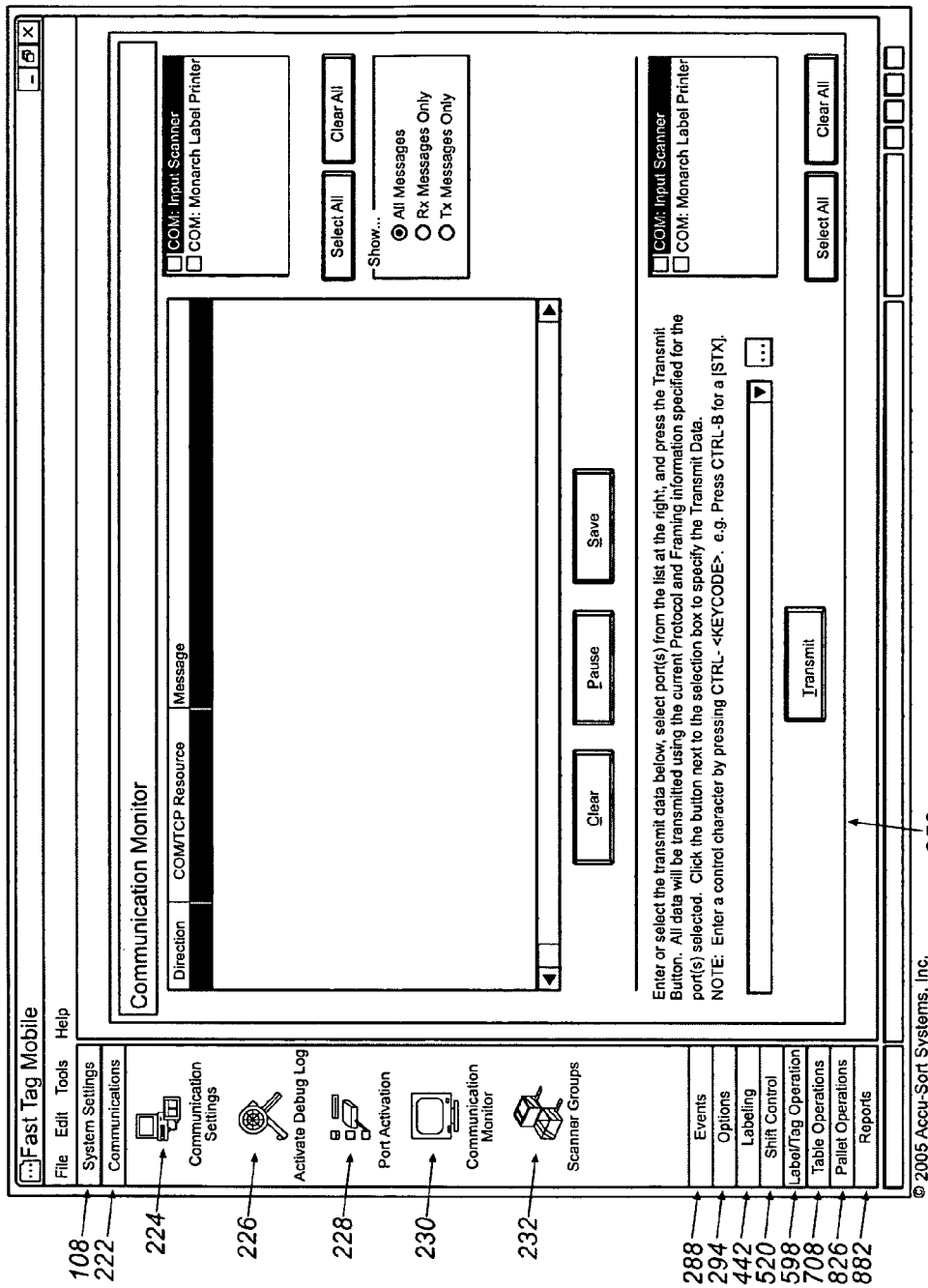
FIG. 14 is a screen display within a software application that controls the mobile labeling system as shown in FIG. 1A.

Activation of a Communication Monitor button 230 displays a screen 258, as shown in FIG. 14, that allows the user to view real-time communications between computer 12 and any external devices connected to the computer, such as barcode scanner 22 and RFID printer 20.

Figure 15:
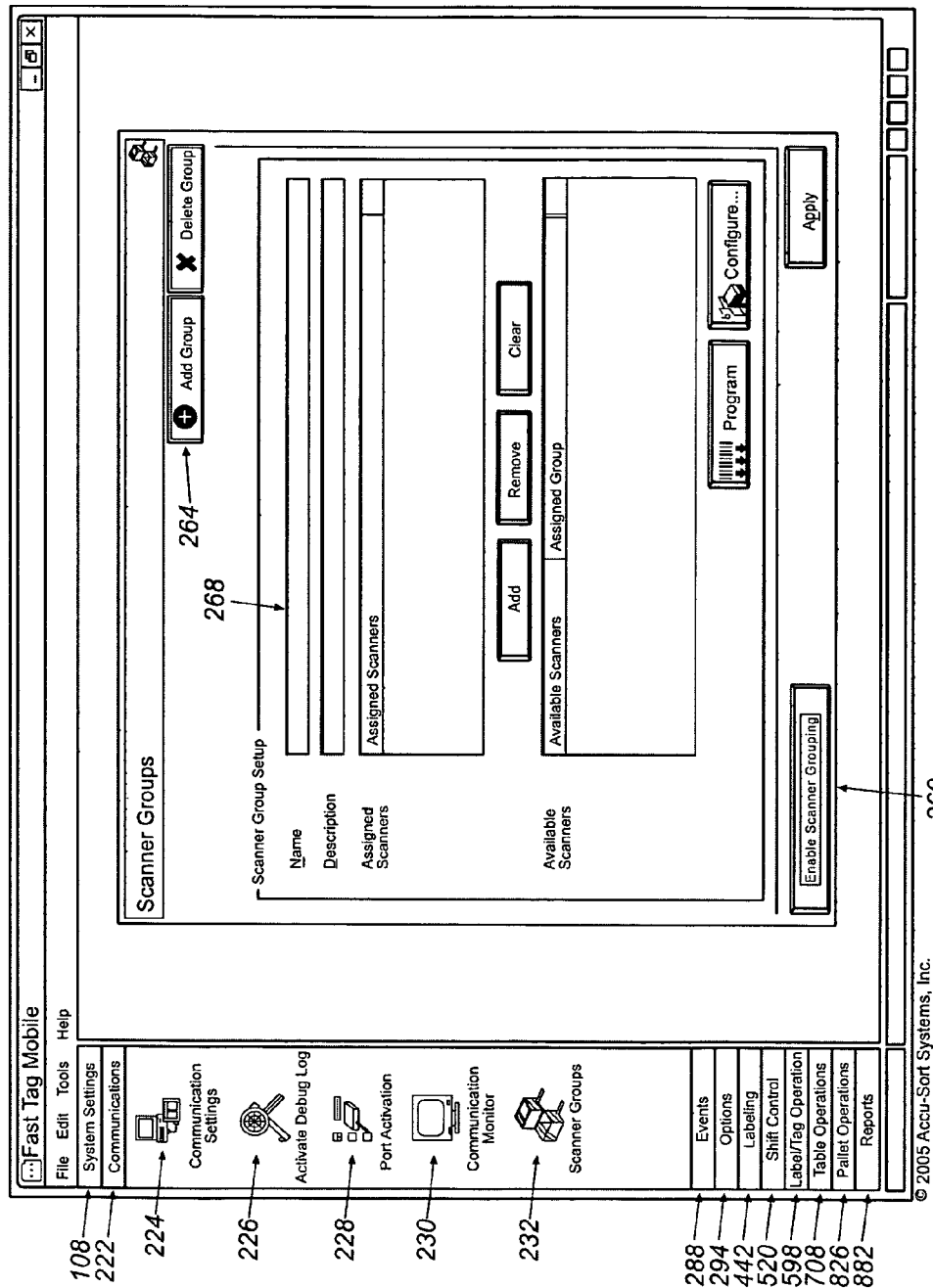
FIG. 15 is a screen display within a software application that controls the mobile labeling system as shown in FIG. 1A.

Activation of a Scanner Groups button 232 displays a Scanner Groups screen 260, as shown in FIG. 15, through which the user may enable barcode scanner grouping. Scanner grouping allows the user to group barcode scanner 22 and any other available scanners into respective groups, such that input from any scanner in the group is treated as incoming from the same scanner. Scanner information, along with scanner grouping information, is stored in registry 48.

Figure 16:
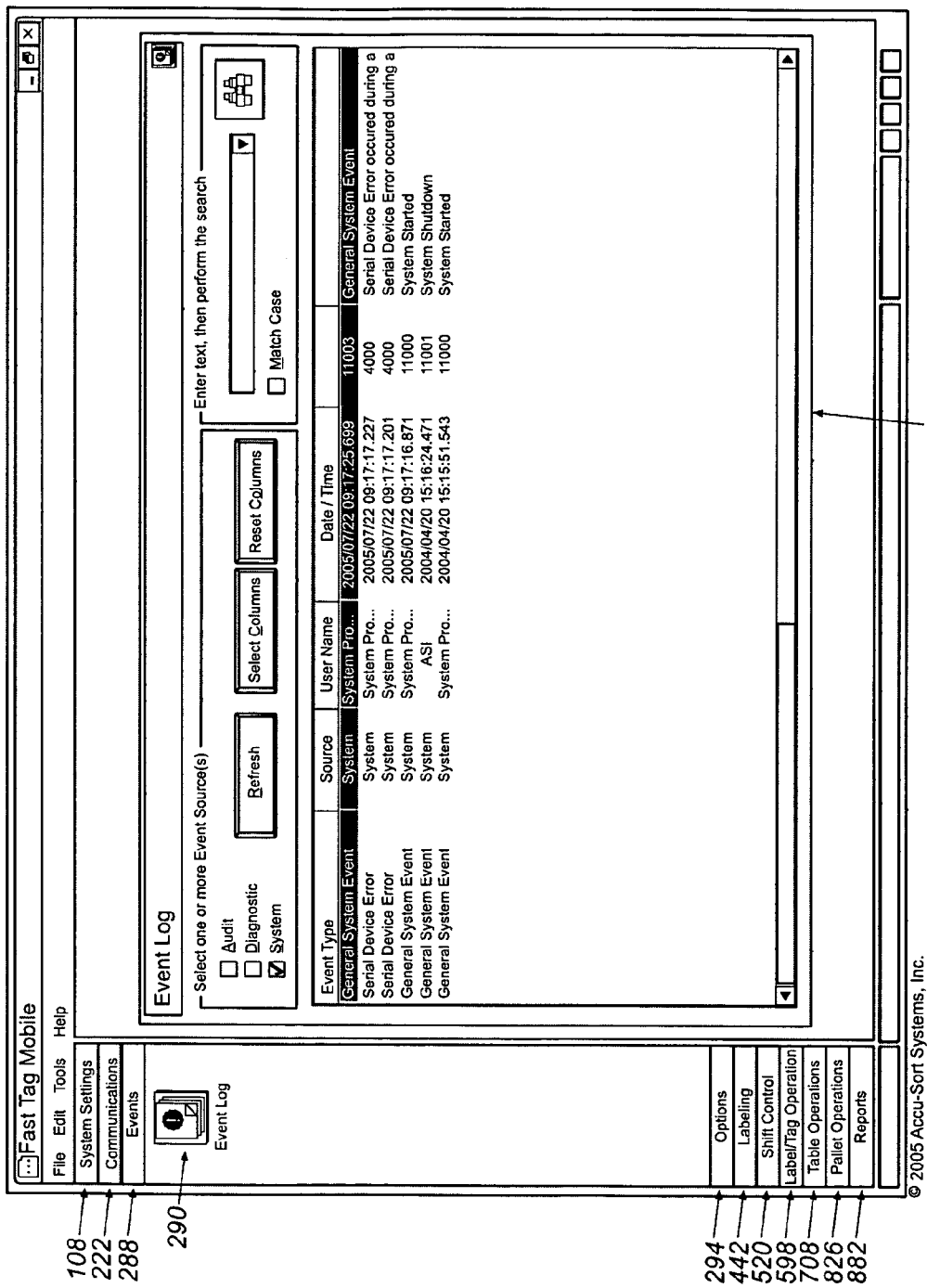
FIG. 16 is a screen display within a software application that controls the mobile labeling system as shown in FIG. 1A.

Activation of an Events panel 288 displays an Event Log button 290, as shown in FIG. 16. Activation of button 290 displays a screen 292 listing all events previously logged by the application, including any associated errors. The event information is stored in database 52. The event log stored in database 52 is distinct from the debug log stored in files 50. Each error the application detects with an external device, whether it be RFID printer 20, or scanner 22, is written to the event log stored in database 52. Alternately, every communication message executed by the application is written to the debug log stored in files 50.

Figure 17:
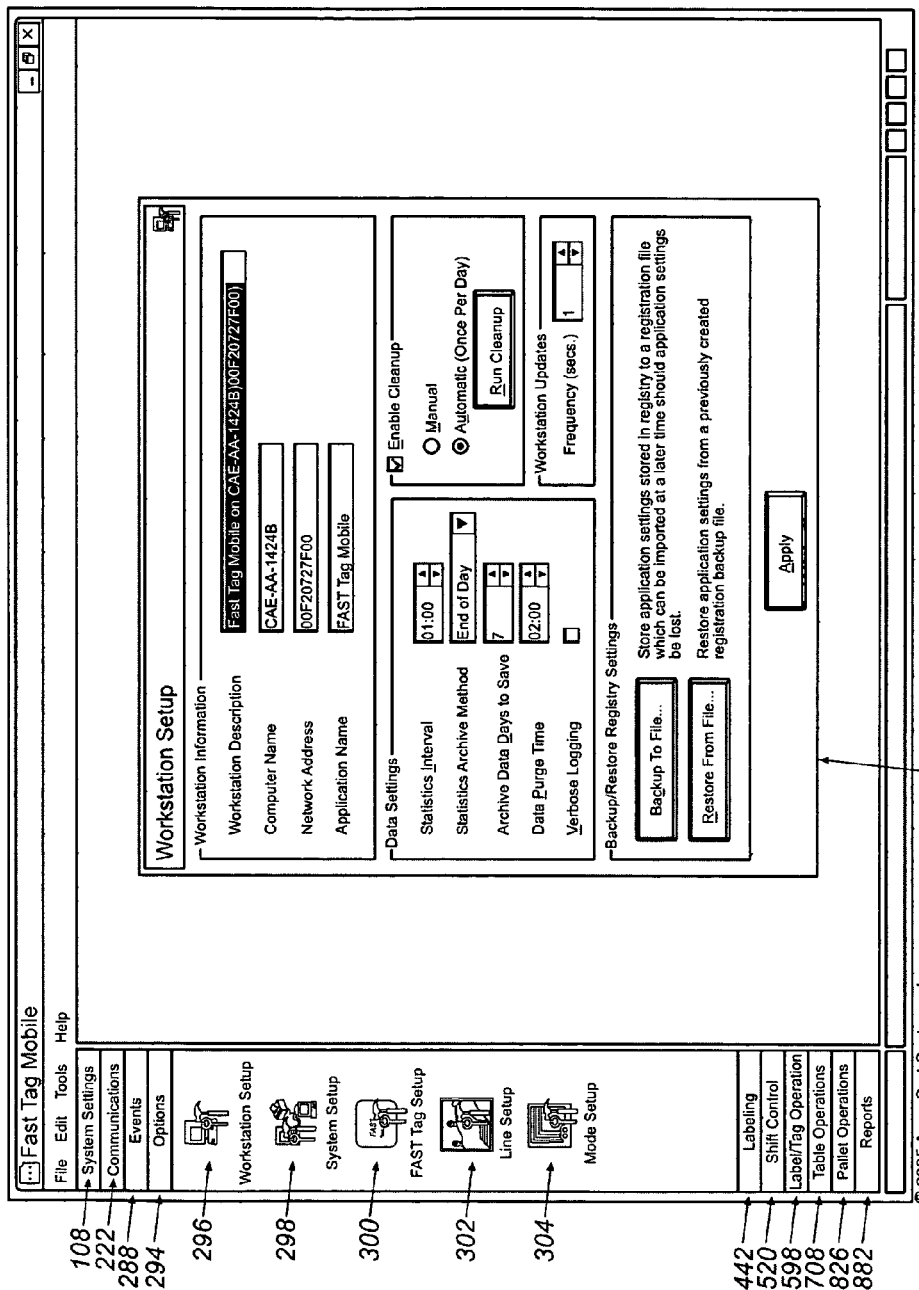
FIG. 17 is a screen display within a software application that controls the mobile labeling system as shown in FIG. 1A.

Activation of an Options panel 294 displays buttons 296, 298, 300, 302 and 304, as shown in FIG. 17. Activation of a Workstation Setup button 296 displays a screen 306 listing setup information regarding PC 12 and allowing the user to modify certain settings corresponding to the computer. Information relating to PC 12 is stored in registry 48. Through screen 306, the user may back up registry 48 to a file or restore the registry from a file. Using screen 306, the user can modify how often statistics are collected by the application, how much statistical history should be saved, and how often these statistics are archived. The application stores this information in database 52.

Figure 18:
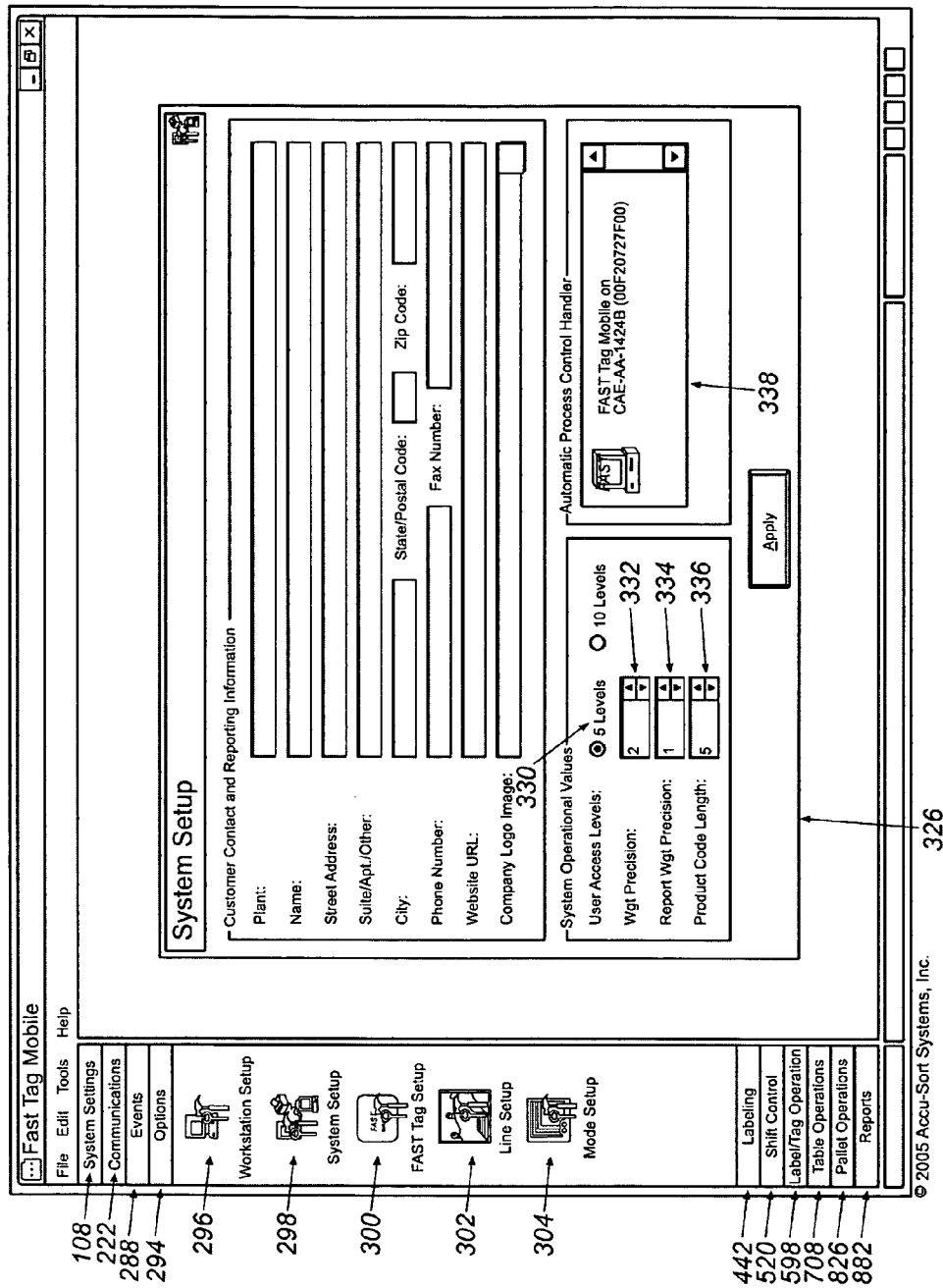
FIG. 18 is a screen display within a software application that controls the mobile labeling system as shown in FIG. 1A.

Activation of a System Setup button 298 displays a screen 326, as shown in FIG. 18, through which the user enters identification information regarding the entity using mobile unit 10 (FIG. 1A). The user enters general corporate information to database 54 through screen 326. The user can change the number of access levels from five (5) to ten (10) by making a choice at a radio button 330 in screen 326 and can also modify weight precision options, such as how many decimal places should be displayed by the application on screens and on reports relating to product weight by modifying numeric boxes 332 and 334, respectively. The operator can also define the maximum number of characters expected in the UPC product code or UPC-related data in a carton's original barcode label by modifying a numeric box 336. The entity information may be available for reports and/or printing on the carton label 28 (FIGS. 1A and 2A).

Screen 326 also identifies an "Automatic Process Control Handler" ("APCH") computer in a display box 338. The APCH monitors the starting and ending of production shifts, which is described in more detail below. When mobile unit 10 is part of conveyor system 66 (FIG. 4), any computer that is part of conveyor system 66 can be the APCH. When mobile unit 10 (FIGS. 1A & 2) is used independently, PC 12 is the APCH.

Figure 19:
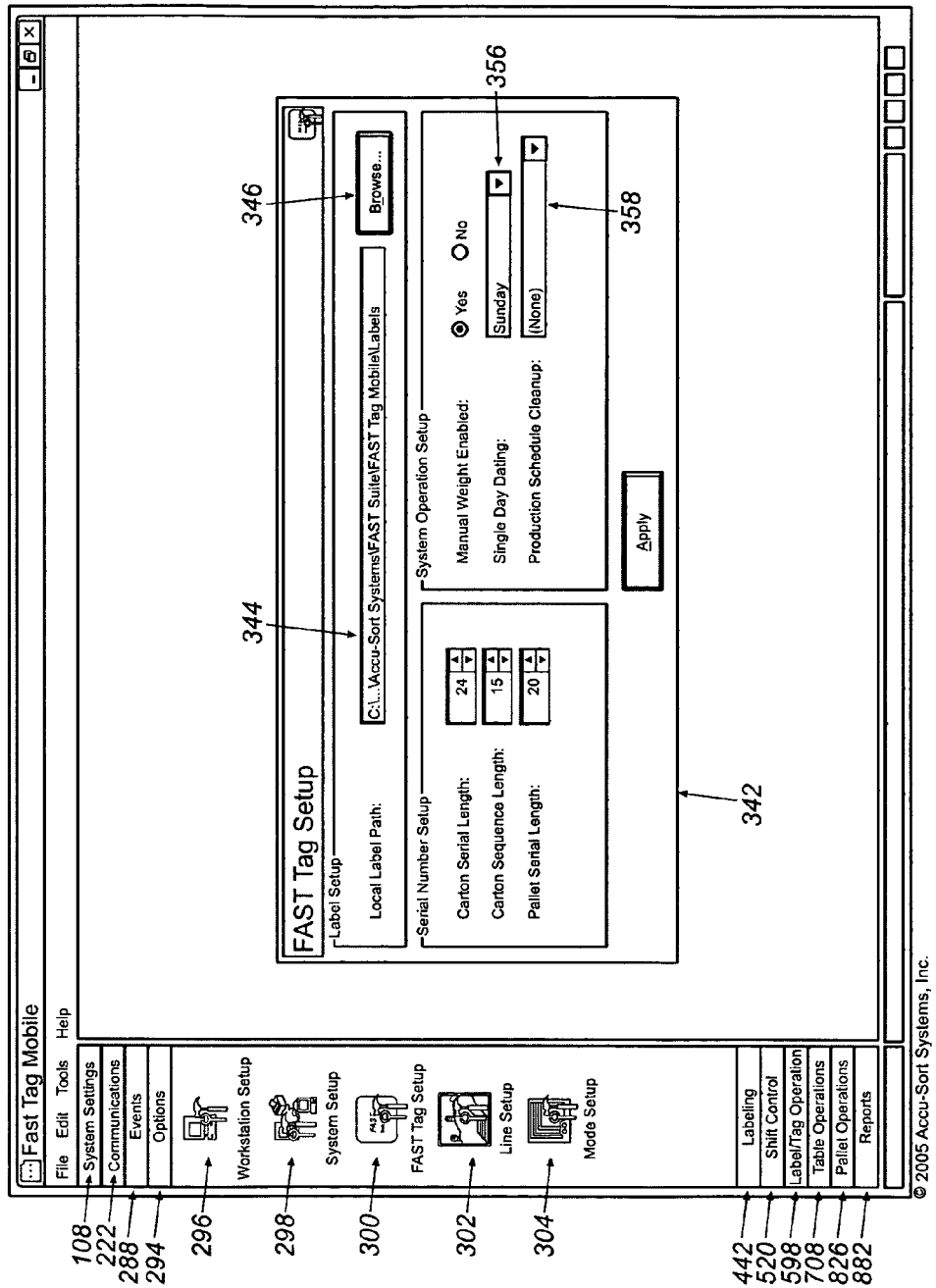
FIG. 19 is a screen display within a software application that controls the mobile labeling system as shown in FIG. 1A.

Activation of a FAST TAG Setup button 300 displays a screen 342, as shown in FIG. 19, through which the user may modify settings regarding labels to be printed by the mobile unit. The user can either enter a file path in a textbox 344 or activate a button 346 to use a WINDOWS file box to locate the file directory on PC 12 wherein label format files are to be located. These format files are part of files 50 and instruct RFID printer 20 how alphanumeric and barcode characters and graphics are to be printed on the label 28. (FIG. 1A). That is, the files define the label format and are used by the application in printing each label.

Serial Number Setup defines characteristics of the carton and pallet serial numbers. As described herein, the system application applies a unique number to each carton and each pallet. Preferably, the application maintains these numbers and increments the applicable number for each sequential carton and pallet. In one preferred embodiment, the carton serial number may include several components desired, for example including the Julian calendar date, the production line number and the carton number (described below). A Manual Weight Enabled button allows the operator to manually enter a package weight if carton weight is maintained in the system. Carton Serial Length defines the number of digits in the carton serial number, whereas Pallet Serial Length defines the number of digits in the pallet serial number. Carton Sequence Length is the number of digits in the carton number.

Figure 27:
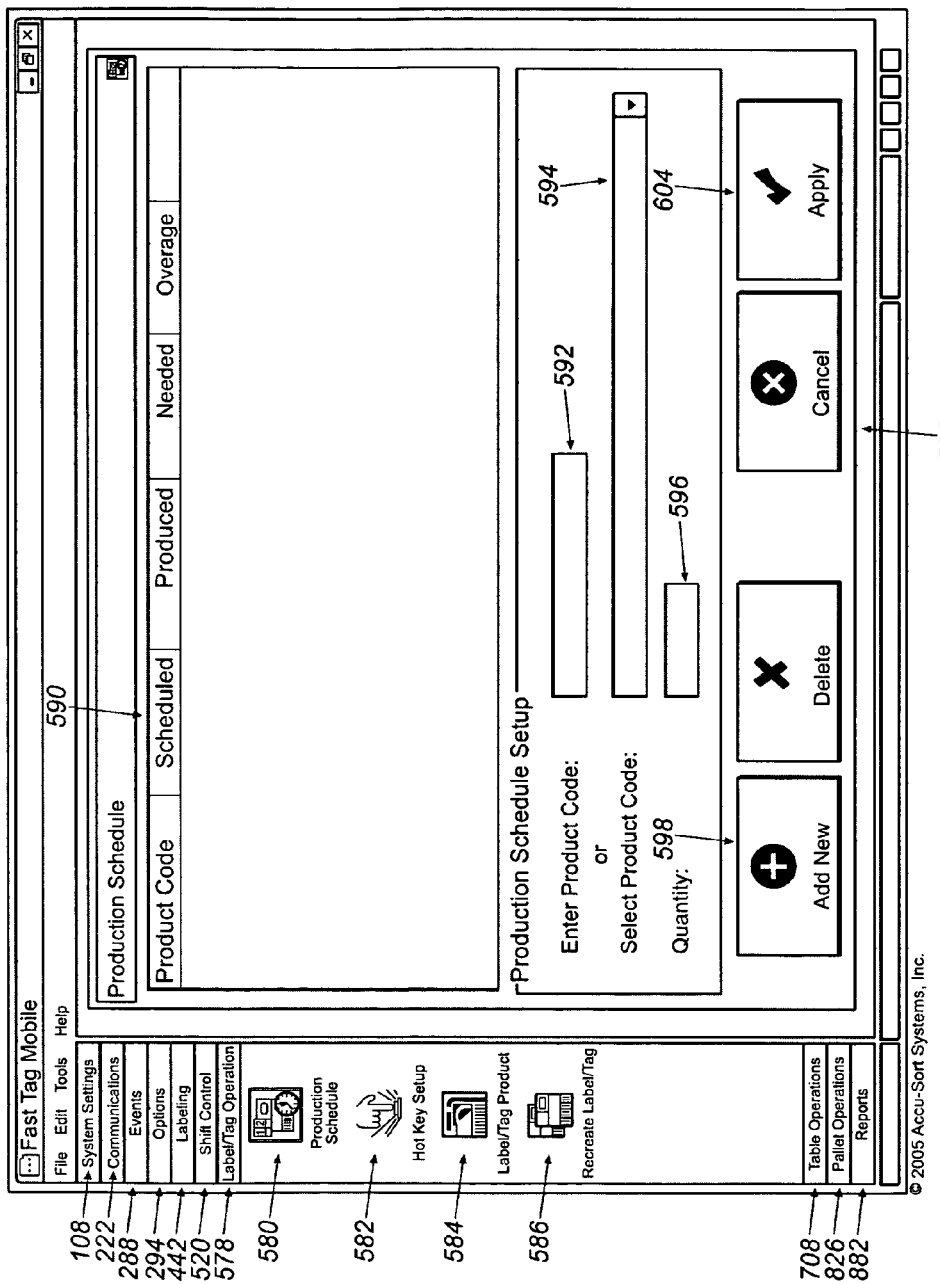
FIG. 27 is a screen display within a software application that controls the mobile labeling system as shown in FIG. 1A.

Under "System Operation Setup," the user can define a Production Schedule Cleanup variable from a pull-down box 358, which relates to a production schedule screen that monitors the number of cartons of a given product type processed by system 10 over a given period of time. Referring also to FIG. 27, activation of a Production Schedule button 580 displays a screen 588, through which the user may assign products to be displayed in the production schedule. Through repeated entry of product codes between activations of an Add New button 598 and an Apply button 604, the user can add as many product codes to a window 588 as desired. For each product code entered in a textbox 592 or selected in a pull-down box 594, the user also enters the number of products it is desired to process through system 10 during the given time period in a textbox 596, and this number is displayed in the "scheduled" column of a list box 590. Initially, when no cartons have yet been scanned, this number also appears in the "needed" column of list box 590. As the operator scans and labels cartons having product codes listed in the production schedule, however, the application increments the number in the "produced" column for the given product code and decrements the "needed" number. If the "needed" number reaches zero, further increases in the number of processed cartons of that product code increment both the "produced" and "overage" columns of list box 590.

In the illustrated embodiment, the production schedule is saved to database 54. The production schedule, which the user may view on the screen of computer 12, serves as a running total monitor for selected product codes. The system application resets the production schedule based on the Production Schedule Cleanup pull-down box 358 (FIG. 19). If this variable is set to "none," the application does not reset the production schedule, which will continue to run as described herein until the operator cancels the production schedule or deletes one or more product codes through screen 588 in FIG. 27. Alternatively, Production Schedule Cleanup 358 may be set to clear all variables in the schedule, except product codes, at the end of each calendar day. Thus, the operator must re-enter the quantity variable 596 (FIG. 27) each day if a running production schedule is desired for that day. Finally, Production Schedule Cleanup 358 may be set to clear the "produced" and "overage" columns to zero, and to set the "needed" column to the same number as in the "scheduled" column, at the end of each day. Thus, assuming the amount of cartons desired for processing remains the same from day to day, the operator need not reset the production schedule settings in order to automatically restart a daily production schedule.

If it is required that all cartons in a pallet have the same production date, the operator sets an "Allow Multiple Dates On Pallet" toggle switch 388 in screen 362 (FIG. 20A) to "OFF." Under this condition, the system application defines a carton's production date based on a Single Day Dating field 356 (FIG. 19), at which the operator chooses a desired day of the week. The production date is the date of the most recent calendar day selected in the pull-down list. Thus, Single Day Dating field 356 is preferably set to the first day system 10 processes cartons from the pallet. If Allow Multiple Dates toggle 388 is set to "ON" at screen 362, the Single Day Dating field 356 in screen 342 is ignored, and the production date for each carton is the present day.

Figure 20A:
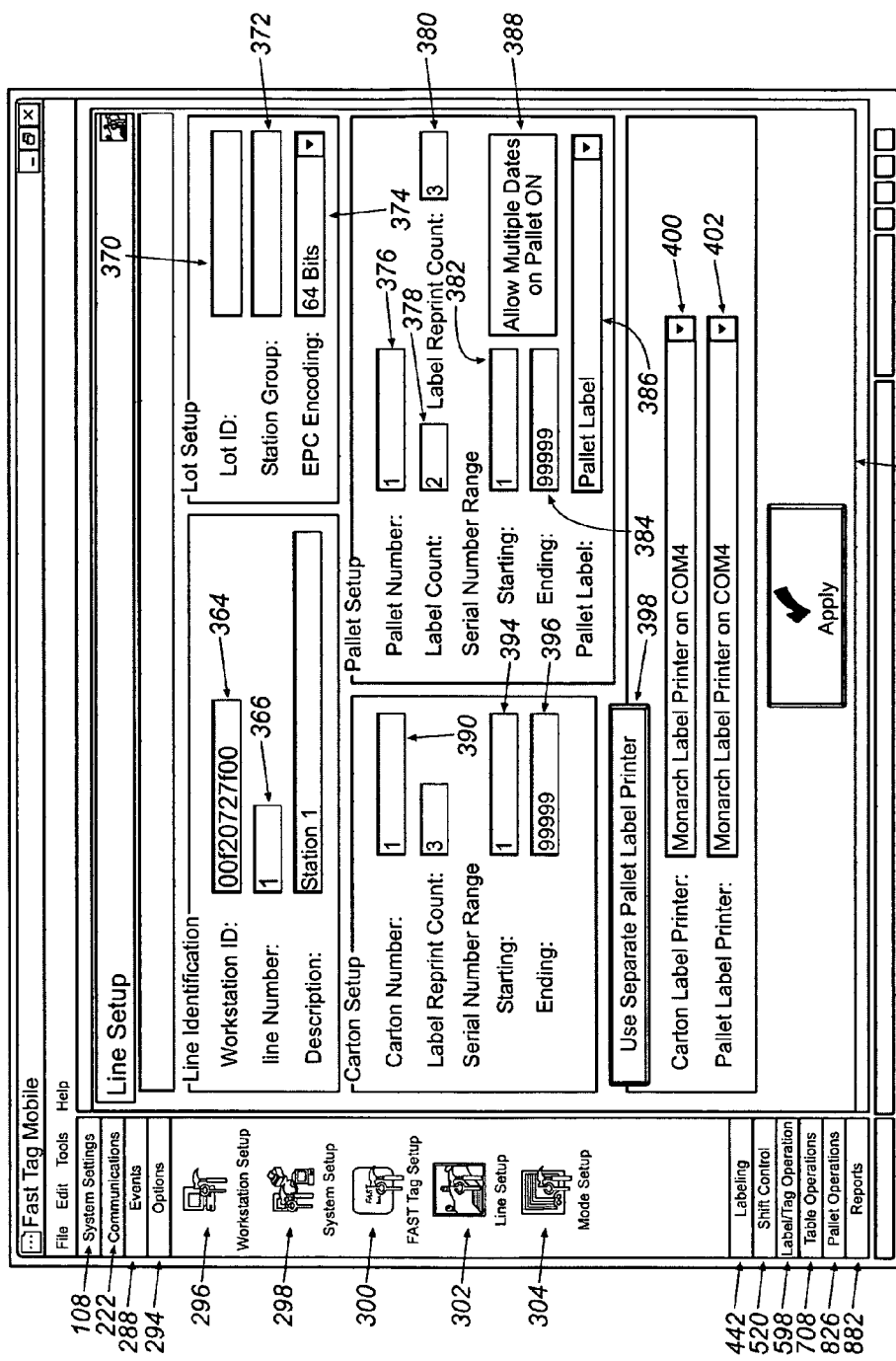
FIG. 20A is a screen display within a software application that controls the mobile labeling system as shown in FIG. 1A.
Figure 20B:
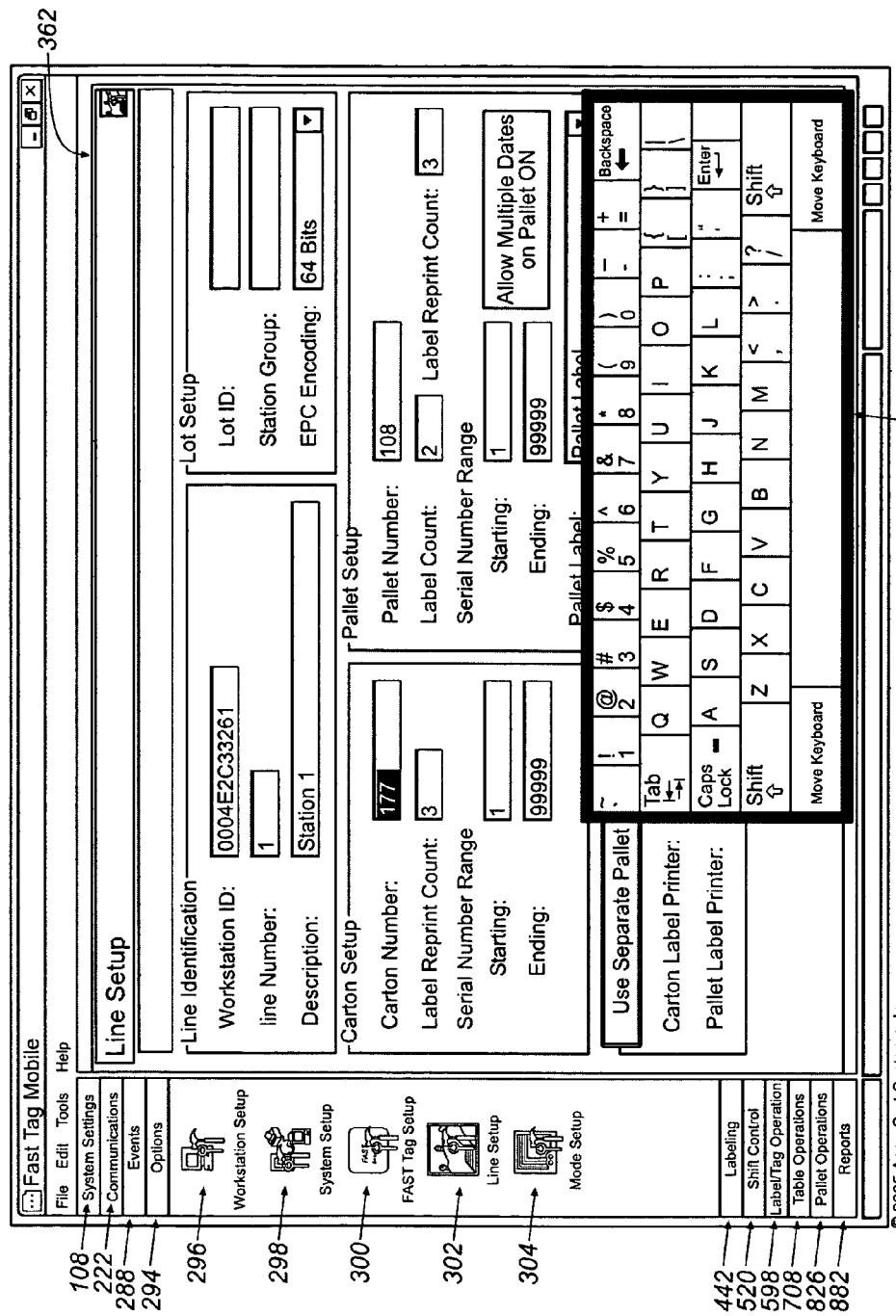
FIG. 20B is a screen display within a software application that controls the mobile labeling system as shown in FIG. 1A.

Activation of a Line Setup button 302 displays a screen 362, as shown in FIG. 20A, through which the user may enter and modify information describing a production line—i.e. a group of cartons to be scanned and labeled by station 10. The production line setup information includes the network address of PC 12 in a non-editable textbox 364. Because computer 12 processes cartons from one production line at a time, certain parameters relating to cartons and pallets within a given production line are defined for PC 12 at the production line level at screen 342 (FIG. 19), and the information in screen 362 is associated with PC 12 in database 54 in a Production Line table 64 (FIG. 3B). Since only one production line can be set up for PC 12 at any one time, Production Line table 64 governs the production of carton labels and pallet labels by PC 12 until the operator changes the information on screen 362, for example because there is a change from one production line to another or because mobile system 10 is being moved from one production line to another. The line number in a textbox 366 is entered manually by the operator and is included in the Product Label Information. The combination of the workstation ID and the line number comprises the production line's unique identifier. If desired, the user can enter in a textbox 370 a lot ID, which is used to associate products in a current production run together into one "lot" run.

The user can also enter a station group to which PC 12 belongs in a textbox 372 if so desired. The station group is a name applied to multiple stations that scan and apply labels to cartons in a given production line, for example where mobile system 10 is used in a larger conveyor system as discussed above. In the presently described embodiment, station 10 is the only station of the station group. Specific products can be assigned to specific station groups using the Product Table. Configuring the current line's station group to that matching the assignment in the Product Table allows this line to process products in that group. A drop-down box 374 is used to select the encoding type of the RFID tags used in the system: 64 Bits or 96 Bits. This configuration indicates to the application what types of tags are loaded in the RFID printer and how the information should be encoded to properly fit in the tag's memory space. For example, a configuration supporting 96 bits will not write to a tag whose memory space would only allow 64 bits, causing an invalid configuration and an error in the system.

Carton information can be defined in screen 362 for a given production line as identified in Line Number textbox 366. The system application defines a serial number for each carton that is the combination of a predetermined number (discussed above), production line number 366 and an end portion within a range defined within Serial Number Range Starting and Ending values entered by the user at textboxes 394 and 396. The next carton number to be used as the least significant portion of the serial number is equal to a value entered by the operator into a Carton Number textbox 390. As each carton in the production line is processed by system 10, the system application increments the serial number end portion, until the serial number end portion reaches the Serial Number Range Ending value, at which point the serial number end portion switches to the Serial Number Range starting point and starts again. The Label Reprint Count defines the maximum number of labels the operator may attempt to reprint on the system in the event a reprint is needed. The operator can reprint a label if it becomes damaged for any reason (e.g. if the carton is damaged) that would necessitate repacking the carton's contents and re-labeling.

Screen 362 also defines pallet data. The system assigns serial numbers to pallets in a manner similar to cartons, and the Pallet Number, Serial Number Range Starting and Serial Number Range Ending variables (textboxes 376, 382 and 384, respectively) operate similarly to the procedure discussed above with respect to the corresponding carton variables. Also similarly, a Label Reprint Count 380 defines the number of labels the system application will cause RFID printer 20 to print out in the event a pallet label reprint is needed. Pallet Setup also includes, however, a Label Count field 378, in which the operator may define the number of labels the application will instruct RFID printer 20 to print when printing of a pallet label is triggered at the close of a pallet, as described below. The Pallet Label drop-down box 386 allows the operator to define the particular format file (among the multiple possible format files) configured in screen 882 (FIG. 23) that will define the pallet label format. Whereas carton label formats are defined on a product basis, pallet formats are defined on a system wide basis.

The user may select a toggle button 388 to allow pallets to include cartons with mixed production dates—i.e. cartons in the same pallet can have different production dates. When "closing" a pallet, whether manually as described herein or automatically at the completed full pallet quantity specified for the product in the Product Table, the application increments the pallet serial number, so that any further palletized cartons are recorded in the Pallet table under the new number, and causes RFID printer 20 to print out a pallet label. A toggle button 398 allows the user to define separate RFID printers attached to PC 12 that the application will thereafter select to print carton and pallet labels. Drop-down boxes 400 and 402 select which RFID printer attached to PC 12 will print carton labels and pallet labels, respectively.

Figure 21:
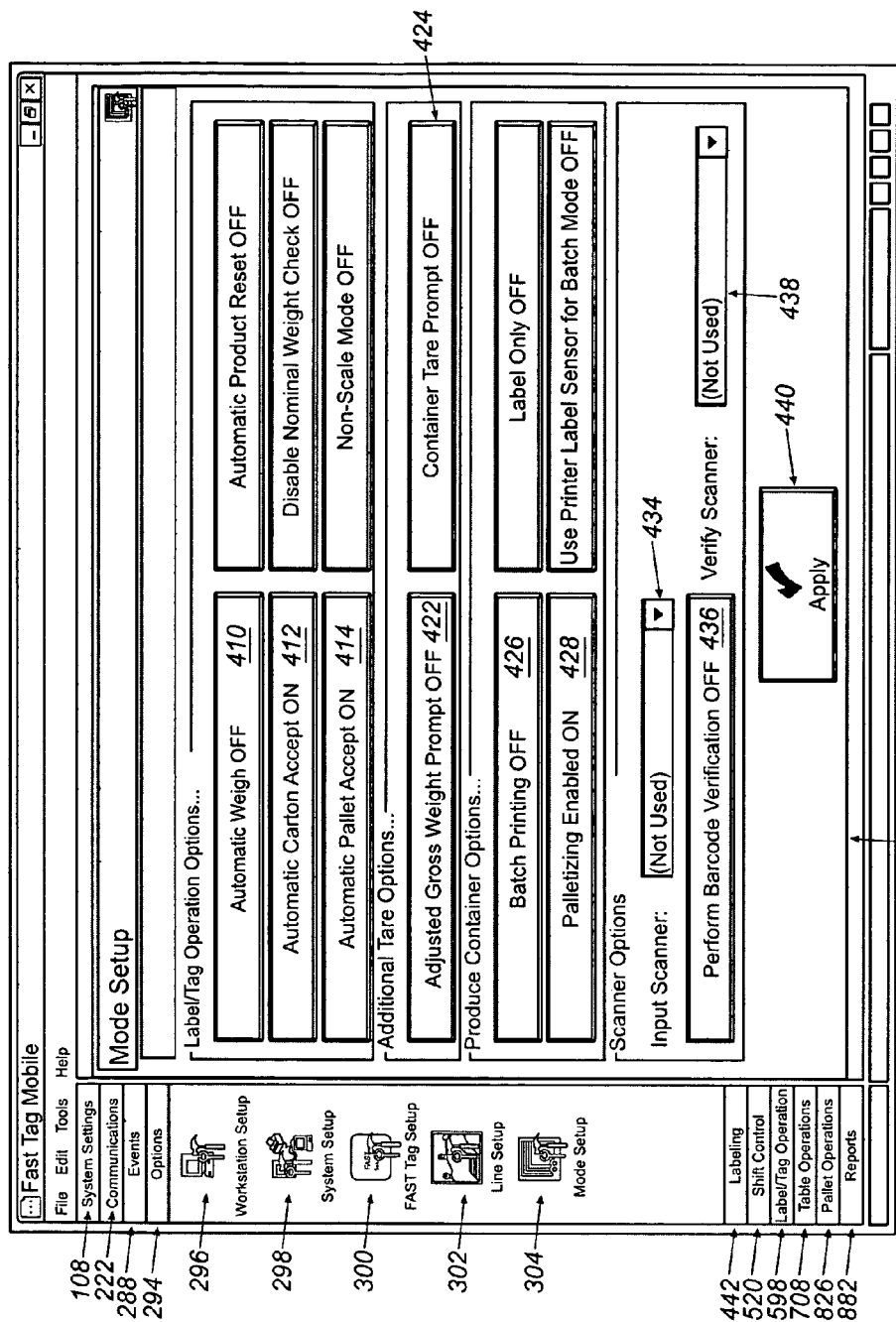
FIG. 21 is a screen display within a software application that controls the mobile labeling system as shown in FIG. 1A.

Activation of a Mode Setup button 304 displays a screen 408, as shown in FIG. 21, through which the user may modify settings relating to the labeling system. An Automatic Weigh toggle button 410 determines whether a carton is weighed as soon as it is placed on a static scale that outputs to PC 12. If toggle button 410 is set to 'ON,' the carton is automatically weighed when placed on the static scale. If toggle button 410 is set to 'OFF,' the operator must activate a Weigh button on Label/Tag Product screen 654 (FIG. 29A) to weigh the carton once it is placed on the static scale.

Product table 56 in database 54 includes a weight field associated with each product code. Each weight field defines a weight range within which the weight of the contents of a carton carrying products under the associated product code is expected to fall. The application deducts Miscellaneous Tare Weight and Box Tare Weight from the weight measured by the static scale to determine the contents weight for comparison with the weight range. Box Tare Weight is the carton's expected empty weight, whereas the Miscellaneous Tare Weight is the expected weight of non-product materials, such as packing materials, in the carton.

If the application determines that the contents weight is not within the weight range, the application can so notify the operator through a message at the screen of PC 12 so that the carton can be removed from the line, or other remedial actions taken. If the application determines that the contents weight is within the expected range, the application checks to determine whether a Nominal Weight has been entered for the product. The Nominal Weight is a target weight for the carton contents. If there is a Nominal Weight, the application presents the operator with a screen requesting whether it is desired to record the Nominal Weight as the carton contents weight. The contents weight, whether actual or the Nominal Weight, can be included in the Product Label Information and printed on the carton label.

In one preferred embodiment, weight information is not determined or recorded. In this embodiment, the static scale can be omitted.

Automatic Carton Accept On and Automatic Pallet Accept On toggle buttons 412 and 414 determine whether carton information and pallet information are immediately written to Carton table 58 and Pallet table 60, respectively, when RFID printer 20 prints a carton or pallet label (i.e. when the pallet closes), or whether the user must activate an Accept button, such as a button 668 on screen 654 (FIG. 29A), once the labels have been printed. For example, if toggle button 414 is set to 'OFF,' the application displays a decision box after printing the pallet label asking the user to either accept or reprint the pallet label.

When the system identifies a carton's product code, whether by scan of the carton's UPC barcode or touch screen entry of the product code, the application automatically displays screen 654 (FIG. 29A) from the welcome screen (or the screen otherwise automatically designated for the present operator from startup), displays the product code on screen 654 and simultaneously prints a corresponding label. If the operator is already at screen 654, of course, the application displays the product code and simultaneously prints a corresponding label. If the operator wishes to print the next label for the same product, the operator could (a) activate an "Enter" button 660 adjacent to the displayed product code in a display box 658 on screen 654, (b) activate one of the hotkeys 676 through 694 at the bottom of screen 654 that is pre-set to the desired product code, or (c) re-scan the carton.

A Batch Printing toggle button 426 determines whether a specified number of labels are printed for a single product code activation. That is, assume that the operator has scanned an UPC barcode label, or selected a hotkey (FIG. 29A) associated with a predetermined desired product code. Each of these events immediately results in the printing of a label corresponding to the product code if Batch Printing toggle button 426 is 'OFF.' If toggle button 426 is 'ON', however, the system application displays a query screen 714 (FIG. 29D) to the user on the PC 12 screen that prompts the user to enter the desired quantity of labels. If the operator enters a desired number through query screen 714, the application then instructs the RFID printer to print the entered number of labels.

A Palletizing toggle button 428 defines when palletizing is activated and deactivated. If Palletizing toggle button 428 is enabled, the application checks and increments a variable each time a carton containing a given product corresponding to that product code is scanned and labeled by PC 12. The Product Label Information associated with each product code in Product table 56 within database 54 includes a "full pallet quantity," which represents the total number of cartons containing that product that can fit on a pallet before the pallet is considered full. Once the variable amount equals the full pallet quantity for that product code, the application automatically closes the pallet. That is, the application instructs RFID printer 20 to print a pallet label and updates Pallet table 60 to reflect the information written to the pallet label.

If Palletizing toggle button 428 is activated, Pallet Operations panel 826 appears in the panel group on the left-hand side of the application, and the options under that panel are available to the operator. If toggle button 428 is not enabled, palletizing options are generally not available, only carton labels are printed, only Carton table 56 is updated, and no carton is assigned to a pallet. Activation of a Label Only button notifies the application that weight is not being tracked and that weight information is not to be collected for cartons and therefore not included in Product Label Information.

An Adjusted Gross Weight Prompt toggle button 422 determines whether the application asks the user to override a weight result by typing in a new value when a good weight has been reported from the static scale. The system also allows the operator to manually enter Tare Weight. A Container Tare Prompt toggle button 424 determines whether the application should prompt the user to type in additional container, or tare, weight.

Figure 3B:
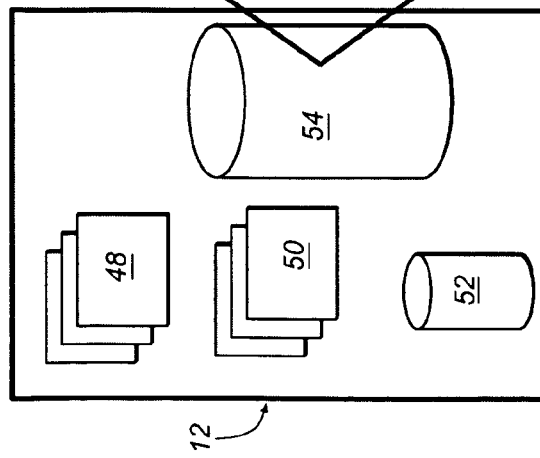

A drop-down box 434 displays any barcode scanners attached to PC 12, such as scanner 22 (FIGS. 1-3). The operator selects which scanner, if any, to use to scan the barcodes attached to the packages in the production line. The system application then looks to that scanner for scanner input. A Perform Barcode Verification toggle button 436 determines whether each carton label must be successfully scanned by a verification scanner before the application permits the operator to move from scanning the given carton to another action. The verification scanner is selected from a pull-down box 438. If a verification scanner is enabled, the application prompts the operator to confirm the barcode after the RFID printer has produced the label. Having affixed the label to the carton, the operator then reads the barcode on the label 28 (FIG. 1A) using the selected barcode scanner. The system application receives the barcode information from the scanner and checks the received information against the RFID Printer Data. If the received information matches the RFID Printer Data, the barcode is considered good, and the application removes the prompt and allows the system to accept a subsequent carton. All information contained in screen 408 is stored in database 54. If the user makes any changes and activates an Apply button 440, the application updates database 54 with the modified data.

Figure 22A:
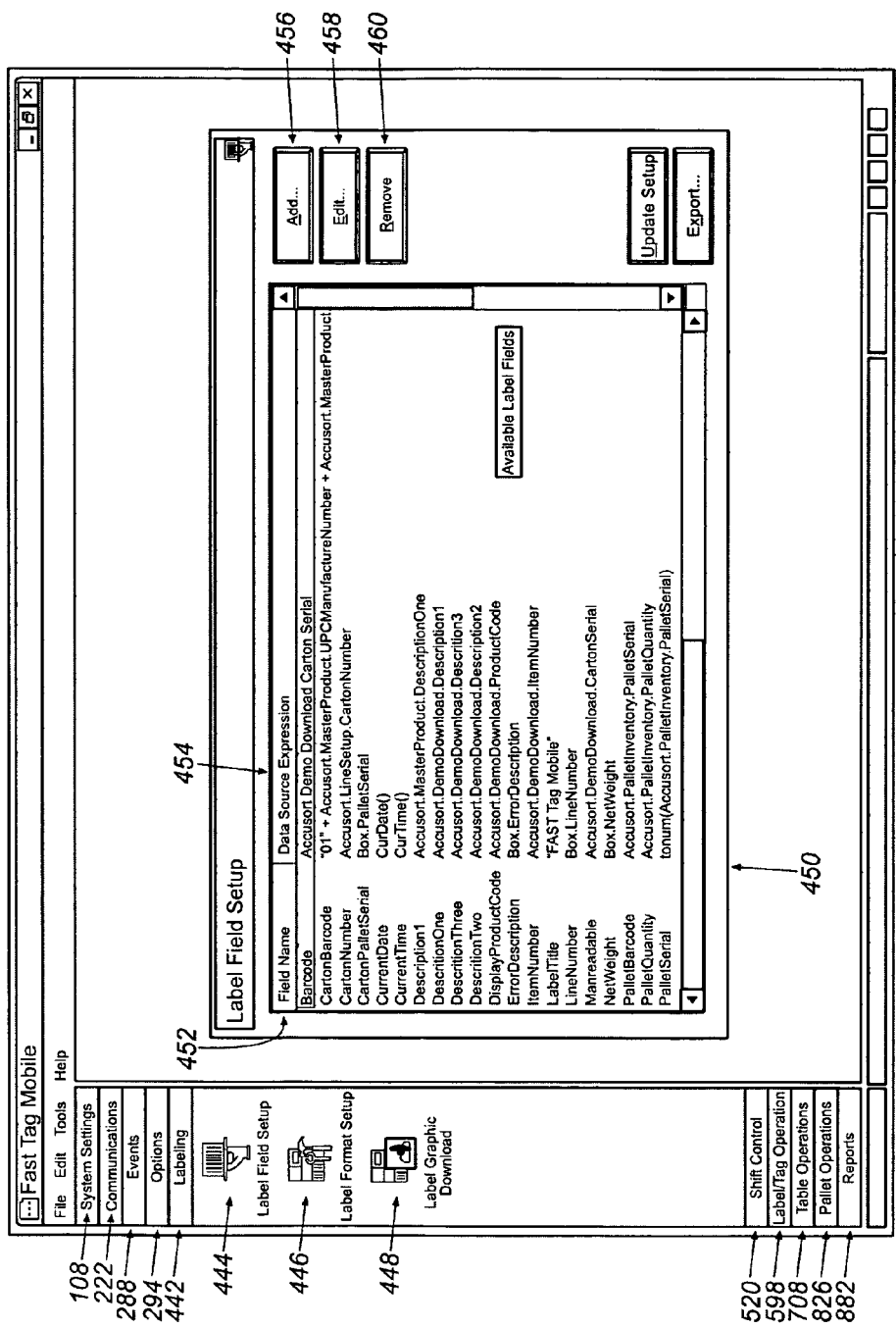
FIG. 22A is a screen display within a software application that controls the mobile labeling system as shown in FIG. 1A.

Activation of a Labeling Panel 442 displays buttons 444, 446, and 448 as shown in FIG. 22A. Activation of a Label Field Setup button 444 displays a Label Field Setup screen 450, through which the user may view, add, or remove variable data fields. The data fields under a Field Name column 452 are the variables that comprise the RFID Printer Data, i.e. data that the system application outputs to the RFID printer for inclusion in the label. For any given carton, each variable is populated by data determined by a rule corresponding to the variable under a Data Source Expression column 454. The Data Source Expression rule can be as straightforward as defining text to associate with a given Field Name variable for every carton but may also be a mathematical or logical function that operates on specific system data or information associated with the product's product code in the Product Label Information. When the system acquires a product code, e.g. through reading and UPC barcode or receiving a hotkey, the application executes the Data Source Expression rules to thereby populate the Field Name variables and defines a set of RFID Printer Data for the carton associated with the product code. As noted above, the definition of the Data Source Expression rules depends on the information requested to be included on the carton label by the retailer/wholesaler, as well as information desired by the manufacturer to be included in the label. The specific information is not, in-and-of-itself, part of the present invention and is therefore not discussed in further detail herein.

Also as discussed above, the application then instructs RFID printer 20 (FIGS. 1-3) to print the RFID Printer Data on the barcode and encode the same on the RFID tag. The user then affixes the label containing the variables and their corresponding values to the carton or pallet. The barcode and RFID tag information is added to Carton database table 58.

Figure 22B:
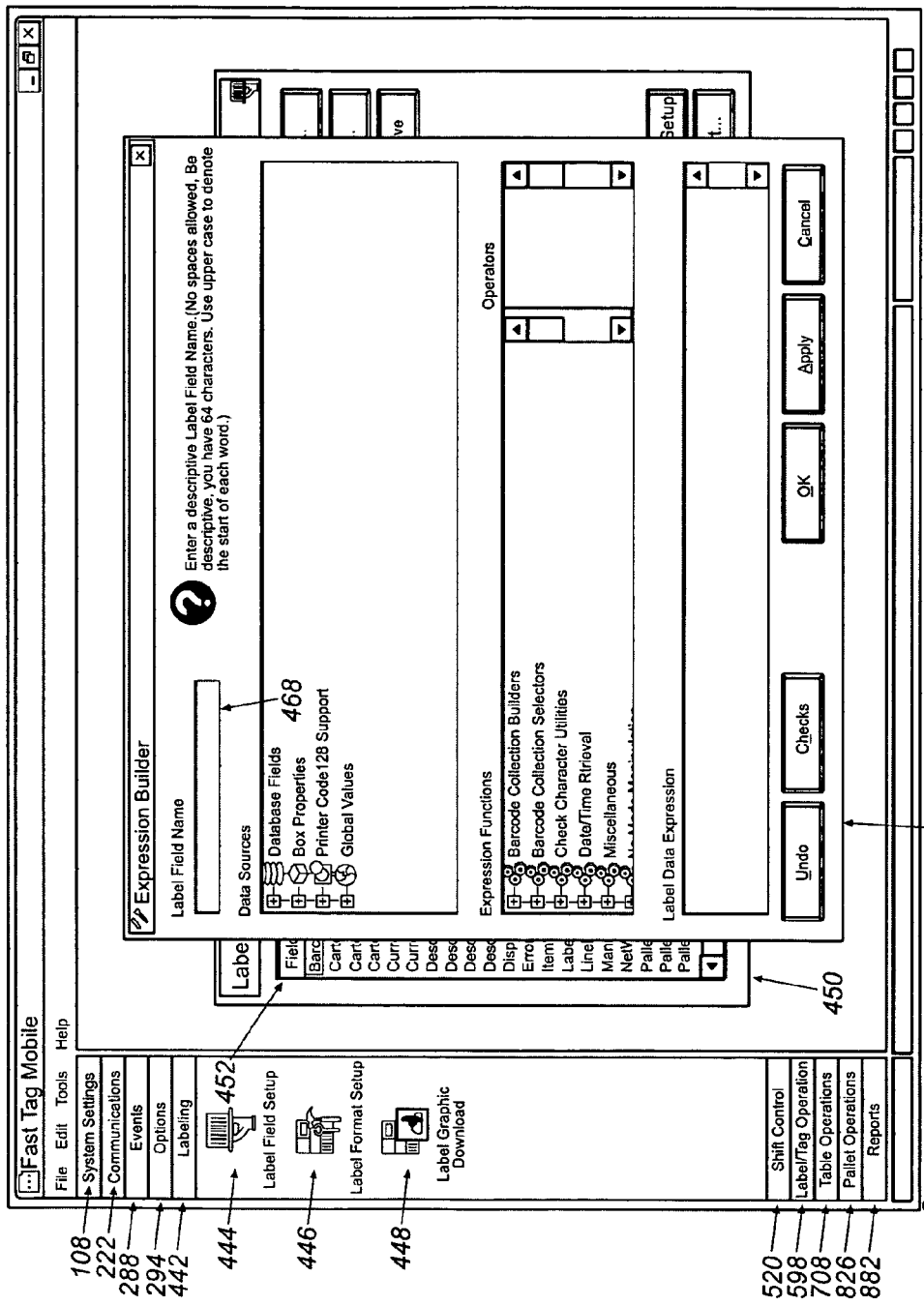
FIG. 22B is a screen display within a software application that controls the mobile labeling system as shown in FIG. 1A.

The user may edit or remove a data field by selecting the field name in Field Name column 452 and activating an Edit button 458 or a Remove button 460, respectively. Activating Add button 456 displays an Expression Builder screen 466 as shown in FIG. 22B. The user labels a data field using a Label Field Name textbox 468 and then uses screen 466 to manipulate data to be stored in the data field. This data can come from any location within database 54, box properties, printer code 128 support, and the application's global variables or a combination thereof. The user can also take advantage of the application's built-in functions to create the desired data to be stored in the data field.

Box properties are a standard set of fields used to store the data that change from carton to carton, such as carton weight, serial number generation and production time. Printer Code 128 are hard coded values defined by the Uniform Code Council that can be contained in UCC-128 barcodes.

A Label Field database table in database 54 stores the Field Name variables and the Data Source Expression rules. Screen 450 also allows the user to export the list of data fields and corresponding expressions to a text file for reference.

Figure 23:
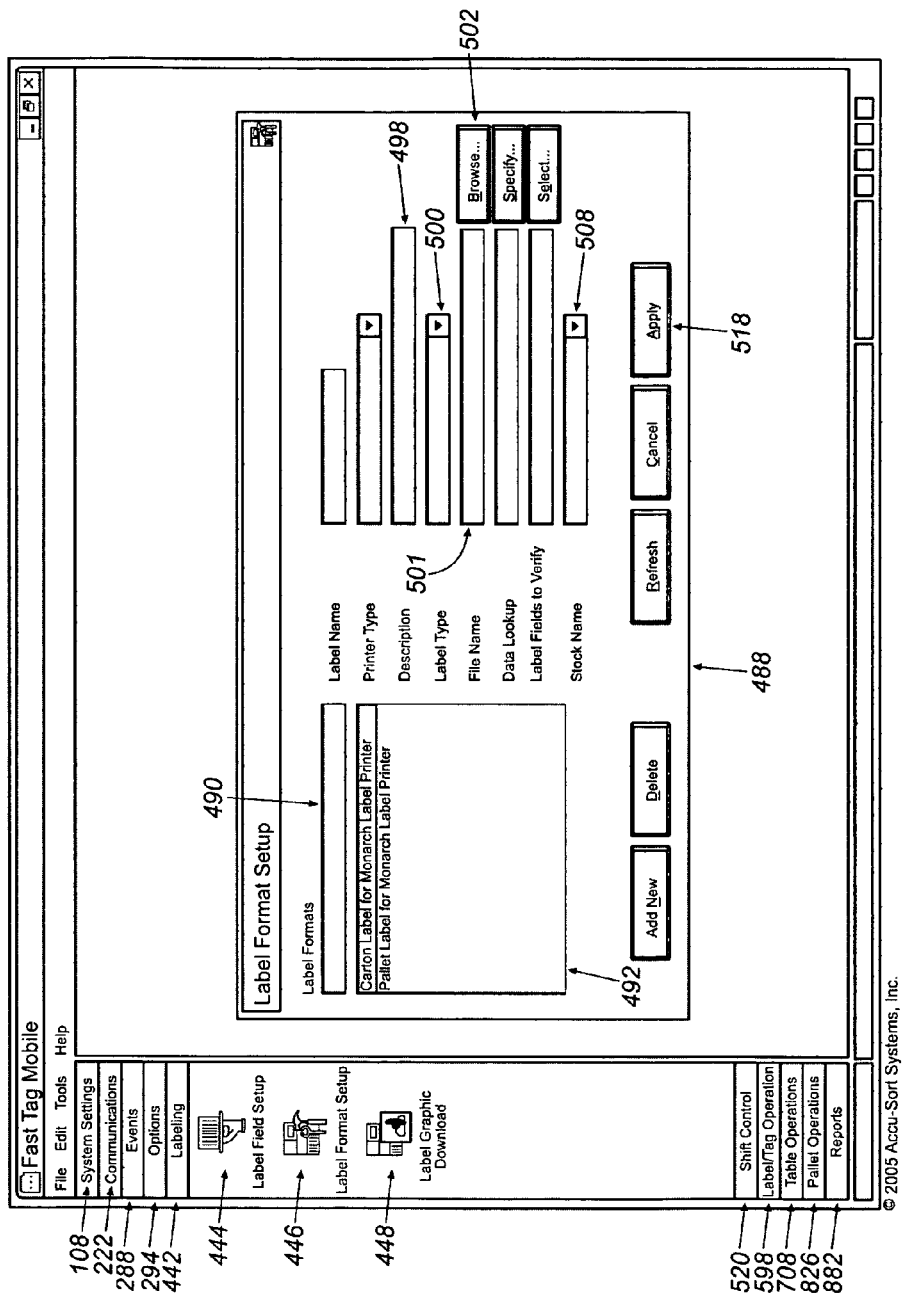
FIG. 23 is a screen display within a software application that controls the mobile labeling system as shown in FIG. 1A.

Activation of a Label Format Setup button 446 displays a screen 488, as shown in FIG. 23, through which the user defines and manages label formats used by PC 12 to instruct RFID printer 20 (and any other connected RFID printer) how to format labels. This information is stored in files 50 on PC 12 (FIG. 3). In an alternative embodiment in which mobile unit 10 is a component of a larger conveyer system, these files may be located on remote data server 42 (FIG. 4). On screen 488, a list box 492 displays all available label formats. A textbox 490 displays the name of the label format. The user can select the type of printer used to print the selected label from a drop-down box 508. A description for the label can be entered into a textbox 498. The user can select the type of label the format represents from a drop-down box 500. The user selects the file name of the label format by typing the name in a textbox 501 or by pressing a Browse button 502, which opens a WINDOWS file dialog box, and choosing the appropriate file. The Label Fields to Verify field identifies those Field Name variables that are checked by the bar code scanner after application of the label to the carton, as discussed above. The Data Lookup field may include a key to one or more databases in which data is located that is needed for the Data Source Expressions to populate the Label Field variables for a given carton.

If the operator makes any changes or adds a new label format, database 54 is updated when user activates an Apply button 518.

Figure 24:
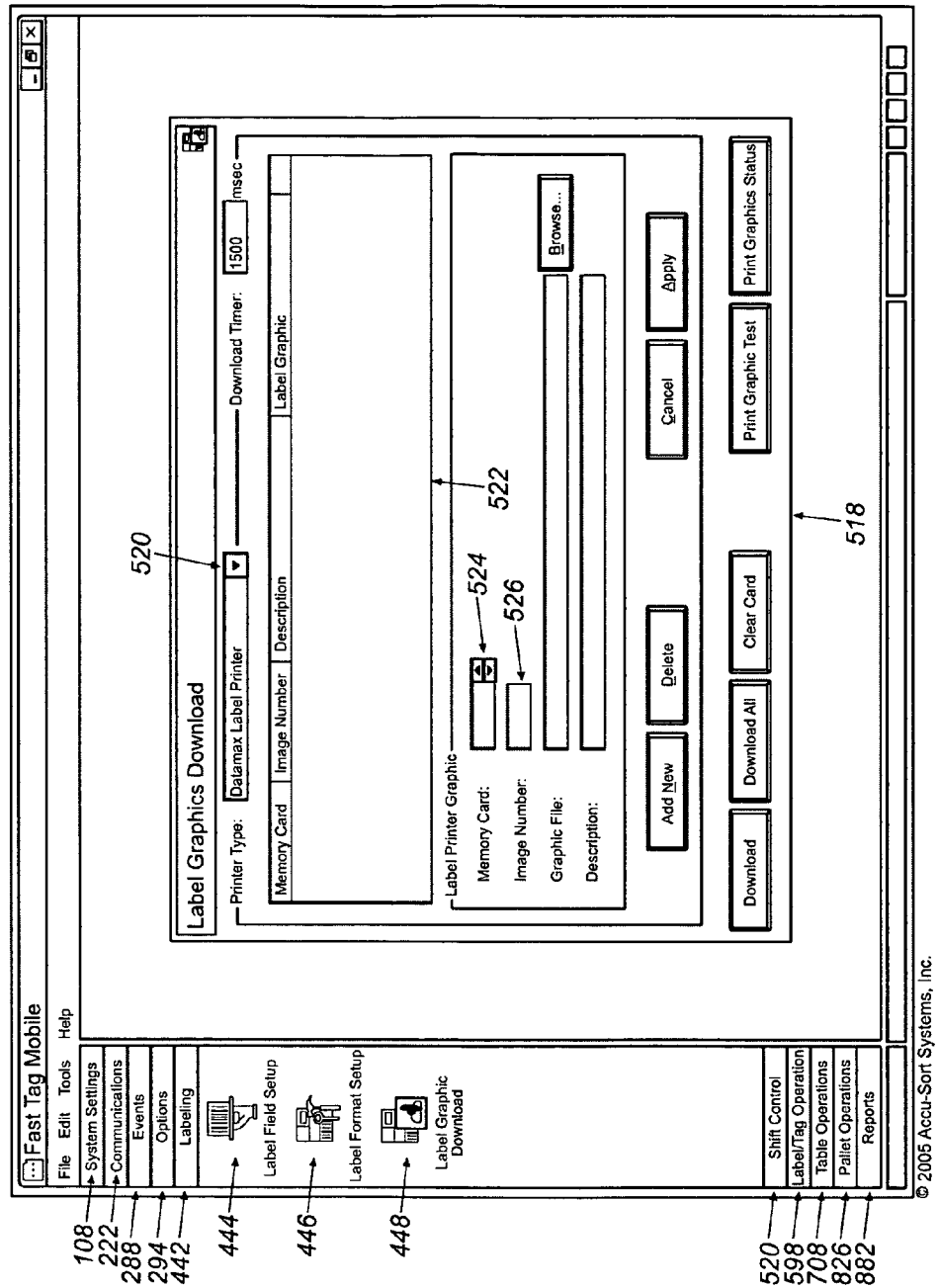
FIG. 24 is a screen display within a software application that controls the mobile labeling system as shown in FIG. 1A.

Activation of a Label Graphics Download button 448 displays a screen 578, as shown in FIG. 24, through which the user may transfer image files from PC 12 (or any other computer connected to PC 12) to RFID printer 20 (or any other printer connected to PC 12) for use in the label format files. These image files, which may come from the manufacturer retailer/wholesaler, trade affiliations or agencies are stored on RFID printer 20. RFID printer 20 prints the graphic each time a new label is printed. The information corresponding to these graphics and their related files are stored in database 54.

Figure 25:
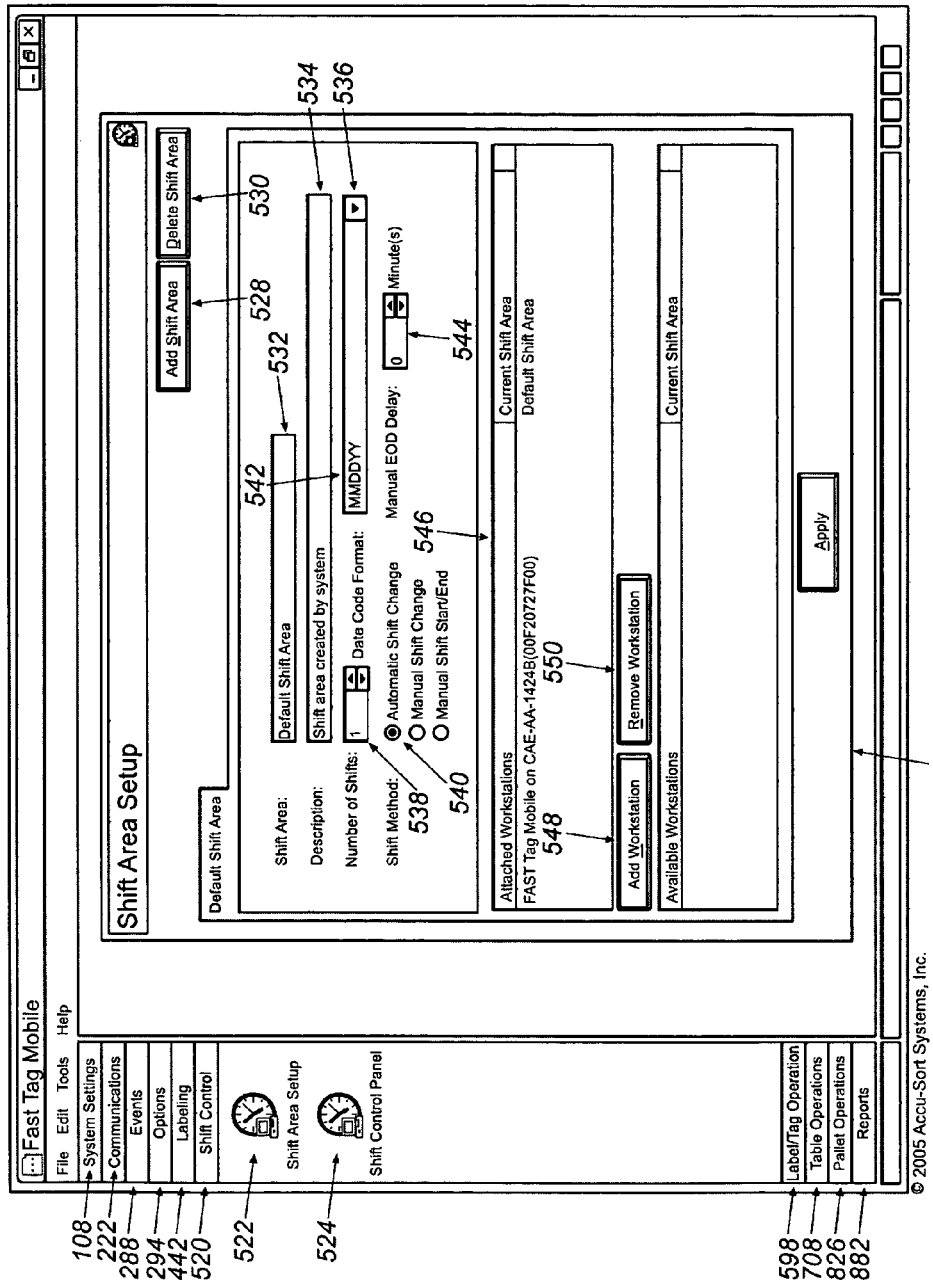
FIG. 25 is a screen display within a software application that controls the mobile labeling system as shown in FIG. 1A.

Activation of a Shift Control panel 520 displays buttons 522 and 524, as shown in FIG. 25. Activation of a Shift Area Setup button 522 displays a screen 526, through which the user may change shift information, such as the number of shifts per day and the date code format used by the shift area. Shift areas are useful in production environments where different operational units have different shift requirements based on the work performed. For example, one shift area might have two shifts with a manual shift change, while another might have three shifts with pre-determined change times. Shifts are simply users who work together in a certain area during a specified time. Data corresponding to shifts including the number of shifts per day, the date format and workstations used by each shift, and whether shift changes are manual or automatic, is stored in database 54.

Figure 26:
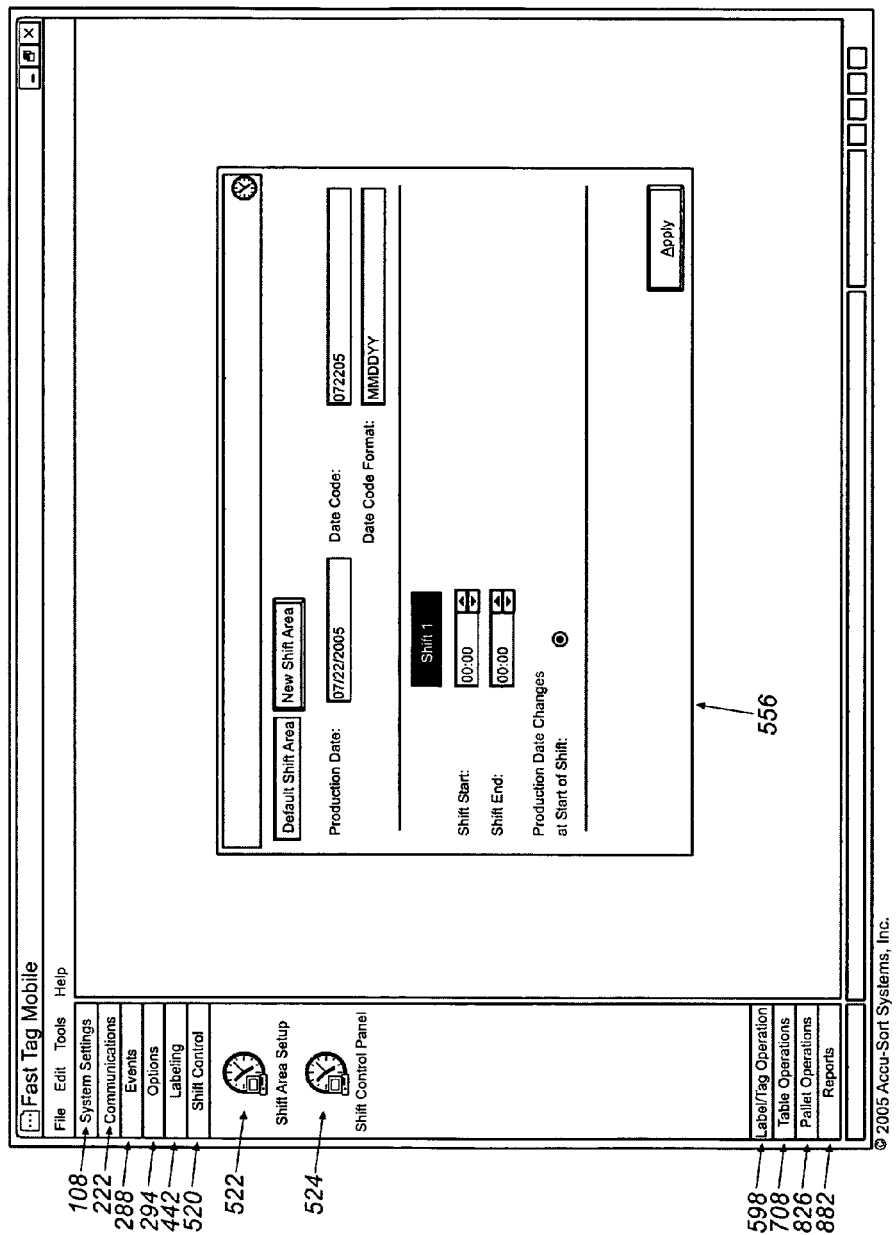
FIG. 26 is a screen display within a software application that controls the mobile labeling system as shown in FIG. 1A.

Activation of a Shift Control Panel button 524 displays a screen 556, as shown in FIG. 26, through which the user may view and modify start and end times of individual shifts. Depending on shift method specified in screen 556, the user may control when shifts begin, end, or changeover using screen 556. Shifts are used to track production counts and determine how much of a given product was produced during the production shift. Shift information may also be used to track and trace product information to a specific shift, date and time produced, for example for recall purposes.

Activation of a Label/Tag Operation panel 598 displays buttons 580, 582, 584 and 586 as shown in FIG. 27. Activation of a Production Schedule button 580 displays a screen 588, which displays the production schedule as discussed above.

Figure 28A:
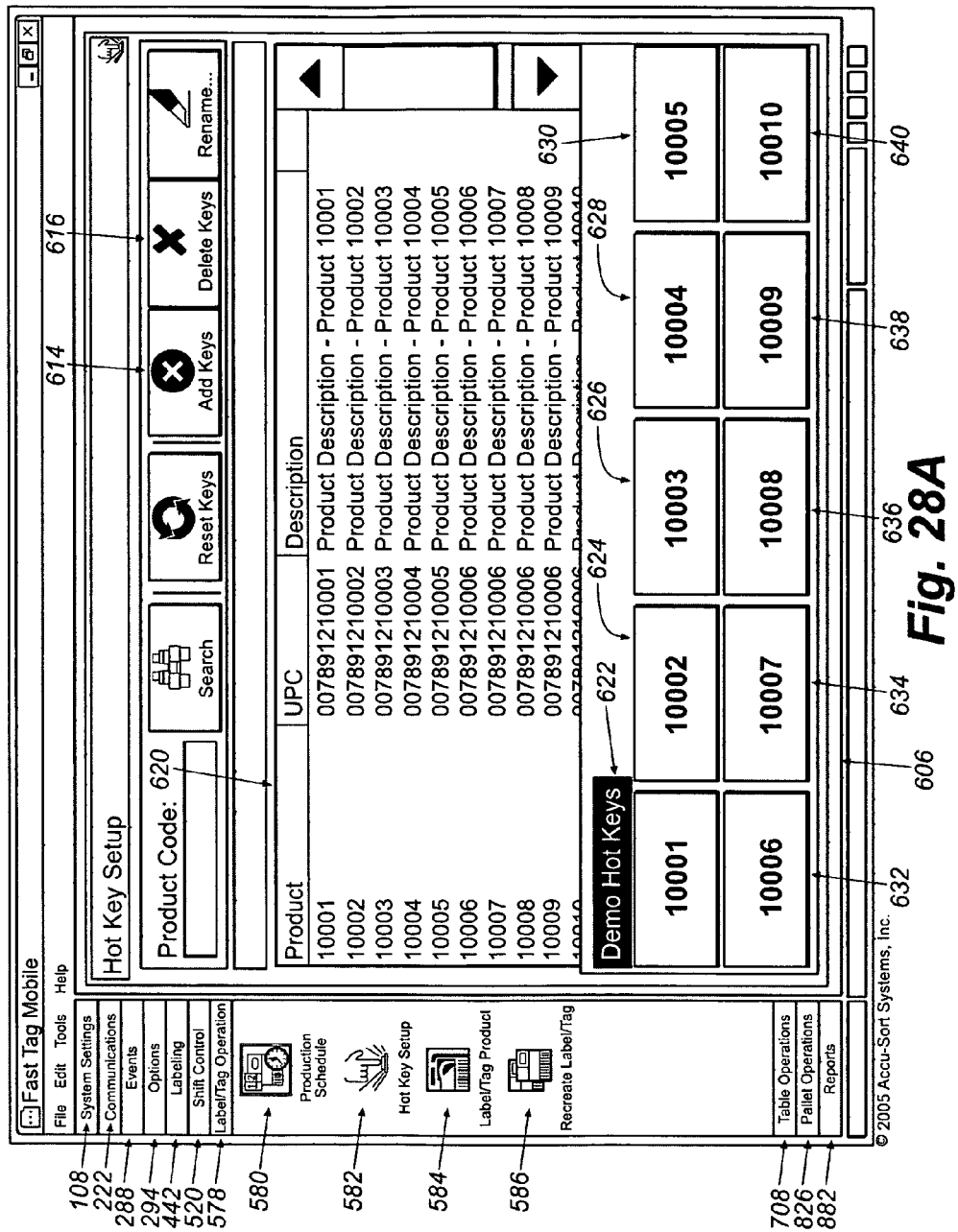
FIG. 28A is a screen display within a software application that controls the mobile labeling system as shown in FIG. 1A.
Figure 28B:
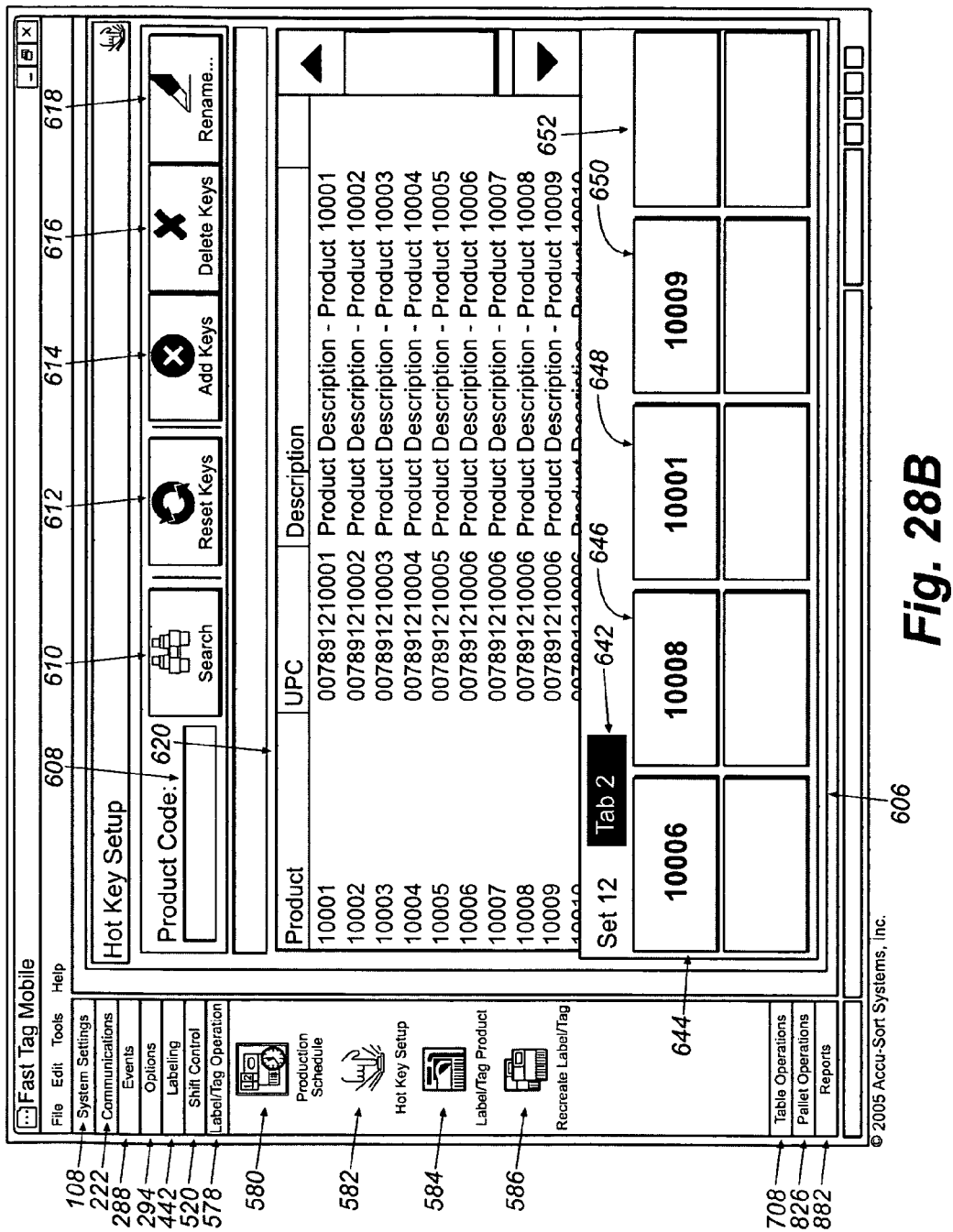
FIG. 28B is a screen display within a software application that controls the mobile labeling system as shown in FIG. 1A.

Activation of a Hot Key Setup button 582 displays a screen 606, as shown in FIG. 28A, through which the user may add, delete, and modify "hot keys" that facilitate the user's access to product codes during a production. The application populates a list box 620 from the product codes stored in the Product database table of database 54 (FIG. 3). The user can then select a product code from list box 620 and then select any hot key 622 through 640. Hot keys 622 through 640 facilitate the actual labeling of packages, as described below. The user can remove a product code from a hot key by selecting a new product code from list box 620 and then selecting the hot key that the product to be removed was associated with—thus replacing the hot key assignment. Pressing a button 614 will create a tab 642 corresponding to another set of 10 hotkeys as shown in FIG. 28B. Selecting tab 642 and activating a button 616 removes tab 642 and its corresponding hot keys. The identical hot keys appear in Label/Tag Product screen 654 (FIG. 29A) in panel 584 facilitating selection of product codes during labeling of packages. Product codes, hot key information, and their relationships are stored in database 54.

Figure 29A:
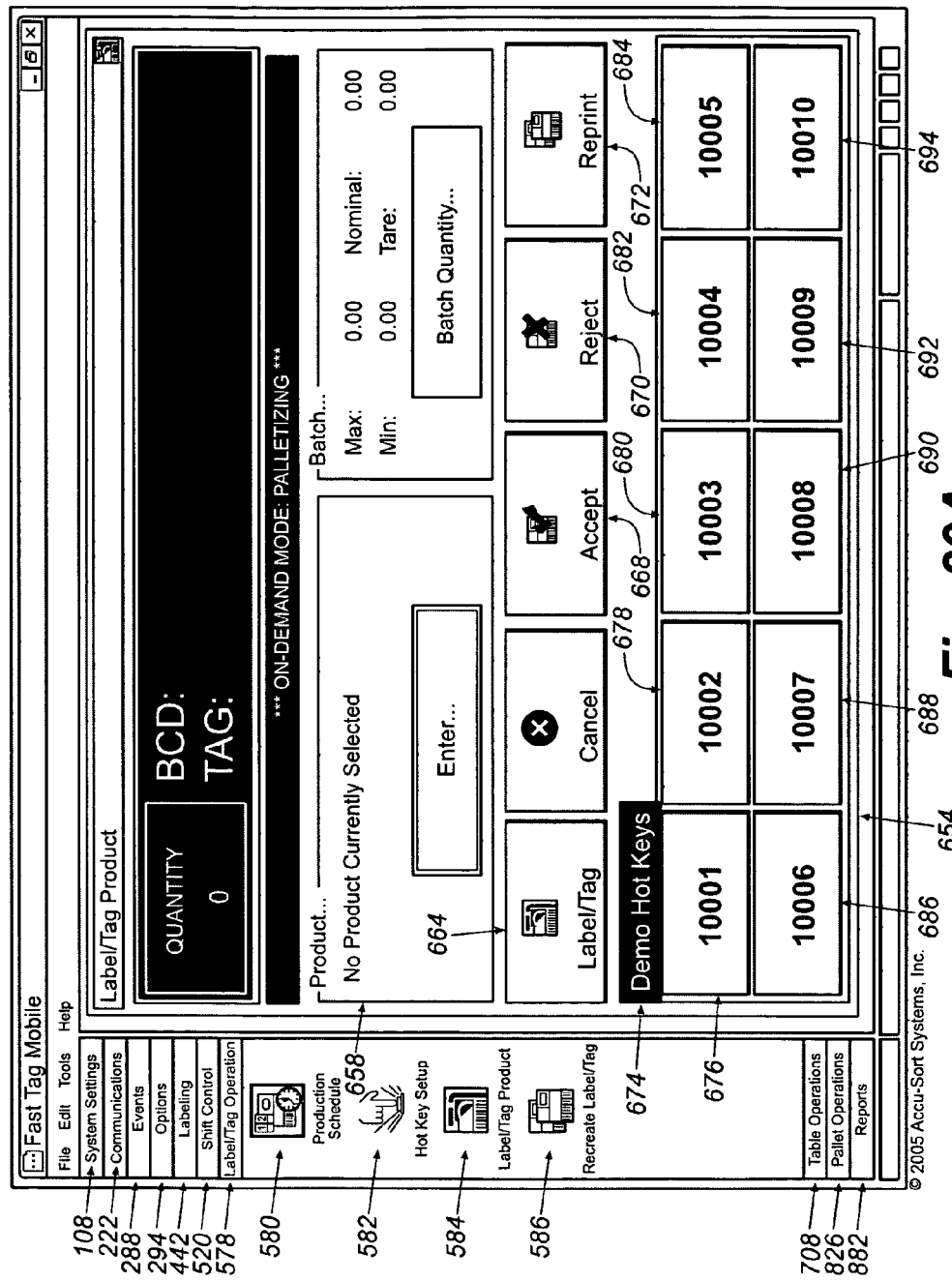
FIG. 29A is a screen display within a software application that controls the mobile labeling system as shown in FIG. 1A.
Figure 29B:
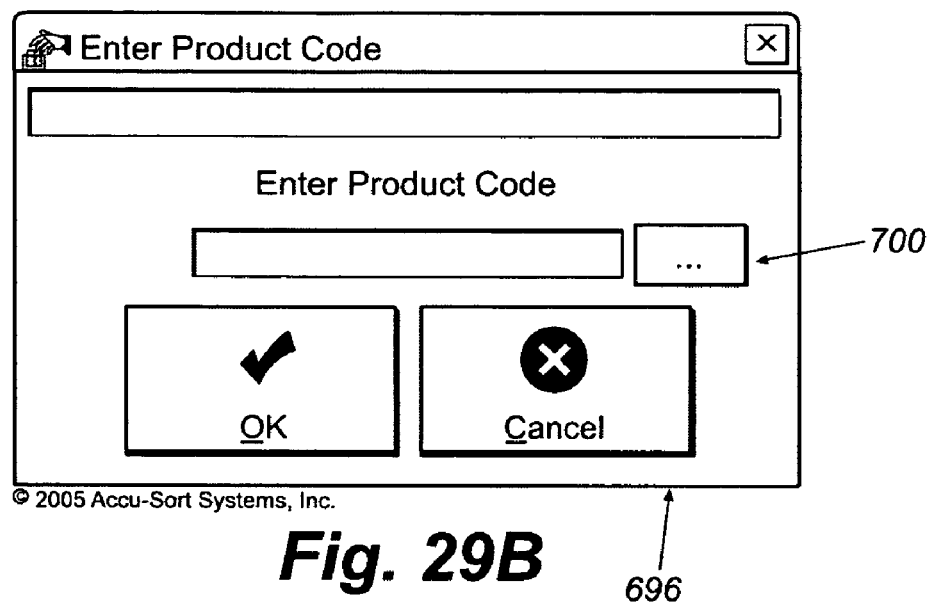
FIG. 29B is a screen display within a software application that controls the mobile labeling system as shown in FIG. 1A.
Figure 29C:
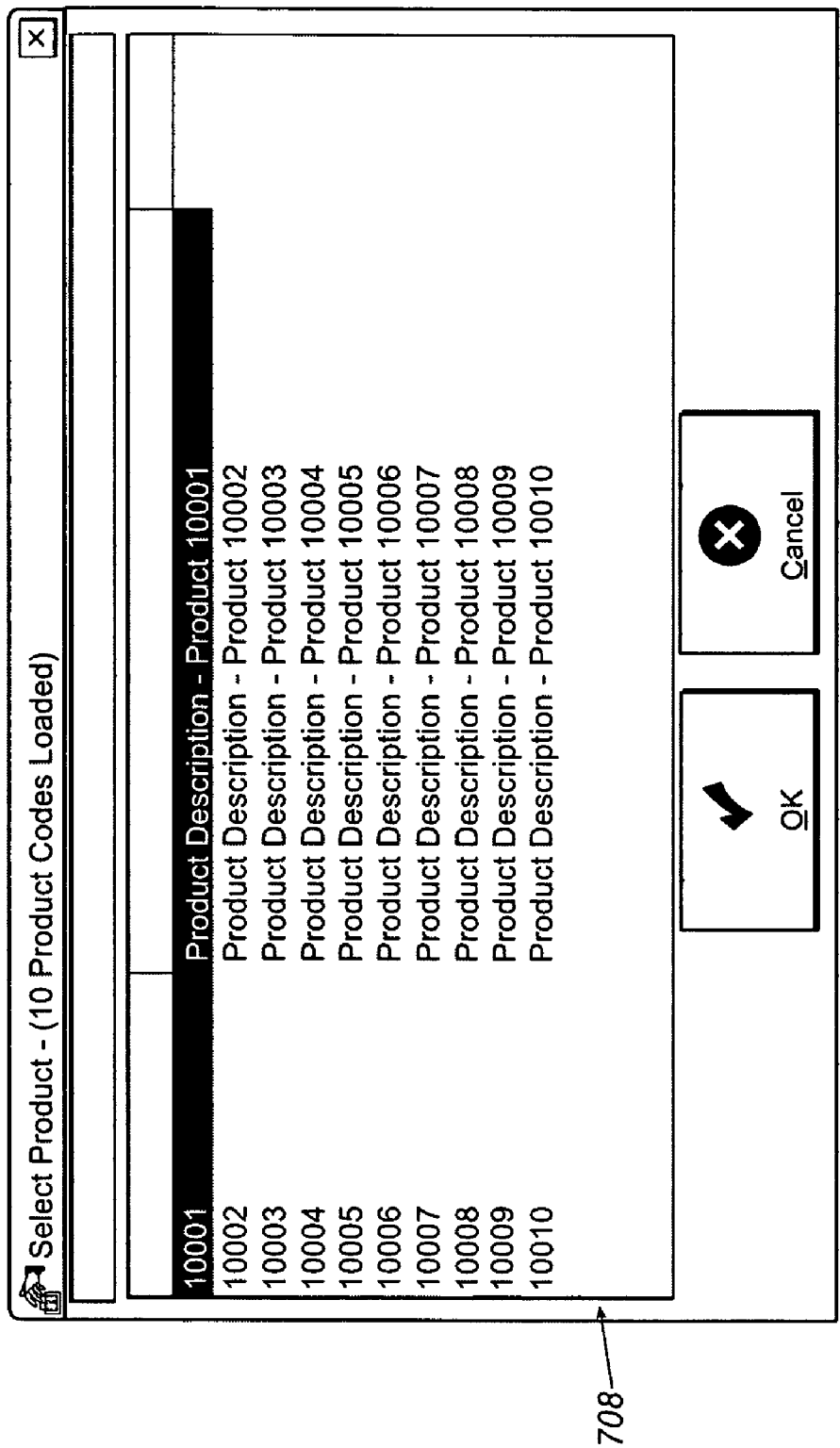
FIG. 29C is a screen display within a software application that controls the mobile labeling system as shown in FIG. 1A.

Activation of a Label/Tag Product button 584 displays a screen 654, as shown in FIG. 29A, through which a product code is received by the system application for production of a label based on Product Label Information associated with the product code in database 54. The application may acquire the product code by any of several means. First, the operator may simply activate any of hot keys 676, 678, . . . or 694. Activation of a given hot key notifies the system application of the operator's choice of the product code associated with the selected hot key. Alternatively, the operator can scan the carton's initial UPC label with barcode scanner 22. The scanner outputs the barcode data to the application, which parses the product code from the known UPC format. Further, the user may visually observe the product code on the carton if it is printed on the carton in some manner. Upon the operator's activation of an Enter button 660 on screen 654, the application presents an Enter Product Code dialog box 696, as shown in FIG. 29B. The operator may then enter the product code through keyboard 16 or touch screen keyboard 406 or search for a product code by pressing a table lookup button 700. Pressing table lookup button 700 causes the application to display a Select Product screen 706, as shown in FIG. 29C. The application populates a list box 708 on screen 706 from information in database 54 (FIG. 3). The user can select a product code by choosing one from list box 708 and pressing an OK button 710. Regardless of the means by which the application receives or derives the product code, once the product code is acquired, the application displays the product code in a Product display box 658 of Label/Tag Product screen 654.

Figure 29D:
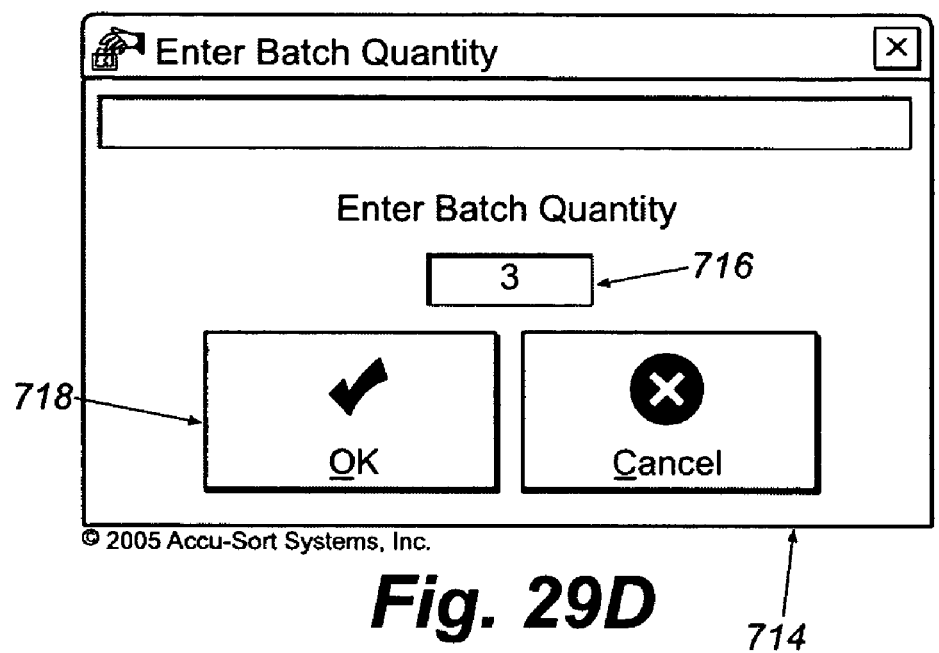
FIG. 29D is a screen display within a software application that controls the mobile labeling system as shown in FIG. 1A.

If Batch Printing toggle button 426 (FIG. 21) is enabled in Mode Setup screen 408, the application will display an Enter Batch Quantity dialog box 714, as shown in FIG. 29D. The operator enters the desired quantity in an Enter Batch Quantity textbox 716, and the application instructs RFID printer 20 to print that number of labels having the RFID Printer Data corresponding to the entered product code. If both Batch Printing toggle button 426 and Automatic Carton Accept toggle button 412 (FIG. 21) are not enabled, the application instructs RFID printer 20 to print a single label with the RFID Printer Data corresponding to the entered product code. The user must then accept the label by pressing an Accept button 668, or reject the label by pressing a Reject button 670, or reprint the label by pressing a Reprint button 672. Reprinting a label returns the operator to the same decision (accept, reject or reprint). An operator may want to reprint a label at this point if, for example, the initially printed label has become damaged before being affixed to the carton. Accepting a label updates the production run and product information in database 54 (FIG. 3), while rejecting a label returns the operator to Label/Tag Product screen 654.

If Batch Printing toggle button 426 is off and Automatic Carton Accept toggle button 412 is enabled, the application instructs RFID printer 20 to print a single label with the RFID Printer Data corresponding to the entered product code and returns to screen 654 shown in FIG. 29A. As the carton's product code remains in box 658, the operator may print additional tags with the same RFID Printer Data by activating Enter button 660 but may also reproduce the label through any of the other methods described above.

If Perform Barcode Verification toggle button 436 (FIG. 21) is enabled, the user must scan the newly printed label to verify the applicable information can be read from the barcode on the label. Each time a label is printed under batch printing or, in the alternative, accepted by the user, the application updates the product and production information in database 54 (FIG. 3).

Figure 29E:
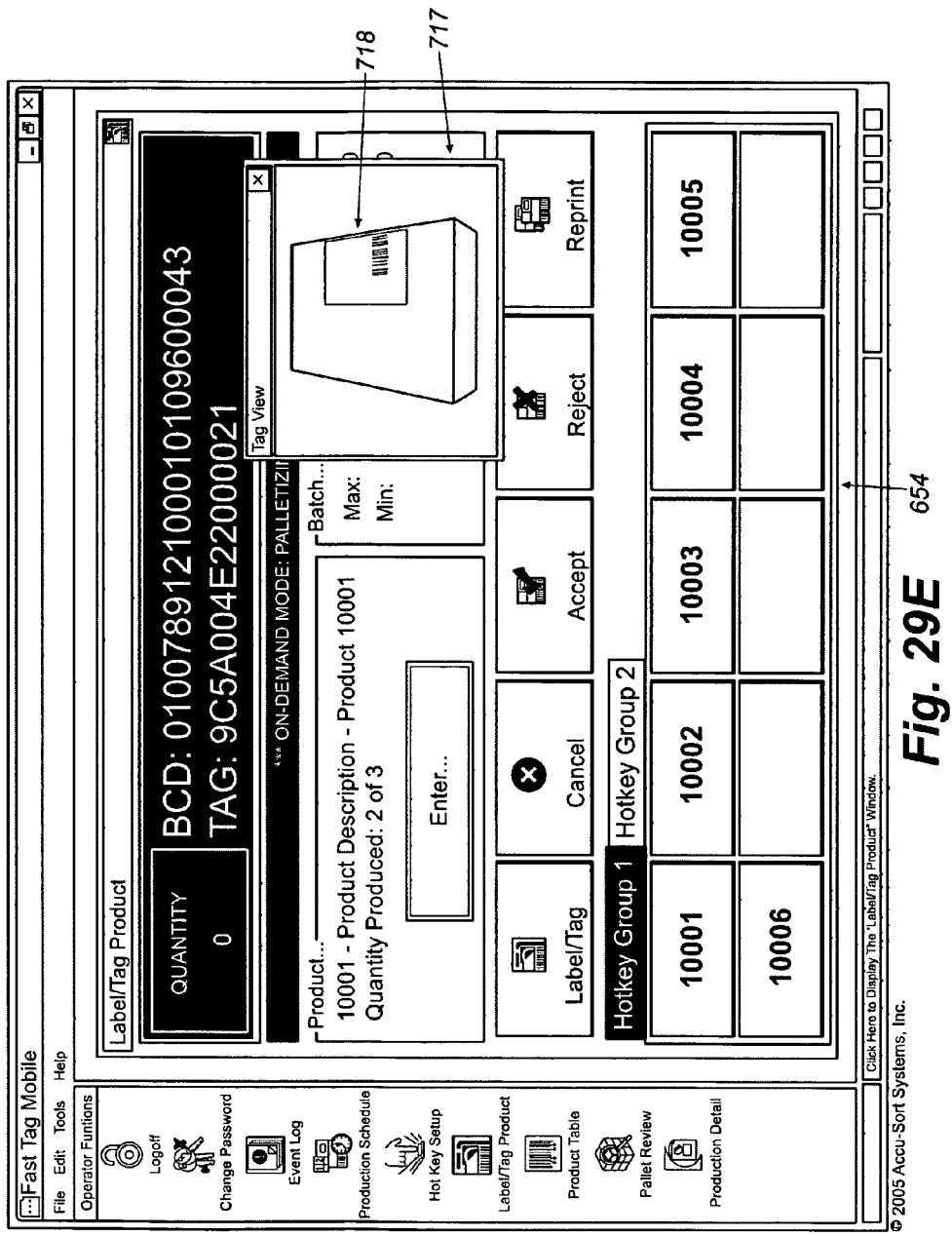
FIG. 29E is a screen display within a software application that controls the mobile labeling system as shown in FIG. 1A.
Figure 29F:
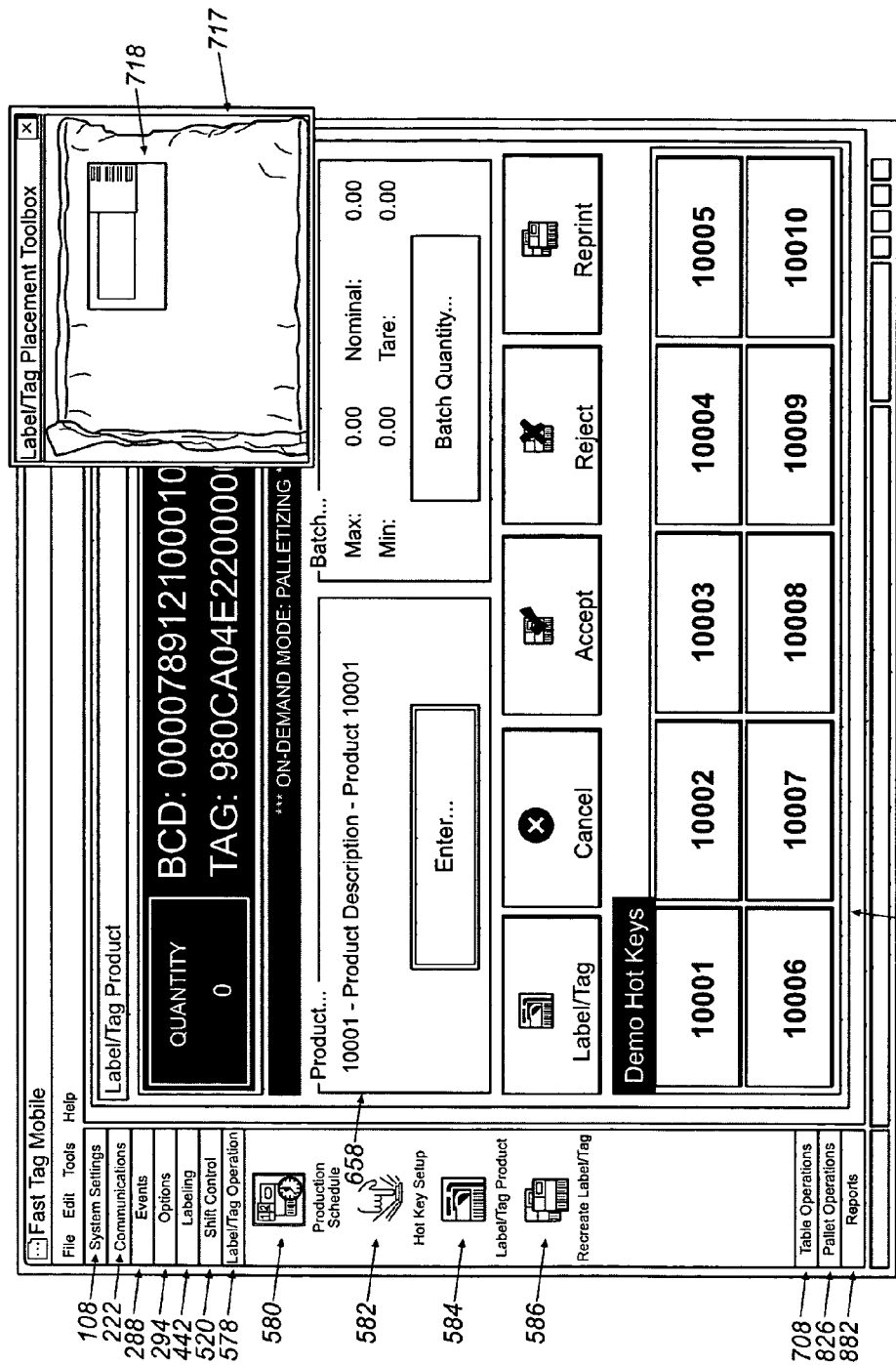
FIG. 29F is a screen display within a software application that controls the mobile labeling system as shown in FIG. 1A.

If the Product database table in database 54 (FIG. 3) includes label placement information associated with the product code entered by the user, the application displays a Tag View graphic box 717 when the product code is acquired, as shown in FIGS. 29E and 29F, to instruct the user where to place the label on the carton. A label placement image may be provided, for example, when the carton contains material that either interferes with or reflects radio frequency signals. The graphic can be stored in files 50 on PC 12 or on any computer connected to PC 12. The product code and an identification of the location of the graphic in files 50 that is associated with the corresponding product code are stored in the Product table of database 54 (FIG. 3).

The label placement graphic is preferably an image of a carton like the carton containing the product associated with the given product code. The desired placement of the label can be determined by trial and error by placing the label in various positions on the carton and measuring the RFID response from an RFID reader disposed at a position at which a reader would likely be positioned in the field. Once a label position is determined that results in an acceptable RFID response is determined, a digital image of the carton is taken that shows the label's position on the carton. The image is then downloaded to PC 12 and stored in files 50. Label placement may be determined by the manufacturer, the retailer/wholesaler or a third party.

Figure 30:
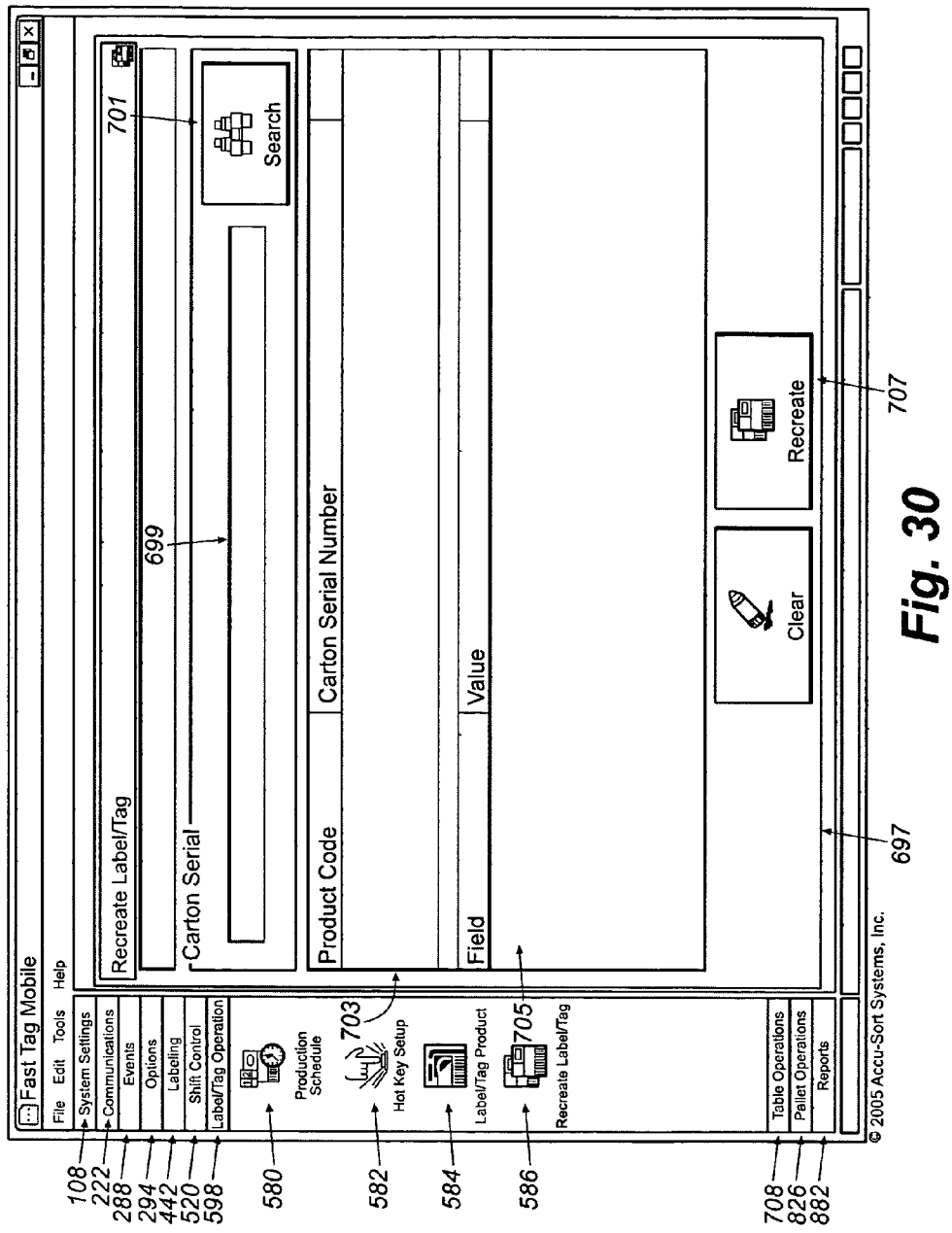
FIG. 30 is a screen display within a software application that controls the mobile labeling system as shown in FIG. 1A.

Activating a Recreate Label/Tag button 586 displays a screen 697, as shown in FIG. 30, through which the user may reprint labels for a product that has already been processed. This function can replace a label that is damaged, inaccurate, or has been misapplied. The operator may be able to realize visually that a label has been damaged, or the carton may be rejected upon inspection by a barcode and/or RFID reader before leaving the manufacturer. For example, a manufacturer may verify all the barcodes and RFID labels before shipping to the retailer by scanning the barcodes with a barcode scanner and the RFID tags with an RFID reader. If either or both the barcode and RFID tag fail to respond, the operator recreates a label through screen 697.

If the operator knows the carton serial number, for example because the carton serial number is printed on the existing, defective label, the operator may enter the carton serial number in a Carton Serial textbox 699 and activate a Search button 701. If the serial number is found in the Carton database table of database 54 (FIG. 3B), the application populates list boxes 703 and 705 from the Carton table associated with the carton serial number when the original label was produced, as described above. The user recreates the label by pressing a Recreate button 707 and affixes the label to the product. Since no new carton data is created, the original carton serial number remains valid and is not replaced. The Carton database table record for the carton serial number is, however, replaced with the new RFID Printer Data, since the new label includes a new RFID tag having a new RFID identification number.

Alternatively, if the operator is at Recreate Label screen 697 and scans the carton's initial UPC label, the application parses the product code from the EPC barcode data and populates Carton Serial textbox 699 directly, and reprinting of the label continues in the same manner.

Figure 31A:
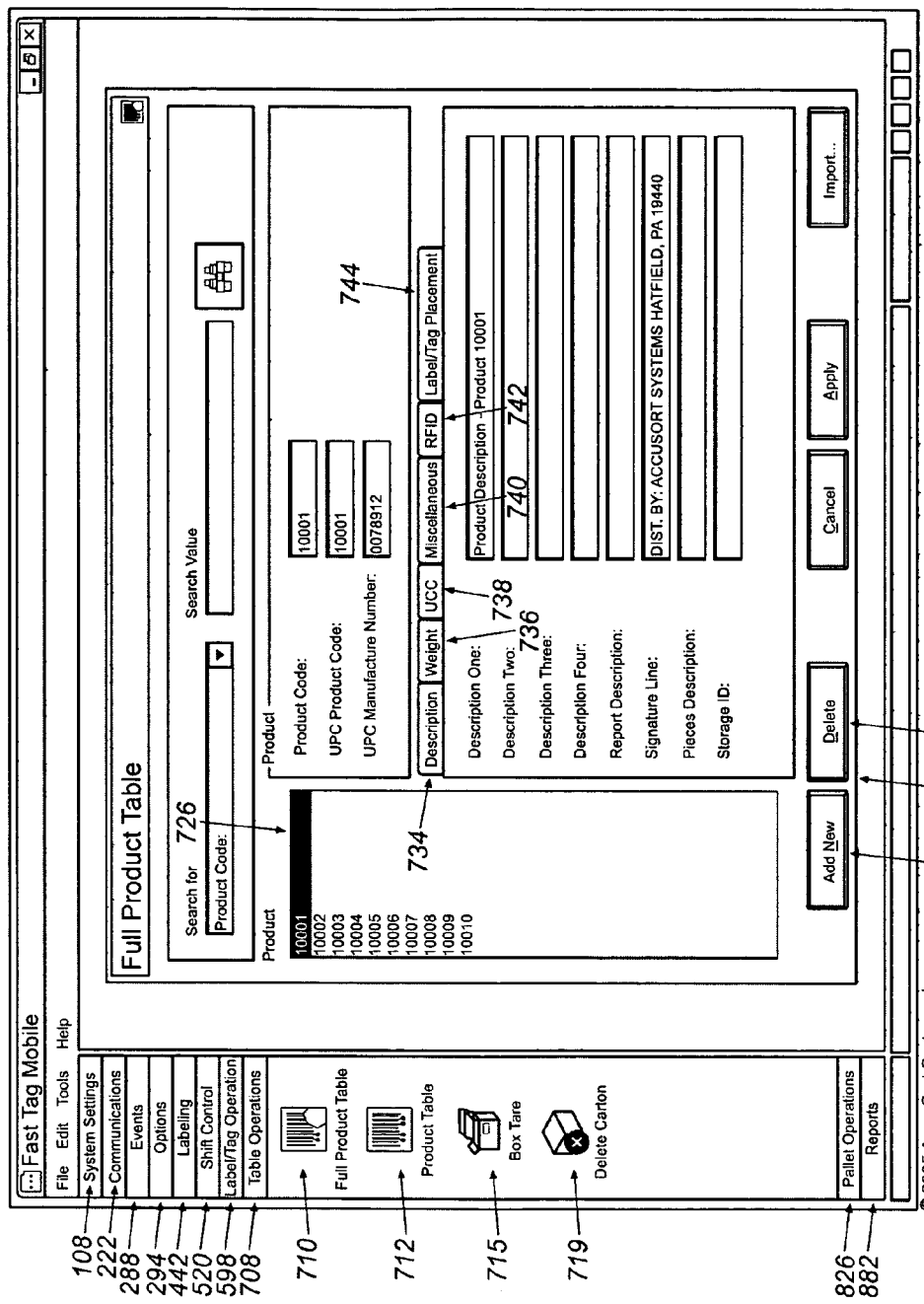
FIG. 31A is a screen display within a software application that controls the mobile labeling system as shown in FIG. 1A.

Activation of a Table Operations panel 708 displays buttons 710, 712, 715 and 719, as shown in FIG. 31A. Activation of a Full Product Table button 710 displays a screen 718 through which the user may view, edit, add, and delete product codes and associated information from the Product table in database 54. The user can add a new product to the system by activating an Add New button 762 or modify data corresponding to an existing product code by selecting the existing product code from a Product list box 726. The user can also delete an entire product code by activating a Delete button 764. All information corresponding to product codes is stored in database 54.

The fields defined under Description tab 734, Weight tab 736, UCC tab 738, Miscellaneous tab 740, RFID tab 742 and Label/Tab Placement tab 744 define the fields of the Product table in database 54, and the data populating these fields for a given product code comprise the data for that product code's entry in the Product table. To modify data in a given product code entry, the operator locates the product in box 726, activates the tab under which a desired field is located, activates a textbox adjacent the field description, and enters the desired modified data.

Still referring to screen 718 in FIG. 31A, Description tab 734 provides multiple levels of description that can be filled by the retailer/wholesaler and/or by the manufacturer, as well as a manufacturer signature field and fields relating to product storage, pieces and reports.

Figure 31B:
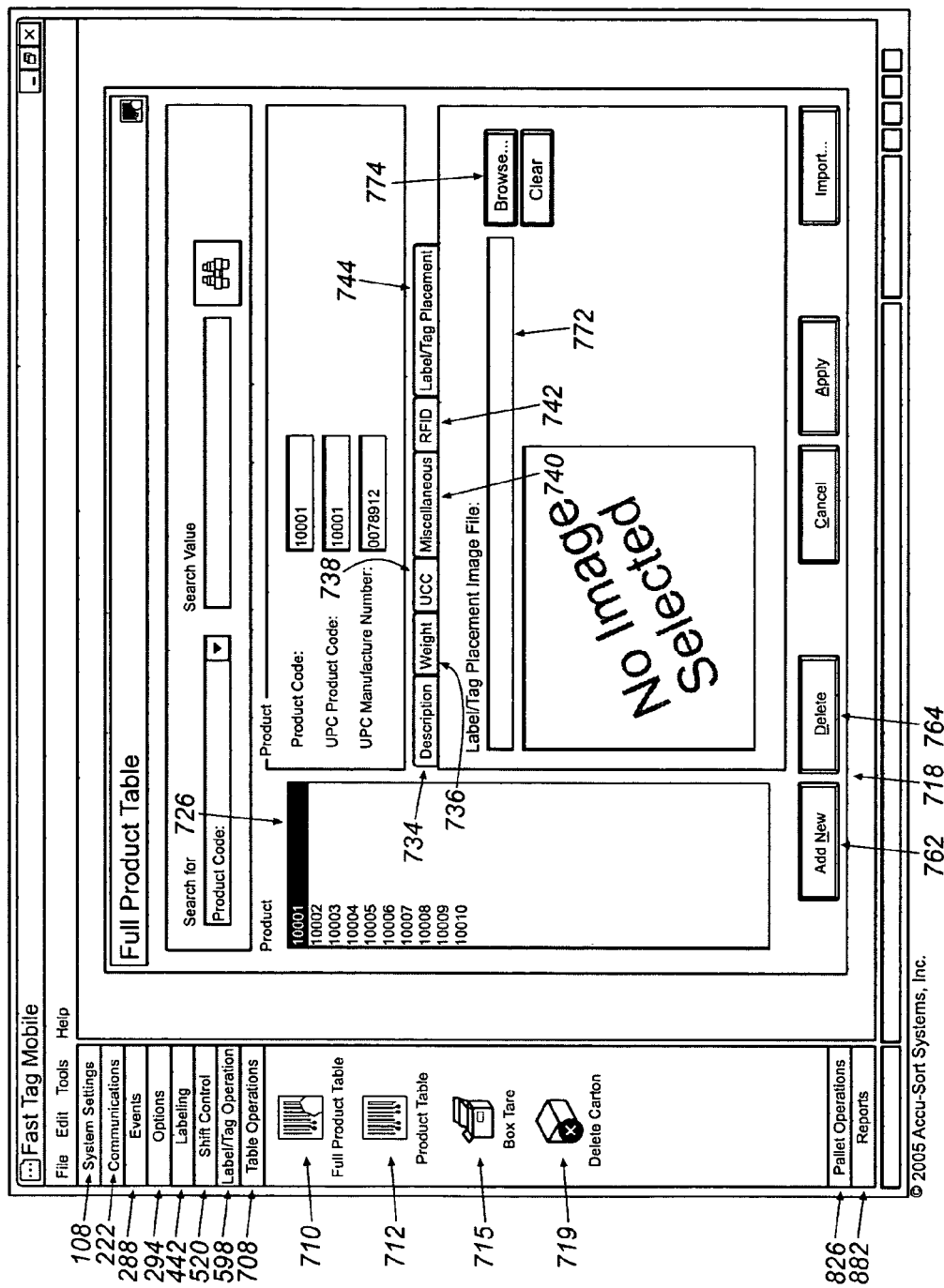
FIG. 31B is a screen display within a software application that controls the mobile labeling system as shown in FIG. 1A.
Figure 31C:
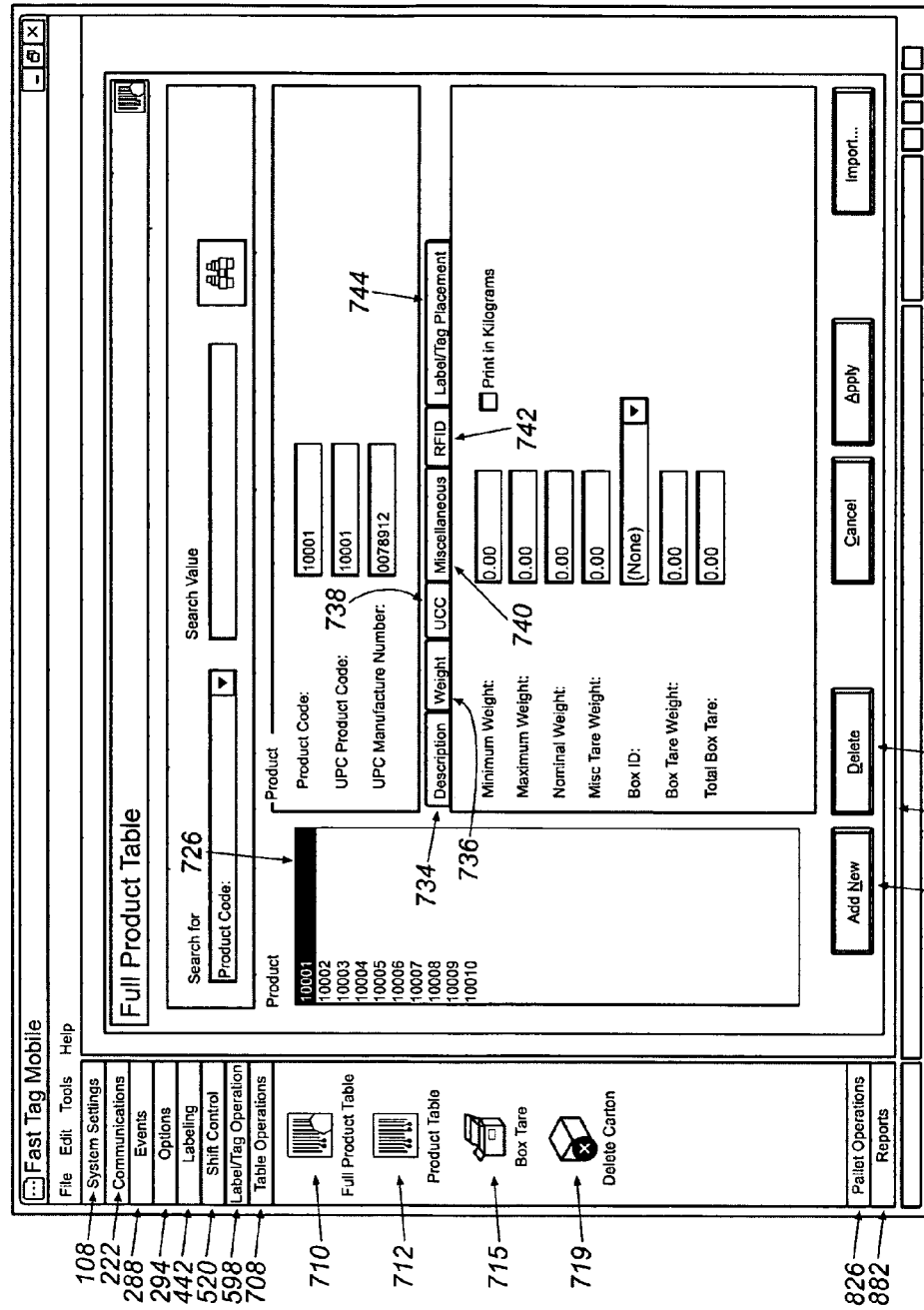
FIG. 31C is a screen display within a software application that controls the mobile labeling system as shown in FIG. 1A.

Referring to screen 718 in FIG. 31C, Weight tab 736 provides fields for the carton's minimum weight, maximum weight, nominal weight, miscellaneous tare weight, and a box ID (a drop down box filled with unique box identifications from a box table, which associates a box ID with a tare weight a box description). The minimum and maximum weights determine the weight range within which the system application expects to find the contents of a carton with the associated product code.

Figure 31D:
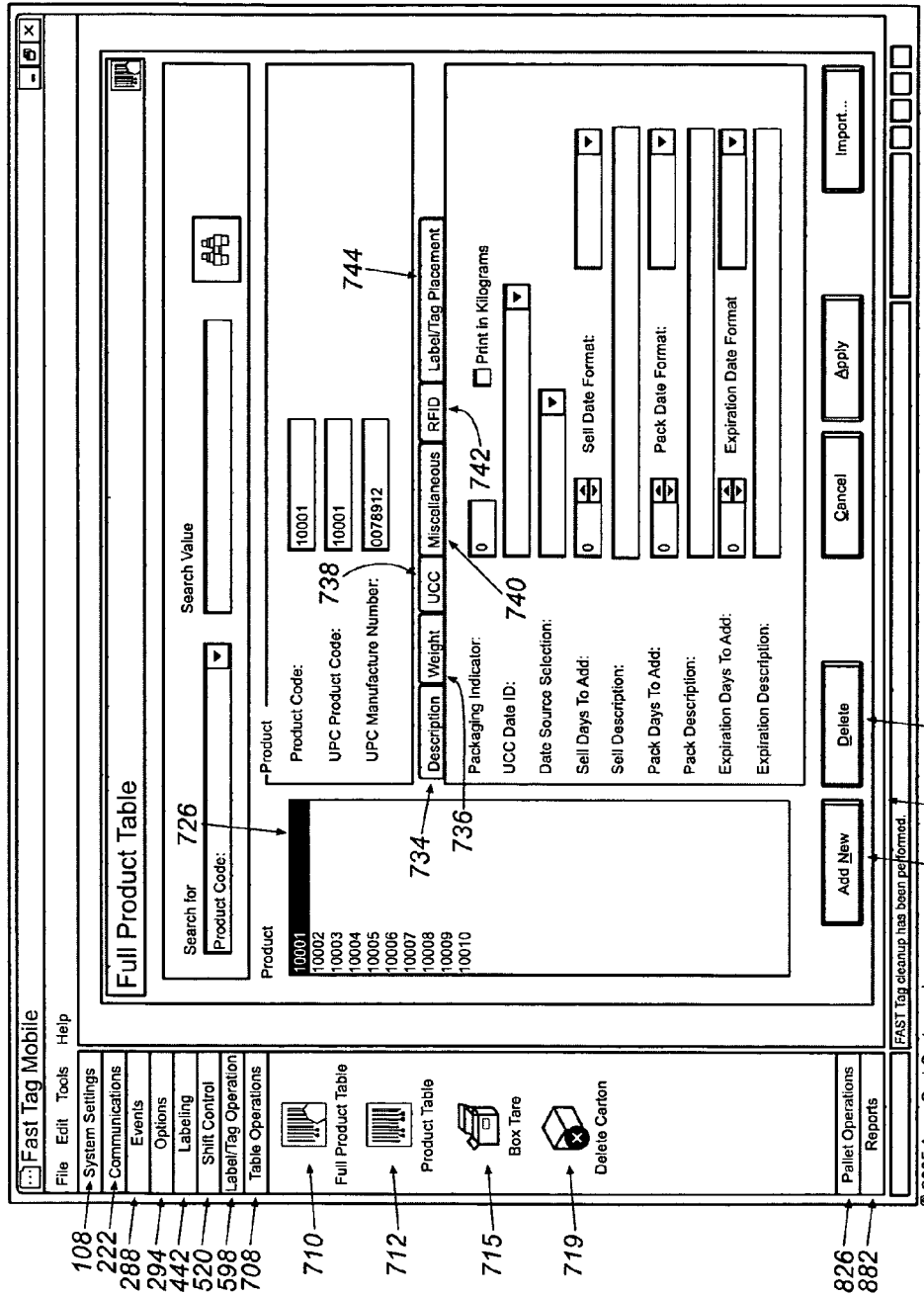
FIG. 31D is a screen display within a software application that controls the mobile labeling system as shown in FIG. 1A.

Referring to screen 718 in FIG. 31D, UCC (Uniform Code Council) tab 738 provides fields for packaging indicator, UCC date ID (11-production date, 13-packaging date, 15-sell by date, or 17-expiration date), data source selection (production, packed, sell by, and expiration), sell days to add, sell date format, sell description, pack days to add, pack date format, pack description, expiration days to add, expiration date format, expiration description.

Figure 31E:
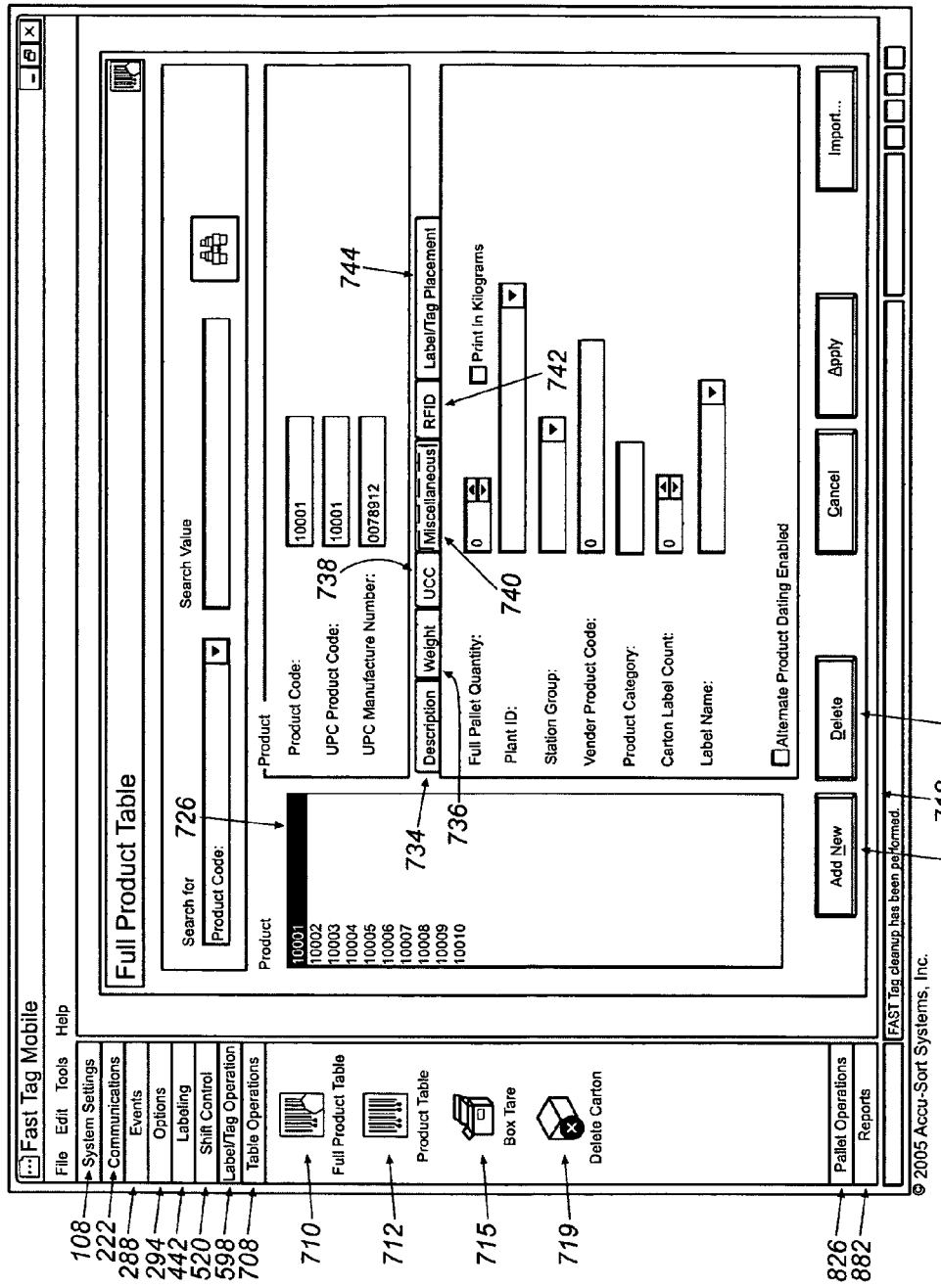
FIG. 31E is a screen display within a software application that controls the mobile labeling system as shown in FIG. 1A.

Referring to screen 718 in FIG. 31E, Miscellaneous tab 740 provides fields for full pallet quantity, plant ID, station group, vendor product code, product company, carton label count, and label name.

Figure 31F:
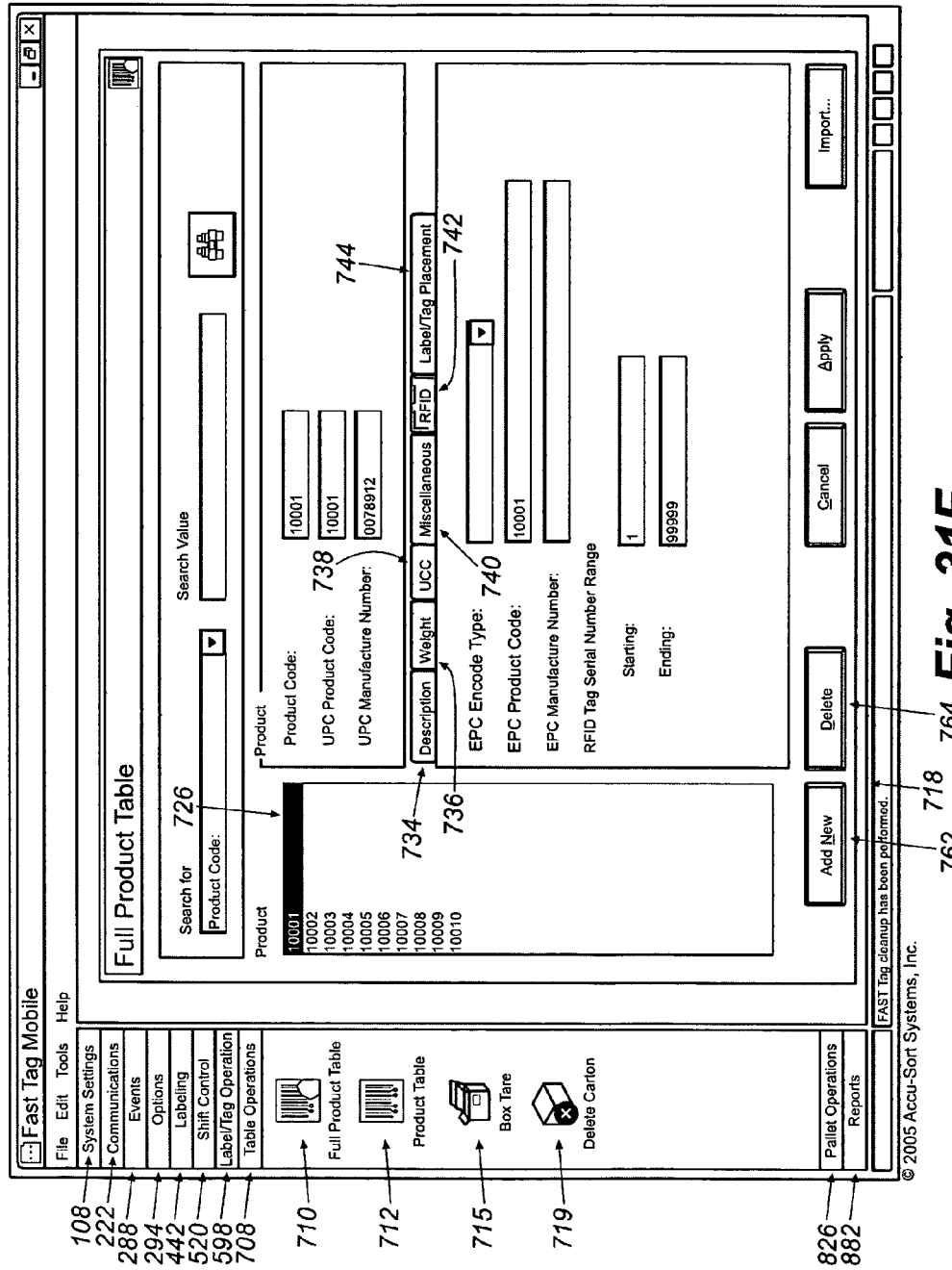
FIG. 31F is a screen display within a software application that controls the mobile labeling system as shown in FIG. 1A.

Referring to screen 718 in FIG. 31F, RFID tab 742 provides fields for EPC encode type (SGTIN, SSCC, SGLN and GRIA), EPC product code, EPC manufacturer number, and RFID tag serial number range.

Referring to FIG. 31B, screen 718 also permits the user to associate a product tag placement image with a product code. That is, through this screen, the user associates a product code with an image illustrating where an RFID Tag should be placed on a package associated with the code. The user can enter the location of the corresponding image in an Image File textbox 772 or by searching for the location by activating a Browse button 774. The image can be stored in files 50 on PC 12 (FIG. 3) or on any computer connected to PC 12. The path to the image file and its association with a product code is stored in database 54.

Figure 32:
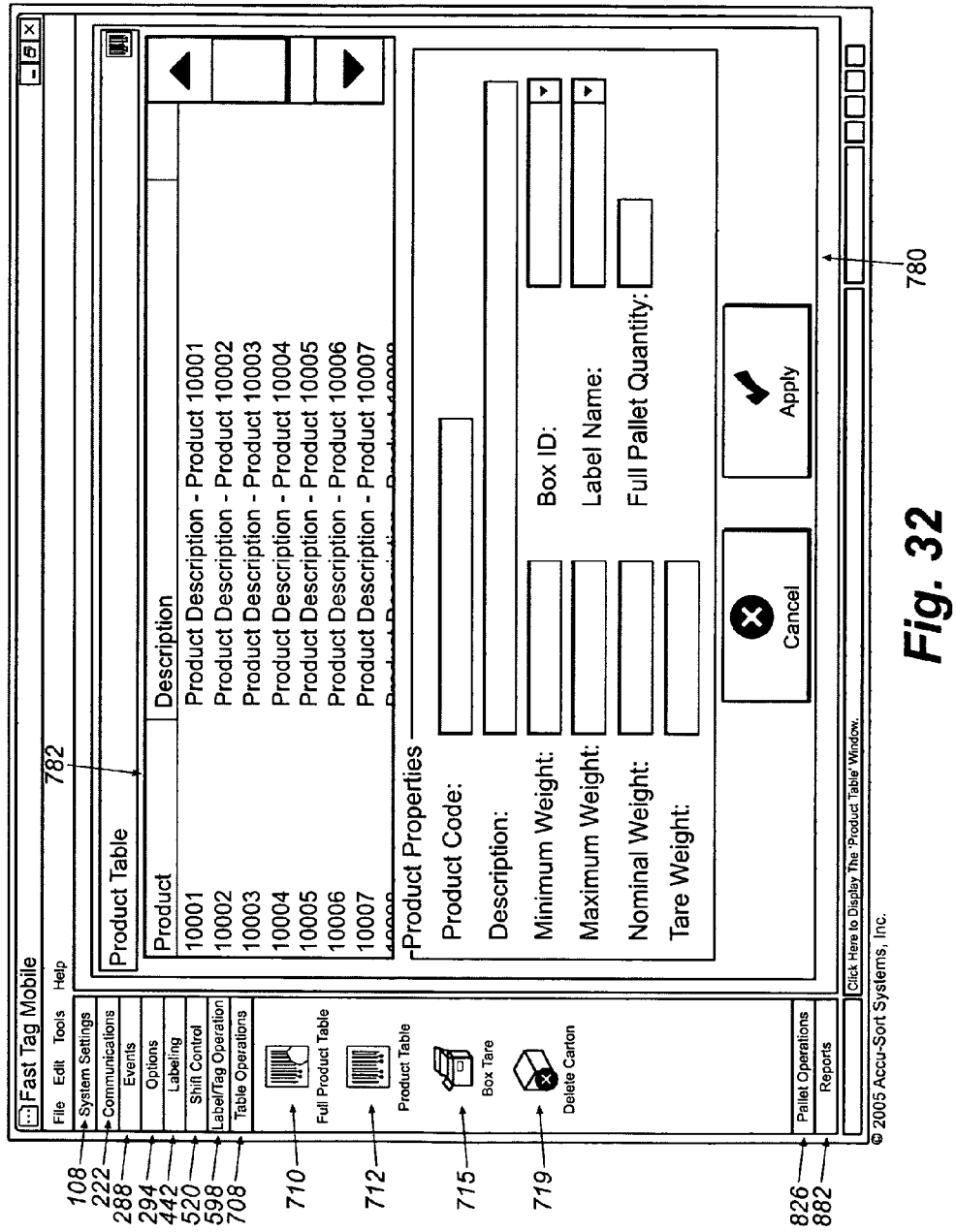
FIG. 32 is a screen display within a software application that controls the mobile labeling system as shown in FIG. 1A.
Figure 33:
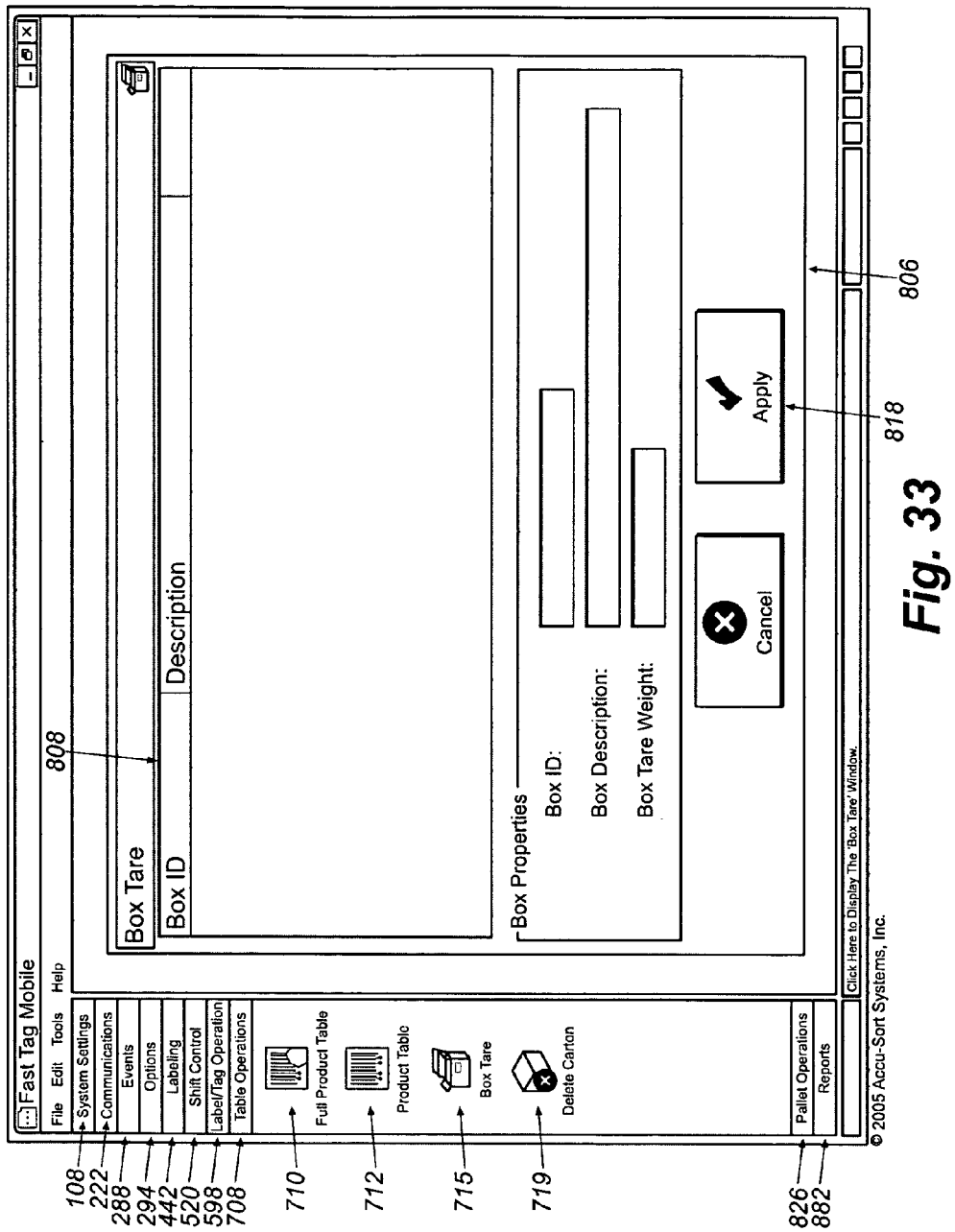
FIG. 33 is a screen display within a software application that controls the mobile labeling system as shown in FIG. 1A.

Activation of a Product Table button 712 displays a screen 780, as shown in FIG. 32, through which the user may update product information stored in database 54. The application populates a Product list box 782 from the information contained in database 54 (FIG. 3). The user may select a product code from list box 782 and then modify the product code's information using the textboxes on screen 780, which are a subset of those presented by screen 718. All product information is stored in database 54.

Activation of a Box Tare button 715 displays a screen 806, through which the user may update tare weights associated with specific packages. As noted above, Tare weight is the additional weight of a product's packaging that could be associated with that product. The application populates a Box ID list box 808 displaying all the current boxes used at the manufacturer's facility at which system 10 is located and their weights stored in database 54 (FIG. 3). The user may select a box from list box 808 and edit the box's description and weight. If the user makes changes and activates an Apply button 818, the application updates database 54 with this information.

Figure 34:
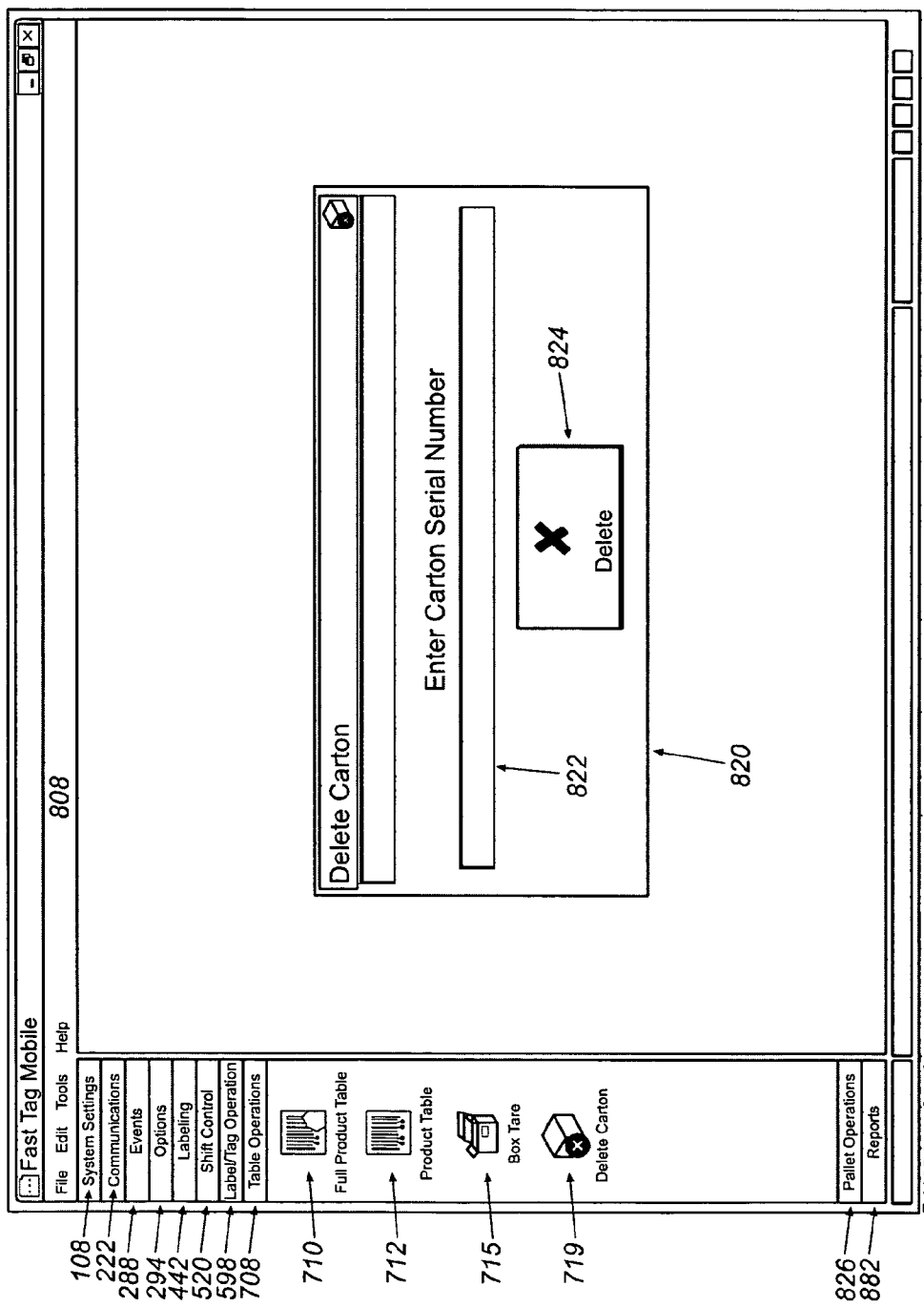
FIG. 34 is a screen display within a software application that controls the mobile labeling system as shown in FIG. 1A.

Activation of a Delete Carton button 719 displays a screen 820, as shown in FIG. 34, through which the user may remove a carton from database 54. Entering the carton's serial number in a Serial Number textbox 822 and activating a Delete button 824 removes the carton entirely from database 54. If the carton was part of a pallet, it is removed from the pallet in database 54 as well.

Figure 35:
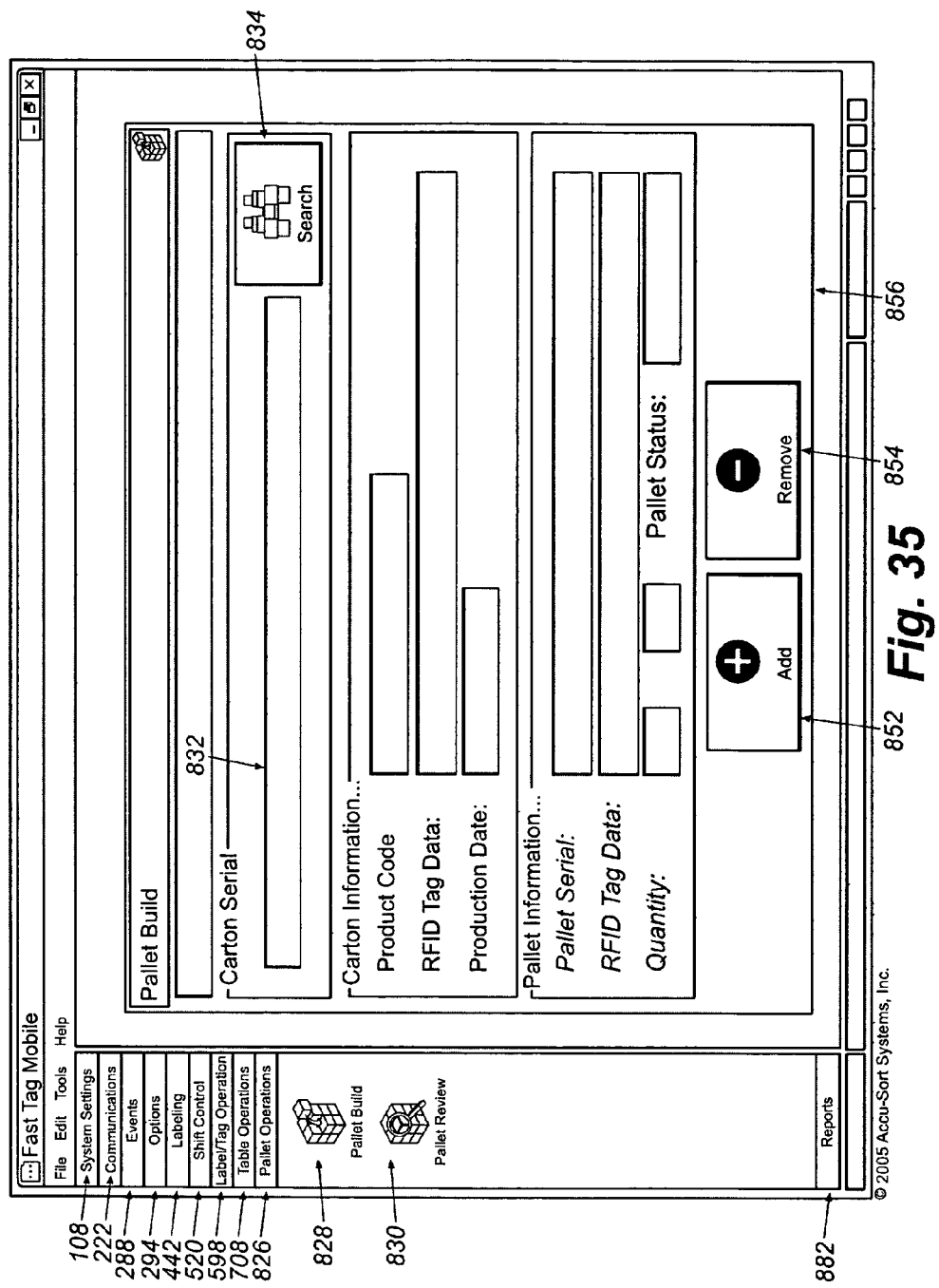
FIG. 35 is a screen display within a software application that controls the mobile labeling system as shown in FIG. 1A.

If Palletizing Enabled toggle button 428 on Mode Setup screen 408 in Options panel 294 (FIG. 21) is activated, a Pallet Operations panel 826 will be available on the left-hand side of the application. Activating panel 826 displays buttons 828 and 830, as shown in FIG. 35. Activation of a Pallet Build button 828 displays a screen 856, through which the operator may add or remove cartons from pallets. During palletizing, and referring also to FIG. 4 at 77, a carton/item 90 is placed on a specific pallet 88 after one or more of several steps are completed, for example after the carton/item is weighed, acceptance procedures are completed, and the carton/item has been labeled. In the presently described embodiment of the application, pallets (a) are unique and have their own serial number, (b) cannot have mixed product codes, and (c) can have mixed production dates, if this option is enabled as described above. Only one pallet per product code can be opened at one time on each production line. This means that a certain product code (and its associated products), and only that product code, is allocated to one pallet in database 54 (FIG. 3) for a production line until that pallet has been closed in the application. The option of including mixed production dates on one pallet allows products of the same product code to be allocated to a certain pallet over multiple production periods. Pallet information, including carton and product information corresponding thereto, is stored in database 54.

Figure 36:
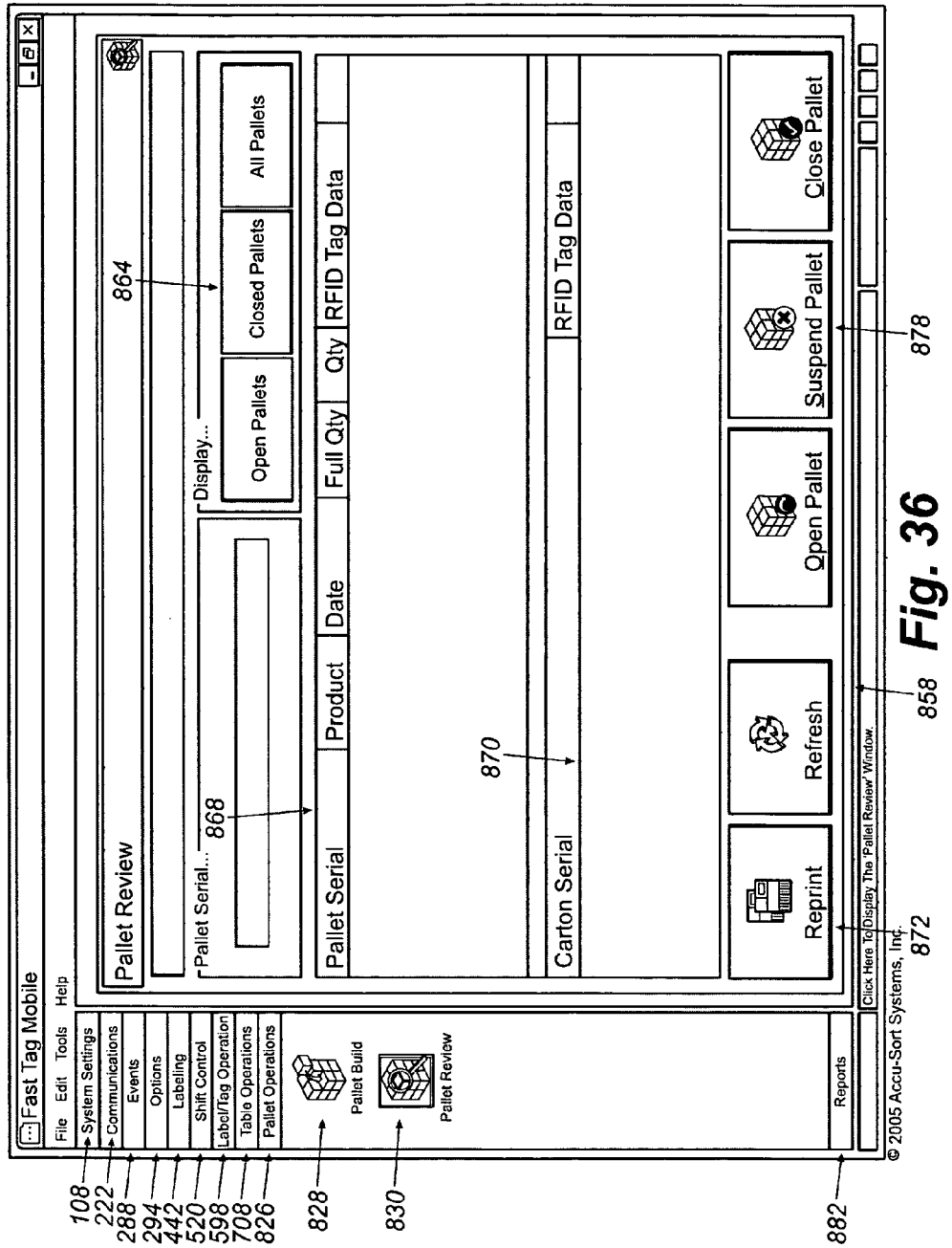
FIG. 36 is a screen display within a software application that controls the mobile labeling system as shown in FIG. 1A.

Screen 856 also permits the user to add or remove cartons to pallets. The user enters a carton serial number in a Carton Serial textbox 832 and activates a Search button 834. The application displays the corresponding carton and pallet information, if any, in screen 856. This includes the product code, the RFID Tag data specific to that particular RFID tag, and the date on which the carton was processed and labeled. If the carton has been associated with a pallet, the user can disassociate the carton with that pallet by activating a Remove button 854. Likewise, if the carton has not been associated with a pallet to which it belongs, the user can associate the carton with the pallet by activating an Add button 852. Screen 856 also displays the pallet information, including the pallet's serial number, the RFID Tag data specific to that particular pallet, the current and required quantity of cartons on the pallet, and whether the pallet is open, closed, or suspended. A pallet may be suspended through button 878 as shown in FIG. 36. Suspension of a pallet sets a given pallet aside in the operation of system 10, allowing the operator to process a different pallet or non-palletized cartons. All of the information associated with cartons and pallets are stored in database 54 (FIG. 3B).

Activation of a Pallet Review button 830 displays a screen 858, as shown in FIG. 36, through which the user may reprint labels for palletized cartons, reprint labels for and view the contents of closed pallets, and suspend or close open pallets.

A pallet can be closed when all the cartons associated with that pallet have been processed and labeled. The application populates a Pallet list box 868 with open pallets. The user may select one of these pallets and close it by activating a Close Pallet button 864. In response, the application prints a pallet label to be affixed to the pallet containing information specific to that pallet and its contents. The user can always reprint carton labels by selecting a specific carton in a Carton Serial list box 870 and activating a Reprint button 872.

Figure 37A:
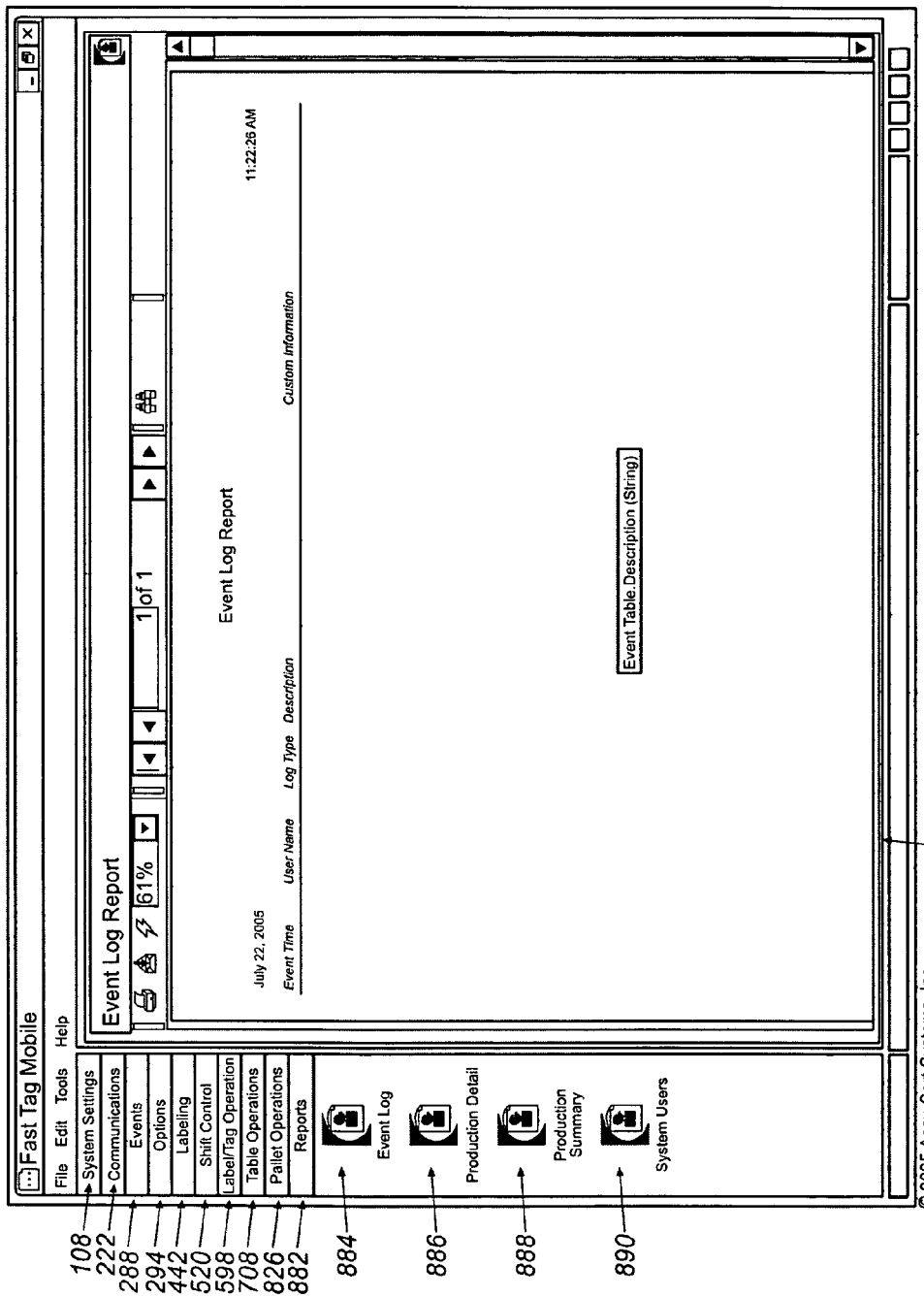
FIG. 37A is a screen display within a software application that controls the mobile labeling system as shown in FIG. 1A.
Figure 37B:
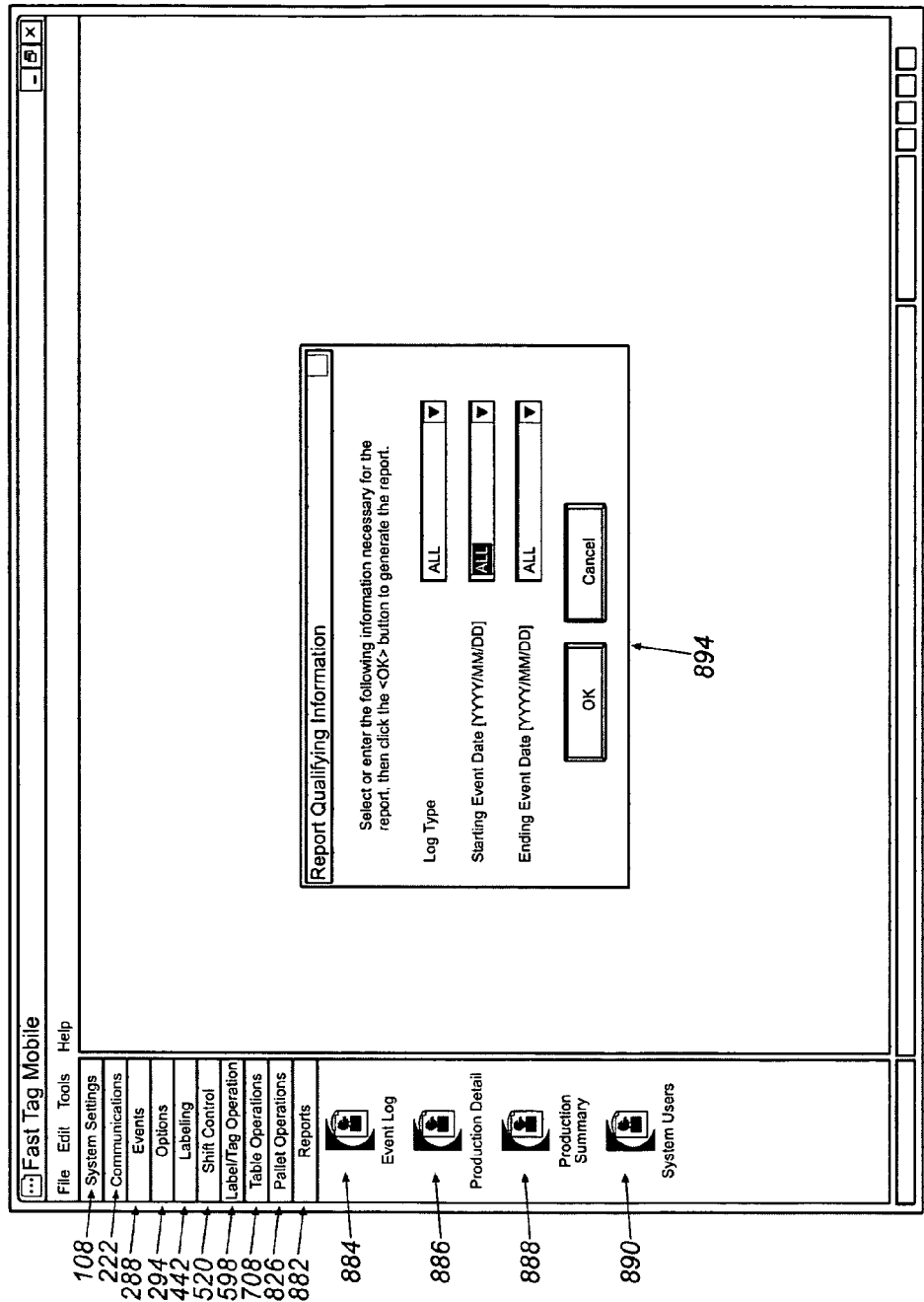
FIG. 37B is a screen display within a software application that controls the mobile labeling system as shown in FIG. 1A.

Activation of a Reports Panel 882 through touch screen 14 displays buttons 884, 886, 888, and 890, as shown in FIG. 37A. For those reports providing information over a range of dates, user ids, log types, or other variables, a report qualifying screen, such as screen 894 as shown in FIG. 37B, is provided before display of the report itself. For example, the user enters the log type, start date, and end date through screen 894, thereby allowing the application to generate the report. Custom reports may be created using external programs designed for that purpose, as should be understood by those skilled in this art.

Activation of an Event Log (Report) button 884 activates screen 894. Once the user enters the qualifying information as described above, screen 892 displays the event log report, which provides information about the events stored by the application in database 52. Activation of a Production Detail button 886 or a Production Summary button 888 bring up a qualifying screen, similar to screen 894. Once that information is entered, buttons 886 and 888 display reports cataloging pallets and their associated cartons. The report is generated from the data stored in database 54. Activation of a System Users Report button 890 displays a screen that lists the user ID, full name, and access level. This report is generated from the user information stored in database 54.

While one or more embodiments of the present invention have been described above, it should be understood that any and all equivalent realizations of the present invention are included within the scope and spirit thereof. Thus, the embodiments presented herein are by way of example only and are not intended as limitations of the present invention. Therefore, it is contemplated that any and all such embodiments are included in the present invention as may fall within the scope of the present disclosure.

What is claimed is:

1. A system for applying radio frequency identification tags on items on which are disposed respective barcodes, said system comprising:
   a processor;
   a plurality of representations of said items accessible by the processor, wherein each representation is associated with at least one of the barcodes and includes an indication of a predetermined position for placement of a said radio frequency identification tag on a said item corresponding to the at least one barcode;
   a barcode reader in communication with the processor; and
   a display in communication with the processor,
   wherein,
      when the barcode reader detects a first said barcode on a first said item, the barcode reader outputs a first signal to the processor identifying the first barcode,
      the processor receives the first signal, identifies a first said representation that is associated with the first barcode, and outputs to the display a second signal associated with the first representation, and
      the display receives the second signal associated with the first representation and displays the first representation.

2. The system of claim 1, wherein each representation is a photograph of a said item having an appearance similar to the first item and illustrating the predetermined position.

3. The system of claim 1, further comprising:
   a radio frequency identification tag printer in communication with the processor; and
      a plurality of records accessible by the processor, wherein each record is associated with at least one of the barcodes and includes data associated with the last-mentioned at least one barcode,
   wherein,
      the processor identifies a first said record associated with the first barcode and outputs to the radio frequency identification tag printer a third signal associated with a first said data included in the first record, and
      the radio frequency identification tag printer receives the third signal and encodes a first said radio frequency identification tag with the first data.

4. The system of claim 3, wherein the data identifies respective groups to which said items are assigned.

5. The system of claim 3, wherein the data includes universal product codes associated with respective said items.

6. The system of claim 3, further comprising:
   a second barcode reader in communication with the processor,
   wherein,
      the printer prints a second barcode identical to the first barcode on a top surface of the first radio frequency identification tag,
      the processor outputs a fourth signal to the display, which receives the fourth signal and displays a verification prompt,
      the second reader detects the second barcode on the top surface and outputs a fifth signal to the processor associated with the second barcode, and
      the processor receives the fifth signal, and, if the second barcode is identical to the first barcode, outputs a sixth signal to the display, which receives the sixth signal and removes the verification prompt.

7. The system of claim 1, wherein the plurality of representations are stored in a database.

8. The system of claim 1, further comprising:
   a mobile cart; and
   a battery connected to and supplying power to the processor, the barcode reader, and the display,
   wherein the processor, the barcode reader, the display, and the battery are disposed on the cart.

9. A system for applying radio frequency identification tags on items on which are disposed respective barcodes, said system comprising:
   a processor;
   a plurality of photographs of the items, wherein each photograph is accessible by the processor, is associated with at least one of the barcodes, and illustrates a predetermined position for placement of a said radio frequency identification tag on a said item corresponding to the at least one barcode;
   a barcode reader in communication with the processor;
   a display in communication with the processor;
   a radio frequency identification tag printer in communication with the processor; and
   a plurality of records accessible by the processor, wherein each record is associated with at least one of the barcodes and includes data associated with the at least one barcode, wherein,
when the barcode reader detects a first said barcode on a first said item, the barcode reader outputs a first signal to the processor identifying the first barcode,
the processor receives the first signal, identifies a first said photograph that is associated with the first barcode, outputs to the display a second signal associated with the first photograph, identifies a first said record that is associated with the first barcode, and outputs to the radio frequency identification tag printer a third signal associated with a first said data included in the first record,
the display receives the second signal and displays the first photograph, and
the radio frequency identification tag printer receives the third signal and encodes a first said radio frequency identification tag with the first data.

10. The system of claim 9, further comprising:
a mobile cart; and
a battery connected to and supplying power to the processor, the barcode reader, the display, and the printer
wherein the processor, the barcode reader, the display, the printer, and the battery are disposed on the cart.

11. A conveyor system for applying radio frequency identification tags on items on which are disposed respective barcodes, said system comprising:
a frame;
a first conveyor disposed movably on the frame that conveys said items through a first path of travel;
a first barcode reader disposed proximate the first path of travel so that the first barcode reader receives light reflected from a first area that is proximate the first path of travel and through which the items pass;
a second conveyor disposed movably on the frame that conveys the items through a second path of travel from the first path of travel;
a diverter disposed on the frame;
a first processor in communication with the first barcode reader and the diverter;
a second processor in communication with the first processor;
a second barcode reader in communication with the second processor;
a plurality of representations of the items, wherein each representation is accessible by the first and second processors, is associated with at least one of the barcodes, and includes an indication of a predetermined position for placement of a said radio frequency identification tag on a said item corresponding to the at least one barcode; and
a display in communication with the second processor,
wherein,
when the first barcode reader detects a first said barcode on a first said item, the first barcode reader outputs to the first processor a first signal identifying the first barcode, and
the first processor receives the first signal and determines whether a first said representation associated with the first barcode exists,
wherein, if the first representation exists,
the first processor outputs to the diverter a second signal corresponding to the existence of the first representation, and
the diverter receives the second signal and redirects the first item from the first path of travel on the first conveyor to the second path of travel on the second conveyor.

12. The system of claim 11, wherein,
when the second barcode reader detects the first barcode on the first item, the second barcode reader outputs to the second processor a third signal identifying the first barcode,
the second processor receives the third signal, identifies the first representation, and outputs to the display a fourth signal associated with the first representation, and
the display receives the fourth signal and displays the first representation.

13. The system of claim 11, further comprising:
a radio frequency identification tag printer in communication with the second processor; and
a plurality of records accessible by the second processor, wherein each record is associated with at least one of the barcodes and includes data associated with the last-mentioned at least one barcode,
wherein,
the second processor identifies a first said record associated with the first barcode and outputs to the radio frequency identification tag printer a third signal associated with a first said data included in the first record, and
the radio frequency identification tag printer receives the third signal and encodes a first said radio frequency identification tag with the first data.

14. The system of claim 13, further comprising:
a third processor remote from the first and second processors; and
a second plurality of records associated with the third processor, wherein each second record is associated with at least one of the said barcodes and includes data associated with the last-mentioned at least one barcode,
wherein,
the third processor identifies a first said second record associated with the first barcode and outputs to the first processor a fourth signal associated with a second said data included in the first said second record,
the second processor receives the fourth signal and outputs to the radio frequency identification tag printer a fifth signal associated with the second data, and
the radio frequency identification tag printer receives the fifth signal and encodes the first said radio frequency identification tag with the second data.

15. The system of claim 11, further comprising:
a cart moveable with respect to the frame; and
a battery connected to and supplying power to the second processor, the second barcode reader, and the display,
wherein the second processor, the second barcode reader, the display, and the battery are disposed on the cart.

16. A conveyor system for applying radio frequency identification tags on items on which are disposed respective barcodes, said system comprising:
a frame;
a first conveyor disposed movably on the frame that conveys said items through a first path of travel;
a first barcode reader disposed proximate the path of travel so that the first barcode reader receives light reflected from a first area that is proximate the first path of travel and through which the items pass;
a first radio frequency identification tag printer disposed proximate the first path of travel and downstream from the first barcode reader with respect to the first path of travel, wherein the first radio frequency identification tag printer affixes said radio frequency identification tags on the items as the items are conveyed through the first path of travel;

a first barcode printer disposed proximate the first path of travel and downstream from the first barcode reader with respect to the first path of travel, wherein the first barcode printer affixes barcodes on the items as they are conveyed through the first path of travel;

a second barcode reader disposed proximate the first path of travel and downstream from the first radio frequency identification tag printer and the first barcode printer with respect to the first path of travel, wherein the second barcode reader receives light reflected from a second area that is proximate the first path of travel and through which the items pass;

an antenna disposed proximate the first path of travel and downstream from the first radio frequency identification tag printer and the first barcode printer with respect to the first path of travel, wherein the antenna transmits and receives radio signals from a third area that is proximate the first path of travel and through which the items pass;

a second conveyor disposed movably on the frame that conveys the items through a second path of travel from the first path of travel;

a diverter disposed on the frame;

a first processor in communication with the first barcode reader, the first radio frequency identification tag printer, the first barcode printer, the second barcode reader, and the diverter;

a cart moveable with respect to the frame;

a second processor in communication with the first processor and disposed on the cart;

a third barcode reader in communication with the second processor and disposed on the cart;

a plurality of records accessible by the first and second processors, wherein each record is associated with at least one of the barcodes and includes data associated with the at least one barcode;

a display in communication with the second processor and disposed on the cart;

a second radio frequency identification tag printer in communication with the second processor and disposed on the cart;

a second barcode printer in communication with the second processor and disposed on the cart;

a battery disposed on the cart and connected to and supplying power to the second processor, the third barcode reader, the display, the second radio frequency identification tag printer, and the second barcode printer, wherein, when the first barcode reader detects a first said barcode on a first said item, the first barcode reader outputs to the first processor a first signal identifying the first barcode, the first processor receives the first signal, identifies a first said record associated with the first barcode, outputs to the first radio frequency identification tag printer a second signal associated with a first said data included in the first record, and outputs to the first barcode printer a third signal associated with the first data, the first radio frequency identification tag printer receives the second signal, encodes a first said radio frequency identification tag with the first data, and affixes the first said radio frequency identification tag to the first item, the first barcode printer receives the third signal, prints at least a first portion of the first data on a second said barcode, and affixes the second barcode on the first item, when the first item passes through the second area and the second barcode reader fails to detect the second barcode, or the first item passes through the third area and the antenna fails to receive a radio signal from the first radio frequency identification tag, the first processor outputs to the diverter a fourth signal corresponding to the first item, and the diverter receives the fourth signal and redirects the first item from the first path of travel on the first conveyor to the second path of travel on the second conveyor.

17. The system of claim 16, wherein the second area includes at least a portion of the third area.

18. The system of claim 16, wherein, when the third barcode reader detects the first barcode, the third barcode reader outputs to the second processor a fifth signal identifying the first barcode, the second processor receives the fifth signal, identifies the first record associated with the first barcode, outputs to the second radio frequency identification tag printer a sixth signal associated with the first said data included in the first record, and outputs to the second barcode printer a seventh signal associated with the first data, the second radio frequency identification tag printer receives the sixth signal and encodes a second said radio frequency identification tag with the first data, and the second barcode printer receives the seventh signal and prints at least a first portion of the first data on a third said barcode.

19. The system of claim 18, further comprising:

a plurality of representations of the items accessible by the first and second processors, wherein each representation is associated with at least one of the barcodes and includes an indication of a predetermined position for placement of a said radio frequency identification tag on a said item corresponding to the last-mentioned at least one barcode, wherein, when the second processor receives the fifth signal, the second processor identifies a first said representation associated with the first barcode and outputs to the display an eighth signal associated with the first representation, and the display receives the eighth signal and displays the representation.

20. A method for applying radio frequency identification tags on items on which are disposed respective barcodes, said method comprising the steps of:

a. detecting a first said barcode on a first said item;

b. outputting a signal identifying the first barcode;

c. identifying a representation associated with the first barcode that includes an indication of a predetermined position for placement of a said radio frequency identification tag on the first item; and d. displaying the representation.

21. The method of claim 20, further comprising the steps of:

a. printing a first said radio frequency identification tag; and b. applying the first radio frequency identification tag to the first item.

22. The method of claim 21, wherein the representation is a photograph of a said item having an appearance similar to the first item and illustrating the predetermined position.

23. The method of claim 22, further comprising:

a. identifying a first set of data associated with the first barcode; and b. encoding the first radio frequency identification tag with the first set of data.

24. A method for applying radio frequency identification tags on items on which are disposed respective barcodes, said method comprising the steps of:
   a. conveying said items through a first path of travel;
   b. detecting a first said barcode on a first said item; and
   c. diverting the first item from the first path of travel to a second path of travel if a representation indicating a predetermined position for placement of a said radio frequency identification tag on the first item is associated with the first barcode.

25. The method of claim 24, further comprising:
   a. displaying the representation;
   b. printing a first said radio frequency identification tag; and
   c. applying the first radio frequency identification tag to the first item.

* * * * *